US009924366B2

United States Patent
Schmidt et al.

(10) Patent No.: US 9,924,366 B2
(45) Date of Patent: Mar. 20, 2018

(54) PLATFORM VALIDATION AND MANAGEMENT OF WIRELESS DEVICES

(71) Applicant: InterDigital Patent Holdings, Inc., Wilmington, DE (US)

(72) Inventors: Andreas Schmidt, Frankfurt am Main (DE); David G. Greiner, New Hyde Park, NY (US); Louis J. Guccione, East Chester, NY (US); Dolores F. Howry, Malvern, PA (US); Michael V. Meyerstein, Martlesham Heath (GB); Sudhir B. Pattar, Mount Laurel, NJ (US); Yogendra C. Shah, Exton, PA (US); Inhyok Cha, Gangnam-Ku (KR); Andreas Leicher, Frankfurt (DE); Lawrence Case, Austin, TX (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/699,509

(22) Filed: Apr. 29, 2015

(65) Prior Publication Data
US 2015/0237502 A1    Aug. 20, 2015

Related U.S. Application Data

(63) Continuation of application No. 12/718,480, filed on Mar. 5, 2010, now abandoned.
(Continued)

(51) Int. Cl.
*H04W 12/10*    (2009.01)
*H04W 12/08*    (2009.01)
*H04W 12/06*    (2009.01)

(52) U.S. Cl.
CPC .......... *H04W 12/10* (2013.01); *H04W 12/06* (2013.01); *H04W 12/08* (2013.01)

(58) Field of Classification Search
CPC .................................................... H04W 12/10
See application file for complete search history.

(56) References Cited

U.S. PATENT DOCUMENTS 6,731,932 B1    5/2004    Rune et al.
6,779,120 B1 *    8/2004    Valente ............... H04L 41/0609
                                                                     717/117
(Continued)

FOREIGN PATENT DOCUMENTS

CN            1933651         3/2007
CN            101043338       9/2007
(Continued)

OTHER PUBLICATIONS

Cabuk et al. (Improving Policy Verification Capabilities of Trusted Platforms, HPL-2008-71, Jun. 21, 2008, 21 pages).*
(Continued)

*Primary Examiner* — Oleg Korsak
(74) *Attorney, Agent, or Firm* — Baker & Hostetler, LLP

(57) ABSTRACT

Methods, components and apparatus for implementing platform validation and management (PVM) are disclosed. PVM provides the functionality and operations of a platform validation entity with remote management of devices by device management components and systems such as a home node-B management system or component. Example PVM operations bring devices into a secure target state before allowing connectivity and access to a core network.

21 Claims, 20 Drawing Sheets

Related U.S. Application Data

(60) Provisional application No. 61/158,242, filed on Mar. 6, 2009, provisional application No. 61/173,457, filed on Apr. 28, 2009, provisional application No. 61/222,067, filed on Jun. 30, 2009, provisional application No. 61/235,793, filed on Aug. 21, 2009.

(56) References Cited

U.S. PATENT DOCUMENTS

| | | |
|---|---|---|
| 6,980,830 B2 | 12/2005 | Ahonen |
| 7,017,155 B2 | 3/2006 | Peev et al. |
| 7,027,808 B2 | 4/2006 | Wesby |
| 7,096,014 B2 | 8/2006 | Haverinen et al. |
| 7,539,156 B2 | 5/2009 | Leung et al. |
| 7,558,966 B2 | 7/2009 | Durham et al. |
| 7,580,701 B2 | 8/2009 | Ross |
| 7,610,619 B2 | 10/2009 | Kastelewicz et al. |
| 7,634,807 B2 | 12/2009 | Yan et al. |
| 7,653,819 B2 | 1/2010 | Bade et al. |
| 7,711,960 B2 | 5/2010 | Scarlata |
| 7,725,703 B2 | 5/2010 | Hunter et al. |
| 7,747,862 B2 | 6/2010 | Ovadia |
| 7,752,465 B2 | 7/2010 | Ebringer et al. |
| 7,809,777 B2 | 10/2010 | Dodge |
| 7,818,585 B2 | 10/2010 | Kilian-Kehr et al. |
| 7,827,397 B2 | 11/2010 | McCoull |
| 7,853,804 B2 | 12/2010 | Cromer et al. |
| 7,907,531 B2 | 3/2011 | Jha et al. |
| 7,908,483 B2 | 3/2011 | Iliev et al. |
| 7,930,733 B1 | 4/2011 | Iftode et al. |
| 8,000,704 B2 | 8/2011 | Arkko |
| 8,064,597 B2 | 11/2011 | Gehrmann |
| 8,090,551 B2 | 1/2012 | Almonte |
| 8,108,668 B2 | 1/2012 | Rozas |
| 8,266,676 B2 | 9/2012 | Hardjono et al. |
| 8,300,829 B2 | 10/2012 | Kylanpaa |
| 8,555,345 B2 | 10/2013 | Torvinen et al. |
| 8,856,941 B2 | 10/2014 | Cha et al. |
| 8,914,674 B2 | 12/2014 | Shah et al. |
| 9,253,643 B2 | 2/2016 | Pattar et al. |
| 2003/0119481 A1 | 6/2003 | Haverinen et al. |
| 2004/0023689 A1 | 2/2004 | Ahonen |
| 2004/0153667 A1 | 8/2004 | Kastelewicz et al. |
| 2005/0033987 A1 | 2/2005 | Van et al. |
| 2005/0132358 A1 | 6/2005 | Peev et al. |
| 2005/0223007 A1 | 10/2005 | Zimmer |
| 2006/0074600 A1 | 4/2006 | Sastry et al. |
| 2006/0137022 A1 | 6/2006 | Kilian-Kehr et al. |
| 2007/0050678 A1 | 3/2007 | Estes et al. |
| 2007/0075216 A1 | 4/2007 | Tohma |
| 2007/0113120 A1 | 5/2007 | Dodge |
| 2007/0143629 A1 | 6/2007 | Hardjono et al. |
| 2007/0150524 A1 | 6/2007 | Eker et al. |
| 2007/0153793 A1 | 7/2007 | Jiang |
| 2007/0157022 A1 | 7/2007 | Blom et al. |
| 2007/0239748 A1 | 10/2007 | Smith |
| 2008/0046786 A1 | 2/2008 | Patel et al. |
| 2008/0076419 A1 | 3/2008 | Khetawat et al. |
| 2008/0076425 A1 | 3/2008 | Khetawat et al. |
| 2008/0101400 A1 | 5/2008 | Auterinen |
| 2008/0155673 A1 | 6/2008 | Jung et al. |
| 2008/0163212 A1 | 7/2008 | Zimmer et al. |
| 2008/0233963 A1 | 9/2008 | Alanara et al. |
| 2008/0301784 A1 | 12/2008 | Zhu et al. |
| 2009/0013210 A1 | 1/2009 | McIntosh et al. |
| 2009/0149200 A1 | 11/2009 | Jayasinghe |
| 2011/0010543 A1 | 1/2011 | Schmidt et al. |
| 2011/0041003 A1 | 2/2011 | Pattar et al. |
| 2011/0044454 A1 | 2/2011 | Baek et al. |
| 2011/0265158 A1 | 10/2011 | Cha et al. |
| 2015/0099510 A1 | 4/2015 | Shah et al. |
| 2016/0044440 A1 | 2/2016 | Cha et al. |

FOREIGN PATENT DOCUMENTS

| | | |
|---|---|---|
| EP | 1533695 | 5/2005 |
| EP | 2 076 071 | 7/2009 |
| JP | 2003-208316 | 7/2003 |
| JP | 2003-208404 | 7/2003 |
| JP | 2005-521928 | 7/2005 |
| JP | 2005-536934 | 12/2005 |
| JP | 2006-513609 | 4/2006 |
| JP | 2006-287339 | 10/2006 |
| JP | 2007-072909 | 3/2007 |
| JP | 2007-515708 | 6/2007 |
| JP | 2007-215235 | 8/2007 |
| JP | 2007-522695 | 8/2007 |
| JP | 2011-509575 | 3/2011 |
| JP | 2012-520024 | 8/2012 |
| KR | 10-2005-0051223 | 6/2005 |
| KR | 2006-0090263 A | 8/2006 |
| KR | 10-2006-0118464 A | 11/2006 |
| KR | 2007-0073642 A | 7/2007 |
| KR | 2007-0102722 A | 10/2007 |
| KR | 10-2008-0023841 | 3/2008 |
| KR | 10-2009-0000065 | 1/2009 |
| KR | 10-2009-0091184 A | 8/2009 |
| WO | WO 02-056133 | 7/2002 |
| WO | WO 03-069922 | 8/2003 |
| WO | WO 2004-019582 | 3/2004 |
| WO | WO 2004-062248 | 7/2004 |
| WO | WO 2005-050441 | 6/2005 |
| WO | WO 2007-039757 | 4/2007 |
| WO | WO 2007-110094 | 10/2007 |
| WO | WO 2008-001322 | 1/2008 |
| WO | WO 2008-082587 | 7/2008 |
| WO | WO 2008-125657 | 10/2008 |
| WO | WO 2009-082759 | 7/2009 |
| WO | WO 2009-092115 | 7/2009 |
| WO | WO 2010-102222 | 9/2010 |
| WO | WO 2010-102259 | 9/2010 |

OTHER PUBLICATIONS

Zheng et al. (Secure DRM Scheme for Future Mobile Networks Based on Trusted Mobile Platform, 2005 IEEE, pp. 1164-1167).*
Lazouski et al. (A Survey of Usage Control in Computer Security, IIT TR—Dec. 2008, Dec. 2008, 21 pages).*
U.S. Appl. No. 14/570,301, filed Dec. 15, 20014, Shah et al.
3rd Generation Partnership Project, 3 G P P T R 3 3 . 8 2 , 0 v 8 . 3 . 0 "Technical Specification Group Service and Systems Aspects; Security of H(e)NB; (Release 8)," Dec. 2009.
3rd Generation Partnership Project, 3 G P P T R 3 3 . 8 2 0 v 1 . 3 . 0 , "Technical Specification Group Service and Systems Aspects; Security of H(e)NB"; (Release 8), Jan. 2009.
3rd Generation Partnership Project, (3 GPP)TS 33.310 V9.1.0, "Technical Specification Group Service and System Aspects; Network Domain Security (NOS); Authentication Framework (AF)" (Release 9), Dec. 2009.
3rd Generation Partnership Project, (3 G P P ) T S . 3 3 . 3 1 0 V 8 . 2 . 1 , "Technical Specification Group Service and System Aspects; Network Domain Security (NOS); Authentication Framework (AF)" (Release 9), Mar. 2008.
3rd Generation Partnership Project, (3 G P P ) T S 3 3 . 2 3 4 V 8 . 1 . 0, "Technical Specification Group Service and System Aspects; 3G Security; Wireless Local Area Network (WLAN) interworking security (Release 8)", Mar. 2008.
3rd Generation Partnership Project, (3 G P P) T S 3 3 . 2 3 4 V 9 .0 .0 , "Technical Specification Group Service and System Aspects; 3G Security; Wireless Local Area Network (WLAN) interworking security (Release 9)", Sep. 2009.
3rd Generation Partnership Project, (3 G P P ) T R 3 3 . 8 1 2 V 9 .0 .0 , "Technical Specification Group Services and System Aspects; Feasibility Study on the Security Aspects of Remote Provisioning and Change of Subscription for M2M Equipment"; (Release 9), Dec. 2009.
3rd Generation Partnership Project, (3 G P P ) T R 3 3 . 8 1 2 V 9 .0 .0 , "Technical Specification Group Services and System Aspects;

(56) References Cited

OTHER PUBLICATIONS

Feasibility Study on the Security Aspects of Remote Provisioning and Change of Subscription for M2M Equipment"; (Release 8) Sep. 2008.
3rd Generation Partnership Project, (3 G P P ) T S 3 2 . 5 8 3 V 9 . 2 . 0 , "Technical Specification Group Services and System Aspects; Telecommunication management; Home Node B (HNB) Operations, Administration, Maintenance and Provisioning (OAM &P); Procedure flows for Type 1 interface HNB to HNB Management System (HMS)", (Release 9), Dec. 2009.
3rd Generation Partnership Project (3GPP), S3-090159, "pCR for Text on Device Validation in the Conclusion Section", Nokia Siemens Network, 3GPP TSG SA WG3 Security, SA#54, Firenze, Italy, Jan. 19-23, 2009, 3 pages.
3rd Generation Partnership Project (3GPP), TR 33.812, V0.0.2, "3rd Generation Partnership Project; Technical Specification Group Services and System Aspects; Feasibility Study on Remote Management of USIM Application on M2M Equipment; (Release 8)", Oct. 12, 2007, 14 pages.
3rd Generation Partnership Project (3GPP), TR 33.812, V1.2.0, "3rd Generation Partnership Project; Technical Specification Group Services and System Aspects; Feasibility Study on Remote Management of USIM Application on M2M Equipment; (Release 8)", Nov. 1, 2008, 61 pages.
$3^{rd}$ Generation Partnership Project (3GPP), TR 33.820 V1.3.0, 3rd Generation Partnership Project; Technical Specification Group Service and System Aspects; Security of H(e)NB; (Release 8), Jan. 2009, 75 pages.
3rd Generation Partnership Project (3GPP), TR 33.820, V1.2.0, "3rd Generation Partnership Project; Technical Specification Group Service and Systems Aspects; Security of H(e)NB; (Release 8)", Dec. 2008, 67 pages.
3rd Generation Partnership Project, "System Architecture of HNB (Release 8)", 3GPP TSG RAN WG3 Meeting, Sophia Antipolis, France, Jun. 11-12, 2008, 1 page.
3rd Generation Partnership Project: Technical Specification Group Service and System Aspects; Security of H(e)NB; (Release 8), 3GPP TR 33.820 V2.0.0, SP-090130.zip,URL, http://www.3gpm2.org/ftg/tsg sa/TSG SA/TSGS 43/docs/, Mar. 4, 2009.
Gallery and Mitchell, "Trusted Mobile Platforms", Foundations of Security Analysis and Design, IV; Lecture Notes in Computer Science, Springer Berlin Heidelberg, Berlin, Heidelberr, Aug. 18, 2007, pp. 282-323.
International Patent Application No. PCT/US2010/026384: International Search Report, dated Sep. 2, 2010, 15 pages.
International Patent Application No. PCT/US2010/026436: International Search Report, dated Sep. 2, 2010, 18 pages.
Kaufman, "Internet Key Exchange (IKEv2) Protocol," Network Working Group, RFC-4306, Dec. 2005.
Pearson, et al. (Trusted Computing Platforms: TCPA Technology in Context by: Siani, Pub. Date: Jul. 22, 2002), Chapter 6, pp. 106-107.
Pearson, et al. (Trusted Computing Platforms: TCPA Technology in Context by: Siani, Pub. Date: Jul. 22, 2002), p. 39.
Pearson, et al. (Trusted Computing Platforms: TCPA Technology in Context by: Siani, Pub. Date: Jul. 22, 2002), Chapter 6, pp. 106-109.
Sailer et al, "Design and Implementation of a TCG-Based Integrity Measurement Architecture," Proceedings of the 13th USENIX Security Symposium, 2004.
Schmidt et al ., "Trust for Location-based Authorisation," IEEE Communication Society, 2008.
TCG, "TCG Mobile Reference Architecture", Specification Version 1.0, Revision 1, Jun. 12, 2007, 87 pages.
TCG, "TCG Specification Architecture Overview", Specification, Revision 1.4, Aug. 2, 2007, 54 pages.
Trusted Computing Platforms: TCPA Technology in Context, Siani Pearson, et al., Jul. 22, 2002, Prentice Hall; pp. 40,50,52,57,59,60,111'143,144,153,184,209.
Trusted Computing Challenges. AMD Presentation, Leendert van Doorn, Nov. 2007.

Trusted Computing Group, "TCG Mobile Reference Architecture," Specification version 1.0, Revision 1 ,Jun. 2007.
Trusted Computing Group et al, "TCG Specification Architecture Overview Passage", TCG Specification Architecture Overview, Trusted Computing Group, US, No. revision 1.2, Apr. 28, 2004.
U.S. Appl. No. 12/718,572: Non-final office action dated Jun. 21, 2012,15 pages.
U.S. Appl No. 12/718,572: Final office action dated Dec. 19, 2012,15 pages.
U.S. Appl. No. 12/718,480: Final office action dated Sep. 27, 2012, 16 pages.
U.S. Appl. No. 12/718,480: Final office action dated May 22, 2013, 15 pages.
U.S. Appl. No. 12/718,480: Non-final office action dated Jun. 7, 2012, 20 pages.
U.S. Appl. No. 12/718,480: Non-final office action dated Mar. 4, 2013, 17 pages.
Van Dijk et al, "Securing Shared Untrusted Storage by using TPM 1.2 Without Requiring a Trusted OS. Technical Report", MIT CSAIL CSG Technical Memo 498, May 2007.
Van Doorn, "Trusted Computing challenges", AMD Presentation, Nov. 2007, 45 pages.
Yoshihama, "Platform Trust Based Access Control Framework," The 2006 Symposium on Cryptography and Information Security, 3B2 Access Control, 3B2-5, SCIS 2006 Organizing Committee, Japan, Jan. 17, 2006.
European Application No. EP 15 19 3998: Extended European Search Report dated Mar. 16, 2015, 9 pages.
Japanese Application No. 2015-011755: Notice of Rejection dated Jan. 12, 2016.
Korean Application No. 10-2015-7030014: Office Action dated Feb. 2, 2016, 5 pages.
$3^{rd}$ Generation Partnership Project (3GPP) TS 33.320, 9.0.0, $3^{rd}$ Generation Partnership Project ; Technical Specification Group Services and System Aspects; Security of Home Node B (HNB) /Home Evolved Node B (HeNB) (Release 9) Dec. 2009, 31 pages.
Balfe et al, "Challenges for Trusted Computing", Research Workshop on Challenges for Trusted Computing at: $3^{rd}$ European Trusted Infrastructure Summer school [ETISS Sep. 2008], Feb. 26, 2008, 1-24.
Korean Application No. 10-2015-7026996: Office Action dated Jun. 21, 2016, 1-4 pages.
3rd Generation Partnership Project (3GPP) TSG SA WG3 Security-S3#55, S3-090746, Shanghai, China, May 11-15, 2009, 4 pages, www.3GPP.org-/ftp/tsg_sa/WG3_Security/TSGS3_55_Shanghai/docs.
3rd Generation Partnership Project (3GPP) TSG-SA3-Security-SA3#57, S3-091947, Dublin, Ireland, Nov. 16-20, 2009, 4 pages, www.3GPP.org-/ftp/tsg_sa/WG3_Security/TSGS3_57_Dublin/docs.
Japanese Application No. 2015-159857: Notice of Rejection dated Sep. 6, 2016, 6 pages.
Korean Application No. 10-2014-7014163: Notice of Allowance dated Oct. 31, 2016, 1 page.
Park et al, "Trusted Computing Technology and TCG Standard Trend", ETRI, Electronics and Telecommunications Trends, 3(4), Aug. 2008.
Korean Patent Application No. 10-2015-7026996: Notice of Allowance dated Jan. 24, 2017, 1 page.
Korean Patent Application No. 10-2016-7032791: Office Action dated Mar. 17, 2017, 5 pages.
Enns, R., "NETCONF Configuration Protocol", Network Working Group, RFC 4741, Dec. 2006, 95 pages.
Wang et al, "A New Remediation Model Based on Trusted Network", Dec. 13-17, 2008 International Conference on Computational Intelligence and Security, IEEE, Dec. 2008, 242-245.
Korean Patent Application No. 10-2017-7010662: Office Action dated Jul. 28, 2017, 4 pages.

* cited by examiner

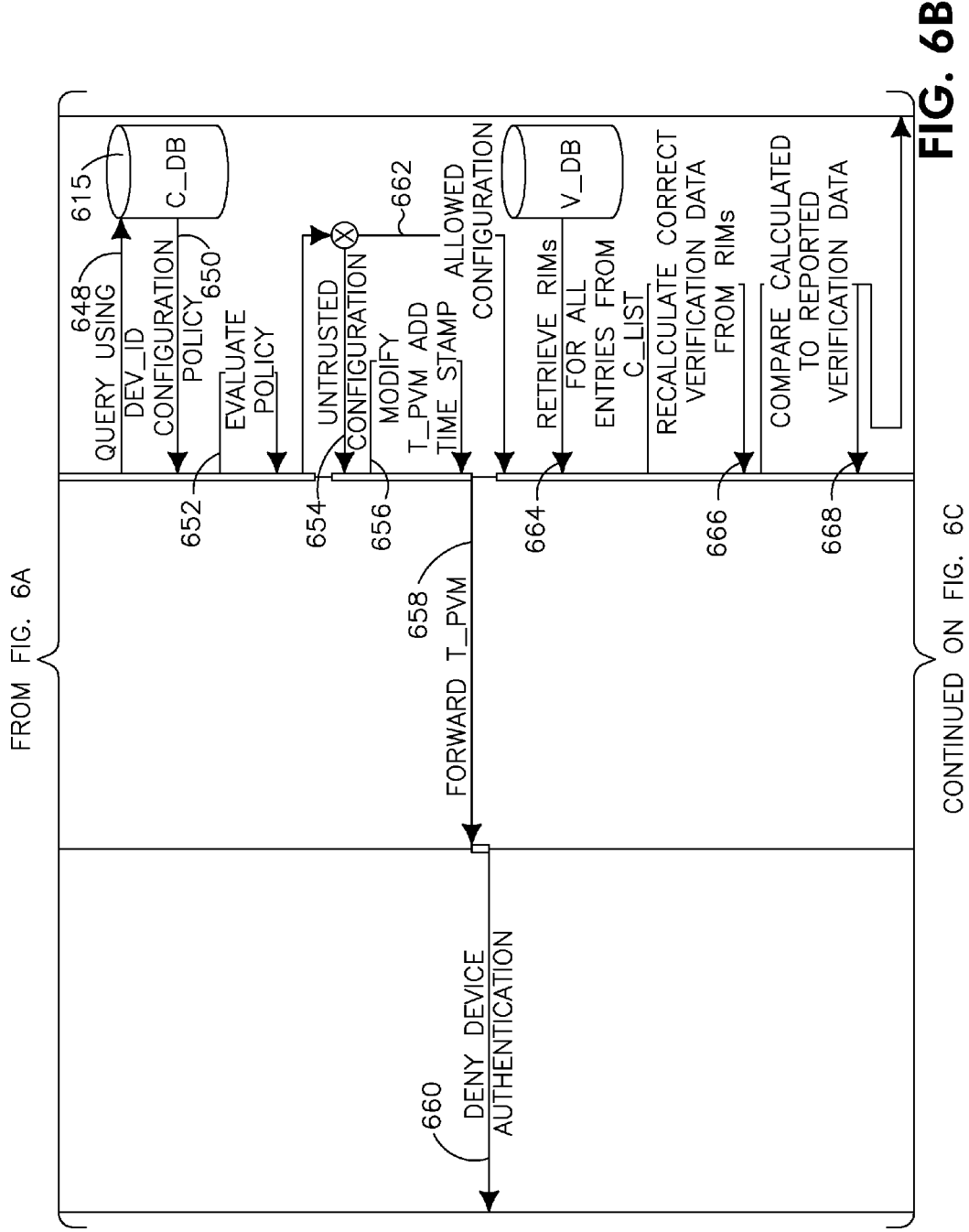

PLATFORM VALIDATION AND MANAGEMENT OF WIRELESS DEVICES

CROSS REFERENCE TO RELATED APPLICATIONS

This application claims the benefit of U.S. patent application Ser. No. 12/718,480 filed Mar. 5, 2010, which claims the benefit of U.S. provisional application No. 61/158,242 filed Mar. 6, 2009; U.S. provisional application No. 61/173,457 filed Apr. 28, 2009; U.S. provisional application No. 61/222,067 filed Jun. 30, 2009; and U.S. provisional application No. 61/235,793 filed Aug. 21, 2009, which are all incorporated by reference as if fully set forth herein.

TECHNICAL FIELD

This application is related to communications.

BACKGROUND

Existing or standardized technology of mobile communication networks may not provide methods for the network to authenticate and validate the integrity of devices or provide methods to manage and provision such devices. Similarly, devices needing to attach to a network may not have the ability to authenticate that the network it is connecting to be actually a valid or trusted provider network.

SUMMARY

Methods, components and apparatus for implementing platform validation and management (PVM) are disclosed. PVM implementation provides the functionality and operations of a platform validation entity with remote management of devices by device management systems such as a home node-B management system. Example PVM operations bring devices into a secure target state before allowing connectivity and access to a core network.

BRIEF DESCRIPTION OF THE DRAWINGS

A more detailed understanding may be had from the following description, given by way of example in conjunction with the accompanying drawings wherein:

FIGS. 6A, 6B and 6C show a signal diagram of an example method of validation using a platform validation entity;

DETAILED DESCRIPTION OF ILLUSTRATIVE EMBODIMENTS

Figure 1:
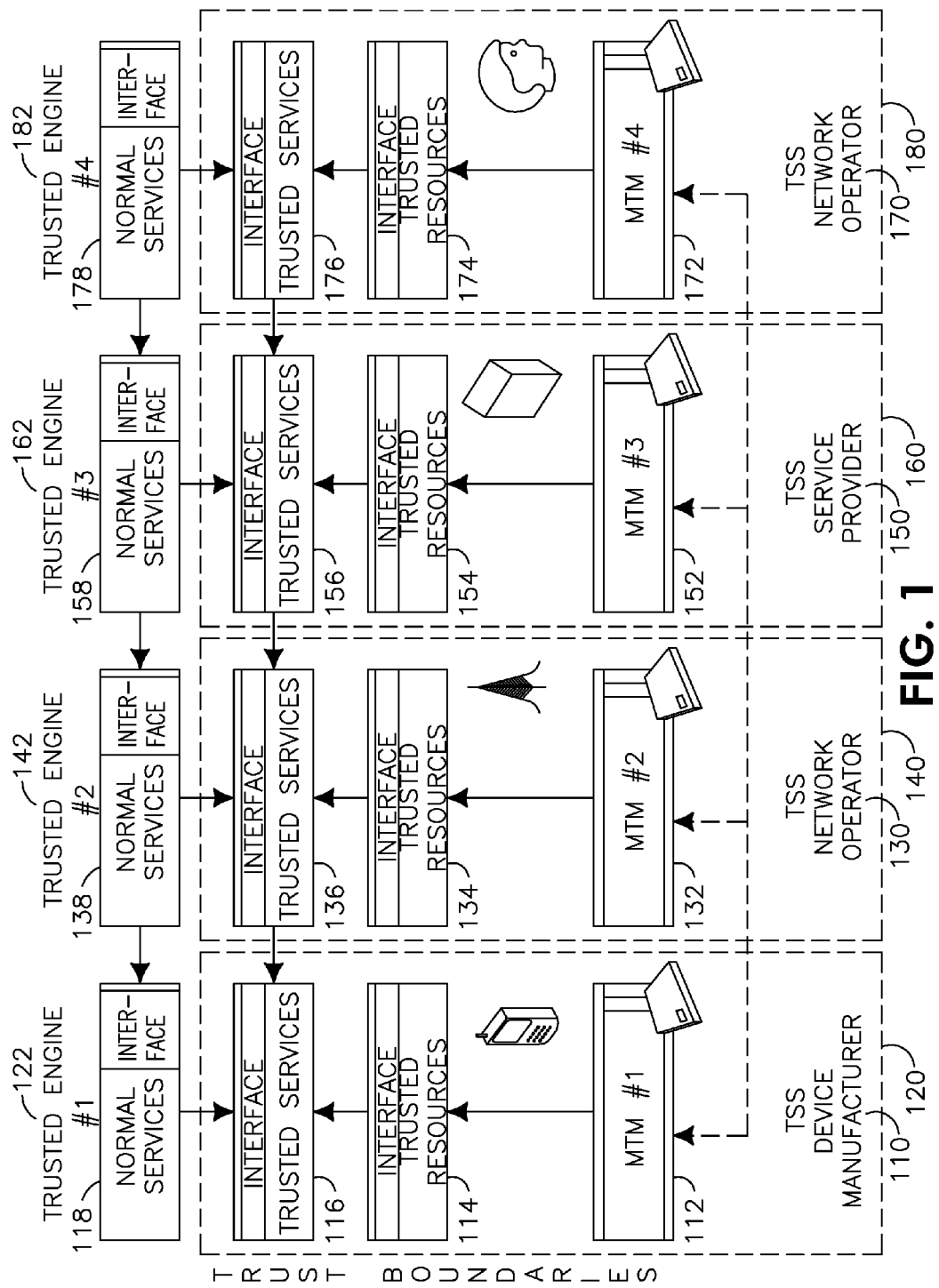
FIG. 1 shows an example block diagram showing domain separation of trusted subsystems.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), a gateway, a customer premise equipment (CPE), or any other type of interfacing device capable of operating in a wireless or wireline environment. When referred to hereafter, the terminology "HMS" includes, but is not limited to, a Home NodeB Management System (HMS), Home Enhanced-NodeB Management System (HeMS), where the two may be collectively referred to as H(e)MS, a Device Management System (DMS), a Configuration Server (CS), an Auto Configuration Server (ACS), or any other type of system that manages configuration or functionality of a "base station". The terms "WTRU" and "base station" are not mutually exclusive. For example, a WTRU may be an enhanced Home Node-B (H(e)NB). When referred to hereafter, the term "information-theoretically secure" includes but is not limited to perfectly secure, unconditionally secure, and nearly information-theoretically secure. When referred to hereafter, the terms "trust", "trusted", and "trustworthy", as well as variations thereof, indicate a quantifiable and observable manner of assessing whether a unit will function in a particular manner.

Methods and apparatus for implementing platform validation and management (PVM) are disclosed. PVM provides the functionality and operations of a platform validation entity (PVE) with remote management of devices by device management systems such as a home node-B management system (HMS). The PVM operations bring devices into a secure target state before allowing connectivity and access to a core network (CN).

The PVM operations are self-contained and concurrently allow for many variants, and manifold embodiments in different technical contexts. Example mappings to protocols, such as the Internet Key Exchange (IKE), are provided for special cases where it may be necessary to describe an embodiment, but are not to be interpreted as limiting or restricting the overall scope of this disclosure. The PVM is also not restricted to H(e)NBs, although they are used in some places as examples. PVM extends without change of concepts, and with straightforward technical adaptations, to machine to machine (M2M) and other wireless and/or networked devices.

The description is top-down, in the sense that the architecture from the outset assumes the availability of most of the central concepts of Trusted Computing technology relating to, but not limited to, the technical standards specified by the Trusted Computing Group (TCG). For example, an embodiment described herein relies on a secure start-up executed by a Trusted Environment (TrE) and Reference Integrity Metrics (RIMs) to build a base for all operations and method of the PVM. This does by no means exclude further variant realizations based on less trusted technology. Other embodiments may avoid using RIMs in various steps of the PVM.

In general, PVM embodies notions of trust integrated into a synthetic definition of trust in technical systems, wherein the emphasis is on means for establishing trust in systems. PVM uses de-centralization and separation of duties as core paradigms. This permits scalable trust as is needed for evolving communication networks and the Internet, where nodes become ever more heterogeneous and connections more ephemeral.

The following consistent operational interpretation of trust is applied to the relations and interactions between technical systems such as PVM and between technical systems and human beings: "An entity can be trusted if it predictably and observably behaves in the expected manner for the intended purpose". The operational interpretation has three salient features, namely, predictability, observability and contextuality.

Predictability designates a priori knowledge about a system that may be used to a) assess the risk incurred in interacting with that system, and b) allow obtaining knowledge about the system during the interaction by reasoning on observations. Observability specifies the means by, and extent to which knowledge about a system can be gained in interactions. It is closely linked to predictability, in that observations, together with predictions yield further knowledge on a systems state and future behavior. Contextuality designates information delineating the scope of interactions with the system in which predictions hold and observations can be made. Taken together, they allow an assessment of the trustworthiness of it, or reciprocally, the risk it poses to an interacting entity.

There is a conceptual gap between trust and enforcement, caused by the lack of means to establish operational trust. Such has become more obvious with growing heterogeneity of interconnected systems beyond client-server relationships. In such environments, and given the state-of-the-art of (security) technology, neither enforcement nor the operational view of trust can be realized. Systems lack a) ubiquitous technical means to establish operational trust, b) overarching infrastructures for enforcement, and c) means to convey information on trustworthiness, and applicable security levels to external entities. Only these basic building blocks can enable a dynamical balancing of trust and enforcement reflecting real-world requirements, that is, scalable trust in systems.

PVM is also built upon the building blocks described herein. The building blocks of a trusted system establish its trust boundary, and sometimes provide methods to extend it, and to convey trust to an outside entity by making its behavior and operation predictable and observable to a certain extent. The building blocks may include (hardware) security anchors, Roots of Trust (RoT), Trusted (Sub-) systems and ownership, secure storage and paths, authorization, authenticated and secure boot processes, and attestation. By combination of these methods, systems and various components therefore can be constructed which combine characteristics of trust and enforcement in manifold ways, and thus enable a scaling of technology between these two poles. The basic functional building blocks are described below.

A hardware security anchor is important to the protection of the system behavior. This is a part of the system which is protected against unauthorized access by hardware measures known to be secure enough for the intended purpose to effectively mitigate risks of attacks against it. It holds, in particular, the RoT for its secure operation. The RoT is an abstract system element which enables a) securing of the internal system operation, and b) exposing properties and/or the identity (individually or as a member of a group such as make and model) of the system to external entities in a secure and authentic way.

A system may contain more than one RoT for distinct purposes. Examples of RoTs are asymmetric key pairs together with digital certificates of a trusted third party for them. Also, the symmetric secrets of Subscriber Identification Module (SIM) cards in cellular networks may be viewed as RoTs for the closed, trusted system embodied by the SIM card.

Secondly, functional building blocks in a system that are assumed to be trusted, i.e., to behave in a well-defined manner for the intended purpose, form the Trusted Computing Base (TCB) of the system. The TCB comprises such components of a system which cannot be examined for their operational trust properties when the system is deployed in the field and during operation, but only by out-of-band processes like compliance and conformance testing, and certification. This kind of certification is usually carried out by an independent evaluator, for instance on behalf of the manufacturer of a certain technical element of the TCB or the TCB as a whole, according to established security evaluation standards. For such a certification to be useful, the TCB, respectively, its elements should be endowed with information identifying them as such certified pieces of technology.

A system equipped with defined security anchor, RoTs, and TCB is called a Trusted System (TS). This is a slight refinement of the common notion of Trusted Platforms which is "a computing platform which has a trusted component, probably in the form of built-in hardware which it uses to create a foundation of trust for software processes". When one or more trusted systems reside within a TS, they are called Trusted Subsystems (TSS). Examples comprise virtual execution environments on a personal computer platform which inherit a certain trustworthiness from the Trusted Platform Module hardware (TPM) of the host. Another example is the specification of a trusted engine, together with its TCB. In the following, 'TS' is interchangeably used as a shorthand for 'TS or TSS' where not explicitly stated otherwise. A TS may be implemented in various devices as illustrated in FIG. 1.

Below, various capabilities, processes, and architectural elements, summarized under the term trusted resources (TRs), of a TS are described. Two kinds of TRs must be generally distinguished: 1) TRs which belong to the TCB; and 2) TRs which are outside the TCB. Examples for the latter are trusted parts of the operating system, and trusted applications which build on the TCB by using its capabilities. While assertions about the trustworthiness of the TR in the TCB depend on the defined security of the TCB, the trustworthiness of the other TRs can, at most, be derived from that of the TCB. In such a case, the TCB must provide certain internal TRs that allow extension of the trust boundary, i.e., the totality of components of a TS that are considered trustworthy in a given context, to the TRs outside the TCB, for instance authenticated or secure boot as described below. TRs within the TCB often share the same hardware protection with the RoT, for instance, reside on the same tamper-resistant chip. TRs outside the TCB may be realized as logical units in software. Note that the trust boundaries, especially involving TRs that are outside of the TCB, may be ephemeral. They may exist for some time for certain purposes, and then may cease to exist afterwards.

A general model of a process to extend the trust boundary beyond the TCB is verification. This is itself a TR implementing the verification process. This is identified as the verification process and the corresponding TR verification entity, or verifier, to distinguish it from the process of validation of a TS by an external entity, i.e., the validator. Verification as a process includes a new component in the trust boundary that may come in at least two different forms. First, the verifier measures a new component at the time of its initialization. That is, the component, its status and configuration is uniquely identified. The result of this measurement is then stored. As an extension of this, the verifier may compare the measurements with reference values and decide whether or not to extend the trust boundary. That is, the verifier may make and enforce a policy decision. From the operational viewpoint, verification corresponds to predictability of the TS, as it can be assumed to be in a certain, pre-defined state after the verification process is completed. Validation, on the other hand, makes this property observable and therefore trustworthy. It means that a reporting entity transfers the results of verification to another party. The third, intermediate step performed by the reporting entity is that of attestation. Attestation is a logical consequence of verification and a logical precondition for validation. It is the process of vouching for the accuracy of measurement information, such that a relying party—the validator—can use it to decide whether it trusts the remote TS. Verification, attestation, and validation are core concepts for operational trust, which are tied to the lifecycle of a TS.

A TS is owned by an entity (a person or other technical system) who or which is authorized to access certain TRs within the trust boundary, for instance the RoT. Ownership may be implicitly realized by physical possession of the TS, i.e., the platform containing it, or explicitly, for instance, by authentication of the owner through certain credentials. In the context of the Trusted Computing Group (TCG) Trusted Platform Module (TPM) specifications, the provisioning of such authentication data is called taking of ownership. An owner interacting directly with a TS is called a local owner, whereas an owner whose interaction with the TS is mediated in any way, e.g., through a communication network, is called a remote owner. When more than one TSS is contained in a TS, each may or may not have a different owner.

FIG. 1 shows the separation of computing domains of several TSSs 110, 130, 150 and 170. TSSs 110, 130, 150 and 170 each consist of dedicated Mobile Trusted Modules (MTM) 112, 132, 152 and 172, respectively. The hardware security anchor of Mobile Phone Work Group (MPWG) specifications contains the mentioned RoTs, TRs (trusted resources 114, 134, 154 and 174) and trusted services 116, 136, 156 and 176. The normal software services and components 118, 138, 158 and 178, are outside the trust boundary 120, 140, 160 and 180, respectively. The so called trusted engine 122, 142, 162 and 182, respectively, in which all these reside is a secure computing environment, based on the RoTs providing, in particular, separation and controlled communication between different TSS 110, 130, 150, and 170, respectively. TSS can share TRs and even functions of MTMs with other TSS, conditioned by inter-domain validation and authorization. Trusted engines, but also some of the MTMs, may be realized in software as long as at least one hardware protected RoT is present from which the RoTs of the software based MTMs are derived. Each TSS may be under the control of a local or remote stakeholder or owner. In the lifecycle of a mobile device, not all stakeholder TSS are present and processes exist in which a (remote) stakeholder may initialize the creation of a new TSS and take ownership of it.

PVM is, in part, based on the establishment of trust. Between trust and enforcement, the main bridging concept is separation of duties. Separation of duties is normally understood as referring to duties on enforcement. But there is a natural relationship to trust. The relying party may delegate the enforcement to the other system only if it is operationally trustworthy. The establishment of operational trust between TS rests on the controlled exchange of information to enable observability and the pre-establishment of predictability. The latter can only be done outside of the TS.

Figure 2:
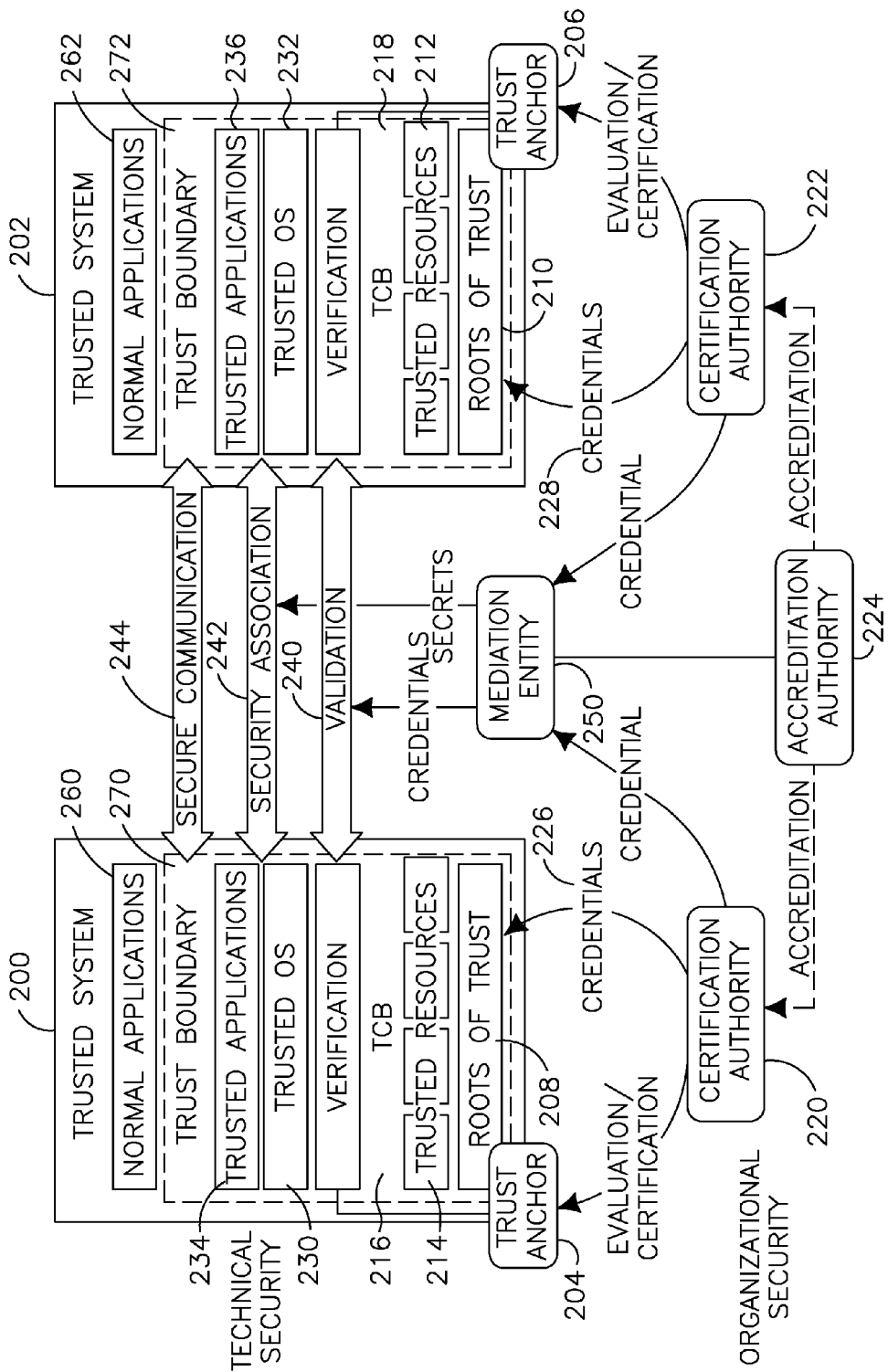
FIG. 2 shows an example block diagram showing trust between platforms is mediated by organizational and technical methods.

FIG. 2 shows an example model exhibiting the roles of external entities providing organizational assurance to TS 200, 202. TS 200, 202 includes normal applications 260, 262 external to trust boundaries 270, 272. Within the trust boundary 270, 272 is a TCB 216, 218 which in turn includes RoTs 208, 210 and TRs 212, 214. The trust boundary 270, 272 can further include trusted operating systems 230, 232 or parts thereof which need protection and trusted applications 234, 236.

The security properties of a TS 200, 202 are rooted in the hardware trust anchors 204, 206 and the RoTs 208, 210. These technical components cannot be examined while the system is deployed and operational. Therefore, they undergo a security evaluation during design and development. This is performed by an independent authority which, upon successful evaluation, issues certificates of security to the manufacturer of the security critical components.

Apart from RoTs 208, 210 and trust anchors 204, 206, security processes may also include other TRs 212, 214 in the TCB 216, 218 and involve different certification authorities 220, 222. To ensure the homogeneous quality of evaluation processes and the different certification authorities, they are in turn assessed and certified by accreditation authorities 224, which may, for instance, be para-statal or private entities with state permits. The accreditation authorities 224 may also serve to provide bridging information between certification authorities 220, 222.

Certification authorities 220, 222 or technical entities informed by them, issue credentials 226, 228 to TS 200, 202 used by the TRs 212, 214. These credentials 226, 228, are certificates in the sense that they are verifiable in their integrity and provenance. A prime example is the Endorsement Key (EK) certificate issued to the TPM's main RoT (the EK) by its manufacturer, as well as the Platform Certificate and other components' certificates. These credentials and secrets derived from them by cryptographic means, are then also used in the interaction with external entities, in particular other TS'. Validation 240 of the TSs 200, 202 generally needs authentication and, in many cases, also confidentiality. Furthermore, secrets and credentials with trust inherited from the TS credentials are essential for operating systems 230, 232 and trusted applications 234, 236 to build security associations 242, 244, respectively, that is, channels which provide authentication, confidentiality, and integrity of communication. On top of security associations 242, 244, applications within the extended trust boundary can build secure communication channels with well defined operational trust properties.

A mediation entity 250 facilitates trust establishment between the various interactions shown in FIG. 2. A Privacy Certification Authority (PCA) is an example of a mediation entity 250. Mediation entity 250 issues fundamental statements about the trustworthiness of a TS to another TS or relying party. The mediation entity identifies the TCB 216, 218 or selected elements, e.g., the trust anchor 204, 206 as such, as trusted and certified components. To this end, the mediation entity 250 needs to know the certificates issued by the certification entities, verify them when it receives it from a TS, and issue an assurance statement to a relying party. The mediation entity 250 may facilitate subsequent security association and secure communication, similarly to a Certification Authority (CA) in Public Key Infrastructures (PKI).

The building blocks for trust establishment as is needed for PVM are described herein.

Verification is, in essence, a recording and controlling of state changes of a TS to the desired granularity. As such, it may be tightly bound to the operational cycle of the platform on which a TS resides, from initialization to shutdown. Therefore, practical verification methods are mostly integrated with the boot process and operational cycle of platforms that are implemented by on or more processors of the physical device, such as the WTRU.

One method for the internal verification of a TS is authenticated boot, and uses capabilities of the TCB to assess the trustworthiness of loaded or started software or hardware components at the time the TS is initialized, e.g., when powering on a WTRU. Authenticated boot is realized by starting certain functions of the RoT and the TCB before starting other parts of the TS. These parts operate as a RoT for Measurement (RTM). This means that components that are started or loaded later on, are measured, i.e., they, and their status and configuration after start are uniquely identified, e.g., by forming cryptographic digest values (e.g., cryptographic hash values) over a (binary) representation of hardware component's embedded code and loaded programs. According to the specific requirements, the measurement values may be stored in secure storage. Together with data necessary to retrace the system state from them, e.g., software names and versions, they form the Stored Measurement Log(SML) of the TS. On PC platforms, authenticated boot may include all components from the BIOS to the Operating System (OS) loader and the OS itself.

In an example of an authenticated boot, a system state is measured by a reporting process, with a TPM as central authority, receiving measurement values and calculating a unique representation of the state using hash values. For purposes of clarification, the TPM may receive 1) a hash value of an application or file, i.e., the application's measurement value, calculated by an external (software) implementation, or 2) the TPM may calculate the hash value, i.e., the measurement value itself using an internal hash algorithm implementation. For this, the TPM has several protected Platform Configuration Registers (PCRs). Beginning with the system initialization at power-up, for each loaded or started component a measurement value, e.g., a hash value over the BIOS, is reported to the TPM and stored securely in the SML, using the RTM. Concurrently, the active PCR is updated by an extend procedure, which means that the measurement value is appended to the current PCR value, a digest value is built over this data, and stored in the PCR. In this way, a transitive chain of trust is built containing all started and loaded components. Where a single PCR stores only one value, it can only provide "footprint-like" integrity validation data. This value allows a validator to verify this chain of trust by recalculating this footprint, only in conjunction with the SML.

Secure boot is an extension of authenticated boot. It is of particular importance for devices like set-top boxes or mobile handsets that necessarily have some stand-alone and offline functional requirements. The common characteristic of devices equipped with secure boot is that they are required to operate in a trustworthy set of states when they are not able to communicate assertions on their trustworthiness to the exterior, e.g. before network access. In secure boot, the TS is equipped with a local verifier (a verification entity) and local enforcer supervising the boot process, which establishes the combination of a Policy Enforcement Point (PEP) and Policy Decision Point (PDP) to control the secure boot process. The local verifier compares measurement values of newly loaded or started components with Trusted Reference Values (TRVs) which reside in the TCB, or are protected within the TS by a TR, e.g., they are located in protected storage space, and decides whether they are loaded, started, or not started. Thus, the system is ensured to boot into a defined, trustworthy state.

Trusted reference data is data which is used to compare validation data to known good values. Those values, which constitute trusted reference data, are called Trusted Reference Values (TRVs). Their best-known example is Reference Integrity Metrics (RIMs), as specified in the TCG's MPWG specifications. They may be used genuinely, a) by the platform itself in secure start-up, to ensure that only components whose measurements conform to a TRV are started, or b) by the validator, to compare validation data to known good values and thereby assess the platform state in validation. The term RIM may be used in the description as a non-limiting example of a trusted reference data.

As such, trusted reference data becomes trusted through certain security assertions about it, which are verifiable by the validator or the agent using the TRV in question. Such verifiable assertions may be realized for instance by digital certificates issued by a trusted third party (TTP), giving rise, in the example, to the so called RIM certificates. The trust assertions of trusted reference data may also contain additional information for instance about external evaluation (e.g., according to a Common Criteria Evaluation Assurance Level, EAL) of a component or platform.

It is important to note a dual aspect of TRVs. On the one hand, they serve the local verification in a secure boot process. For that, they are complemented by a TRV provisioning infrastructure that allows, for instance, updates of measured components, by provisioning of new TRVs corresponding to the updated software to the TS. For an external entity to validate a TS after secure boot, it needs to compare the received validation data, for instance the so called event structure with stored TRVs and to verify the associated TRV certificates. Thus, TRVs and according certificates play an important role not only in verification, but also in validation.

Freshness of the attestation information is an important issue for validation. This necessitates extending the verification process from boot to operation time of the TS, which is a technically hard task in complex open systems.

The mentioned separation of duties is also present on the process of validating a TS. Namely, based on the result of verification, the trustworthiness of the system may be assessed and, accordingly policy decisions may be made in the validation. The separation of tasks in this process between TS and validator leads to three categories of validation. A common base concept needed for any kind of validation is first described herein.

A validation process of a TS must be supported by a validation identity which is exhibited to the validator. The validation identity must come directly or indirectly from a RoT, namely a RoT for Reporting (RTR). Validation may not be possible without a mediator. This validation identity provider has the task to assert that the holder of the validation identity is a TS. Provisioning of a validation identity is an extension of identity provisioning in identity management (IdM) systems. The provider has to perform checks on credentials of the TS, including some or all TRs in the TCB, to assess if the TS is in a trustworthy state for validation. Furthermore, the provisioning of validation identities must be performed in a secure process, e.g., a security protocol on a dedicated secure channel. In case of remote validation, the validation identity may coincide with a global identity of the TS.

Validation using unique persistent validation identities is important with regard to security. Validation may occur frequently and indiscriminately to many validators for varied purposes. Though the validation identities used may each not be easily associated to a user identity, they generally allow a tracing of the TS' behavior. Using the same validation identity for a group or all TS is not an option to resolve this for security reasons. Such a group identity would be a single point of attack/failure, that is, if one TS of the group is compromised, then all others cannot perform validation any more as well. The other option is to use ephemeral validation identities generated, for instance, once in each boot cycle, with determined frequency, or generated by the RTR for each validation.

Autonomous validation is a procedure where the validation of the TS by an external validator is implicitly done based on an assumption that the verification of the TS must have been performed entirely locally, i.e., within the confines of the device itself, i.e., in a way that does not depend upon external entities. In this case, successful verification is assumed to have occurred before the TS will allow further communication attempts with the exterior or other operation. Thus, the verification process is assumed to be absolutely secure in this case, as no direct evidence of the verification is provided to the outside world. The outside world makes the assumption that, due to the way in which TS are specified and implemented, a TS which fails verification will be prevented by its TCB from performing other tasks that would be visible to the external world, e.g., attaching itself to a network or obtaining an authenticated connection to a remote entity. Autonomous validation lays all enforcement duties on the TS.

Autonomous validation is applying a closed, immutable system model to the TS, which is essentially the trust model used in smart cards. The TS verifies itself using the TCB, and the result is a binary value of "success" or "failure". Validation is then an implicit process by which the TS allows certain interaction with the exterior, such as a network attachment. A typical example is the release of an authentication secret, e.g., a cryptographic key, by a smart card.

Security resting only on devices has been broken in the past and is more likely to be broken as, for instance, mobile devices become open computing platforms. Autonomous validation delivers little information for advanced security requirements; in particular, if the TS is partially compromised, the exterior cannot gain any knowledge about its state. Labeling of rogue devices is therefore impossible, meaning that an exploit might proliferate without being noticed and cause significant damage to other stakeholders, such as network operators, before it can be contained. Autonomous validation may be realized in such a way that verification is reactive to certain conditions, e.g., by not allowing certain functions, or by closing the device down and going to re-boot, depending on failure policy. This avoids network connection and seems advantageous. But this is also a vector for denial-of-service (DoS) attacks. The device must not attach to the network in a compromised state and, thus, has little chance to revert to a secure state. Remote management is also difficult; specifically there may be a loss of security in software download and installation since it potentially delivers values (software, secrets) to rogue devices. Thus, autonomous validation is prone to entailing out-of-band maintenance. For instance, failure of the update of software of a TR may lead to a state in which network connection is impossible.

With autonomous validation, the freshness of the attestation data is not by itself guaranteed. For this security property to be fulfilled, autonomous validation may have to take place automatically on every system state change. As autonomous validation happens infrequently in practice, e.g., during network attachment, the TS' state may change significantly during operation of the TS, in a manner unobservable by the validator. Thus, an attacker may use this gap, for instance, to introduce malicious software. Autonomous validation is extremely prone to this kind of timing attack.

In remote validation, the validator directly assesses the validity of the TS based on the evidence for the verification it receives. The verification is only passive in this case, and the full SML must be conveyed to the validator. The model case for this is verification by authenticated boot and following validation. All policy decisions rest with the validator.

The current state of the art for validation technology is remote validation and particularly that of TCG remote attestation. In a remote attestation, a TCG trusted platform exhibits SML and PCR, the validation and verification data of remote attestation, signed by an Attestation Identity Key (AIK) to the external validator. The AIKs are ephemeral asymmetric key pairs, certified by a PCA which acts as validation identity provider. The pseudonym provided in remote attestation may not be sufficient in all cases. The TCG has additionally defined Direct Anonymous Attestation (DAA), which is based on zero-knowledge proofs.

As both remote and autonomous validation are extremes of a spectrum of options which are subsumed in semi-autonomous validation, remote validation also has disadvantages. Remote validation as represented by remote attestation, poses practical problems with respect to scalability and complexity, as it lays the full computational load for validation on (central) access points to networks or services. In particular, the validation of an SML may be very costly for platforms like personal computers with a large number of software and hardware components in numerous versions and configurations. This also requires an enormous database of TRVs such as RIMs, together with an infrastructure, to let stakeholders define the desired target configurations of TS'. The same arguments make remote management of a TS, i.e., the controlled and validated change of configuration, impractical with remote validation. Furthermore, run-time verifications are desirable with remote validation, as otherwise only the state after boot is exhibited to the validator. The SML can be "withered" at time of validation. Thus, run-time verification becomes meaningless if it is not directly followed by validation, which would necessitate very frequent remote validations. Finally, remote validation of complex open TS' compromises privacy, in spite of usage of a PCA, since the revealed SML might be almost unique to a TS. A similar, economic argument is the possibility of discrimination by remote attestation, that is, the threat that only recent versions of software of major vendors enters into TPV databases such as RIM databases, forcing users of other programs to switch to these or loose service access. Some of the disadvantages may be alleviated by refined forms of remote attestation, such as semantic or property-based attestation, aiming at exhibiting the characteristics of components rather than a concrete implementation.

Semi-autonomous validation is another procedure where the TS' validity is assessed during verification locally on the device within itself without depending on external entities, and policy decisions are made during verification. But in this case, certain information, herein called a "validation message", such as the result of the verification and required evidence, is signaled to the validator, who can make decisions based on the content of the validation messages from the TS. The signaling from TS to validator must be protected to provide authentication, integrity, and confidentiality if desired. A model case for semi-autonomous validation is secure boot, followed by a signaling of the event structure and indication of TRVs, such as RIMs, to the validator. Semi-autonomous validation distributes verification and enforcement tasks between TS and validator. Specifically, in secure boot, the former makes decisions at load time of components, while the latter can enforce decisions on the interactions permitted to the TS upon validation, based on the state evidence provided.

Semi-autonomous validation may provide advantages over the other two options. It may potentially transport the validation information more efficiently in the form of indicators of the RIMs used in verification. This may also be used to protect privacy, for instance, when such an indication designates a group of components with the same functionality and trustworthiness (such as versions). This is similar to semantic and property-based attestation, and semi-autonomous validation may be combined with the mentioned advanced forms of remote validation. The interplay of enforcement in verification on the part of the validator also provides options for remote management of a TS.

On the path to technical realization remediation may be utilized, to obtain "support for the isolation and remediation of ARs (Access Requestors) which do not succeed in obtaining network access permission due to failures in integrity verification." This allows, in principle, bringing the AR up to date in all integrity-related information, as defined by the current policy for authorization. Examples include OS patches, Antivirus (AV) updates, firmware upgrades and other similar software or firmware updates. Concrete concepts for realization of remote management may have to rely on an infrastructure for the efficient representation and communication of TRV information, such as RIM information, as is described herein for PVM.

It is important to emphasize the role played by RIM certificates in semi-autonomous validation. RIM certificates are provided by a certification authority which has assessed, directly or by delegation, the corresponding TR. Certification methods and bodies may be diverse and lead to different levels of operational trustworthiness. This leads to further flexibility for a semi-autonomous validator who gets more fine-grained information on the TS. As noted herein, RIM certificates are used as an example for data that may support an on-device validation of components. Although a RIM certificate based SAV method is described herein, other SAV variations may be used.

Semi-autonomous validation is also the only practical validation option for systems which are resource limited so that a) they lack the processing capabilities to do autonomous validation, and b) lack the memory and/or communication capabilities to perform the extensive reporting needed for remote validation. For example in the context of wireless sensor networks, both limitations may hold for the sensor nodes. Under these circumstances, one approach is to send memory probing code to the sensors that calculate a digest value of the static memory content (code and parameters) which leads to a predictable result which is returned to the base station for validation. An attacker could obviously try to circumvent this "attestation" by using saved, original memory contents to produce the correct outcome. As long as this attack is performed on the sensor itself it will, however, inevitably lead to delays which can be enhanced by randomization, self-modifying probing routines, and obfuscation methods. Thus, if a significant delay in the sensor's answer occurs above a certain threshold, the sensor is invalidated.

In semi-autonomous validation, a H(e)NB's validity is assessed internally during secure start up without depending on external entities, and policy decisions are made during this assessment, in particular on which components to load/start and which not, based on their measured integrity. In semi-autonomous validation, the result of the assessment and required evidence are signaled to a platform validation entity (PVE), which may make its own decisions based on the content of the validation messages. The signaling to the PVE should be protected to provide authentication, integrity, and, if desired, freshness and confidentiality. Semi-autonomous validation distributes integrity verification and enforcement tasks between H(e)NBs and external validating entity such as the PVE. Specifically in secure boot, the H(e)NB makes decisions locally at load/start time of components, while the PVE can enforce decisions on the interactions permitted to the H(e)NB upon validation, based on the state evidence provided. Depending on the result of the PVE's decision, either full access to a network and services is granted or more limited measures such as quarantined network access and forced configuration changes may be provided.

Figure 3:
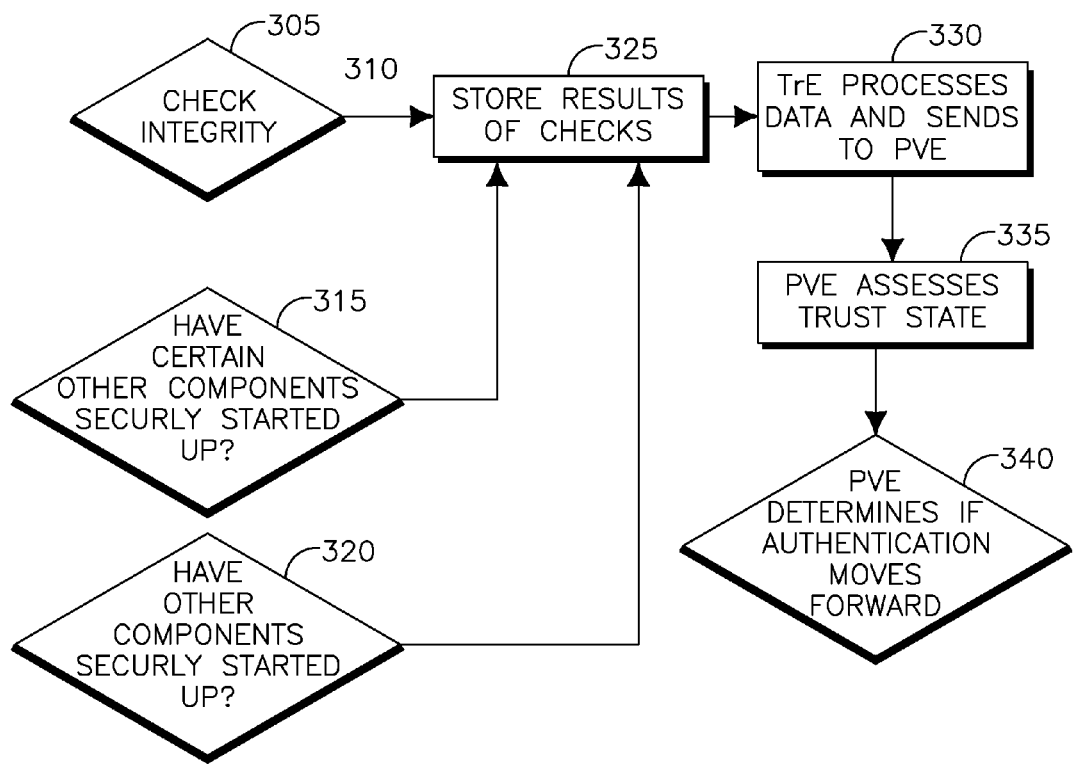
FIG. 3 shows an example flowchart of semi-autonomous validation with a home enhanced node-B (H(e)NB)

A trusted entity called the trusted environment (TrE) is important for semi-autonomous validation. Procedures for semi-autonomous validation may be various. In one embodiment, the H(e)NB may perform a semi-autonomous validation of the integrity of the H(e)NB as illustrated by flowchart 300 of FIG. 3. Before proceeding to perform a device authentication procedure, the TrE of the H(e)NB first performs a check of the integrity of certain pre-designated components (such as boot codes) of the H(e)NB (305). The integrity check results are then recorded or stored at least temporarily (310). This may be initiated autonomously by the TrE itself before the first instance of authentication (for the purpose of setting up a secure backhaul link, for example) after power-on of the H(e)NB. This may be considered as 'secure boot'. The TrE ensures the integrity of the H(e)NB by enforcing that only registered components may be loaded and/or started into an integrity-proven state. If the trust built needs to be reassessed, for instance because of a change in configuration of the H(e)NB that is made after a previous successful network connection session, then this check of the attainment of the integrity-proven start-up state may reoccur in two ways. In the first case, the check may be initiated autonomously by the TrE itself. Alternatively, it may be initiated by a request from the network (e.g., a Secure Gateway (SeGW) or platform validation entity (PVE)), which request the TrE is then required to fulfill.

The TrE may then check if a pre-defined portion of the rest of the H(e)NB has achieved a state of secure start-up (315). Further checks may take place either by the TrE itself or by a measuring component in the H(e)NB external to the TrE but integrity-protected by the TrE (320). In such later-stage checks, integrity of other components, configurations, or parameters of the rest of the H(e)NB is checked when they are loaded or started, or at other, pre-defined run-time events, wherever such are available to the measuring component. The secure start up check results are recorded or stored at least temporarily (325). The secure start-up check results as well as the integrity check results are recorded, preferably, in ways that utilize protected storage provided by the TrE or other forms of integrity protection such as keyed hash values.

As a further variant, the results, i.e., the single measurements themselves, may additionally be equipped with secure time-stamps to provide freshness and replay protection for the measurements themselves, in addition to the freshness already provided in the protocol with the PVE. Such a freshness information may for example be achieved by including the value of the time-stamp into the measurement by concatenating the values before applying the hash function and then storing the result in a protected register, for instance a PCR.

The TrE then processes the results of the checks to form a validation message out of such results, to be conveyed to the PVE (330). The PVE, upon receipt of such a message, may then use it to assess the trust state of the H(e)NB (335). In one processing embodiment, the TrE signs a statement, using a signing key protected by the TrE and hence protecting the integrity of the statement, that the H(e)NB has passed an autonomous validation check. The statement may also include evidence that may be used by the PVE to assess the state or result of the integrity check performed by the TrE on the pre-designated components of the H(e)NB and may also include evidence of any binding between the autonomous validation check and of a subsequent procedure of device authentication. The TrE may also put a time-stamp on such a statement to ensure freshness. Such a signed statement attests to the fact that the message that the TrE makes out of the re-ordered data or results and transferred to the PVE comes from the H(e)NB's TrE after a secure start up procedure. For the verification of the signature, the validation should be bound to device authentication, or otherwise a separate TrE identity should be used. This signing adds to the security of the purely autonomous validation check by adding some traceability, backed up by the fact that the results of the TrE's autonomous checks of the H(e)NB's start-up configuration are trusted.

The TrE forwards the signed statement to the PVE via the SeGW, which can then use the signed statement from the H(e)NB and may decide whether to allow the H(e)NB to move forward with authentication (340). The PVE may use information in the signed statement in various ways. In one embodiment, the PVE may check the integrity of the TrE itself against a single, static configuration, and reject access connections in case of failure. In another embodiment, the PVE may be configured to make fine-grained decisions on access control. That means in particular that access can be denied based on the presence/absence and integrity of single/multiple components inside or outside the TrE. In yet another embodiment, based on indications contained in the validation statement, the PVE may be configured to fetch information on the integrity and security properties of components of the H(e)NB from trusted third parties. This means that the PVE may be configured to fetch information on reference values, i.e. validation data, for components on the device. The information on actual integrity of components is then derived by the comparison process of validation data to the data received from the device. The PVE would not directly fetch the statements on component integrity from TTPs, but only TRVs to which the reported values can be compared. In still another embodiment, PVE may be configured to mandate configuration changes before allowing access. Such remediation procedures may include forced software updates.

As indicated, the TrE may be capable of making trusted and accurate time-stamps and can sign them with key(s) protected within or by it. In one embodiment the external validator could verify the 'time' when the local autonomous device integrity check was performed by the TRE. This may mean one time-stamp is taken at the time of the first or last measurement. It may alternatively mean that the time-stamp is applied at the time of the protocol run with the PVE. It may also mean inclusion of a time-stamp in every measurement. A desired 'time-granularity' may direct which alternative is applicable. In another embodiment, the TrE may be configured to insert two time-stamps, one taken before and the other taken after, the local autonomous device integrity check is performed by the TRE. Such a pair of time-stamps effectively 'binds' the range of time when the local autonomous device integrity check really occurred, and the TrE, by sending such time stamps along with the data that indicates the outcome or process of the local autonomous integrity check, may enable the external validator to not only assess the device integrity state but also know the temporal history of when and how the H(e)NB's integrity was measured and verified locally by the TrE. This may make it possible for the validator to use its own 'time windows' to determine how the signed statement it has received from the TrE regarding the state of the device integrity could be processed depending on the time when 1) such a statement was obtained (which is indicated by the second, later time-stamp) as well as the validator's own marking of the time when it received the time-stamped validation message, and 2) the local autonomous integrity check occurred (which is bound between the two times indicated from the two time stamps).

PVM may be employed to implement the strategies and methods described herein through PVM methods, apparatus and architecture described herein. PVM generally employs a maximal separation of duties between the active entities. This approach clearly defines the fields of activity of every entity involved in the platform validation and management processes. The advantages of a PVM approach are that: 1) each entity may be optimized for performance separately; 2) PVM enabled devices may operate (with limitations) asynchronously; 3) as far as possible for the network entities involved, PVM methods may be performed statelessly; 4) the entities may be separately be maintained and managed; and 5) redundancy and failover may be easier to implement. In particular, performance and availability are essential for the effective implementation of validation and remote management of devices. In concrete scenarios, there may be events of mass updates of device components or a large number of devices changing selected home operator (SHO). The PVM architecture may be configured to perform validation and management of a single device by one operator, usually the SHO. As an exception, special variants of PVM may have an impact on roaming access and operator change, as described herein.

PVM provides a systematic method to validate and manage devices, when they first try to attach to a communication network and subsequent monitoring of device integrity, relying in part on security technology from Trusted Computing. PVM provides: 1) validating a device before network connection; 2) managing device configuration over-the-air (OtA); 3) secure start-up by checking TRVs such as RIMs on component load/start; and 4) installing new TRVs (e.g., RIMs) on a device for configuration change—TRV ingestion.

In the example embodiments of PVM as described herein, the following technical assumptions and preconditions on the validating device and the network to which it validates. With respect to the network, it is initially assumed that all entities are operated by the same mobile network operator (MNO) as a part of the same core network (CN). Thus, additional security for the establishment of channels and the actual communication between these entities (for example mutual authentication, integrity protection of messages, encryption) may not be required. Wherever necessary, additional security features are described if they are of special use. However, the scope of the applicability of PVM is broader that such examples since the PVM approach may be utilized for entities outside of the MNO's CN or even hosted by another party than the MNO.

With respect to the device, the devices may come in many flavors and by many names. PVM is applicable to H(e)NBs of an Evolved Universal Mobile Telecommunications System (UMTS) Terrestrial Radio Access Network (E-UTRAN) network and machine to machine (M2M) devices, and may be applicable to many other networked devices satisfying certain preconditions. These preconditions are essentially those of a Trusted System (TS). Where PVM is applied, the various devices are configured to implement the PVM methods thereby becoming PVM devices.

Validation requires an identity, to which the device can authenticate, as a precondition for the validation process. This authentication, which is not to be confused with authentication of the device toward the CN (which may happen after validation, or bound to the validation process), is necessary to protect the PVM infrastructure from certain attacks by fake devices. This indicates, that devices are only admitted to PVM if they authenticate to device identity, preventing unknown devices, which are capable of performing the PVM protocols, to mount, for example, DoS attacks to the PVM system.

It does not matter, for the purpose of PVM, if the device identity Dev_ID is an identity bound to a Trusted Environment (TrE) in the device, a Universal Integrated Circuit Card (UICC) or smart card, or to the device, for example, an H(e)NB, itself. It is assumed that the device manages the authentication credential associated with Dev_ID securely, and is thus able to authenticate to Dev_ID. The Dev_ID may be a Fully Qualified Domain Name (FQDN), a Uniform Resource Identifier (URI), a Uniform Resource Locator (URI), a Uniform Resource Name (URN), a medium access control (MAC) address (such as, extended unique identifier (EUI-48), EUI-64), an IPv4 or IPv6 address, an IPv6 host identifier (such as the 64 LSBs) that comprises a subnet address, an International Mobile Equipment Identity (IMEI), an IMEISV (such as gsm/umts), an electronic serial number (ESN), a Mobile Equipment Identifier (MEID) (such as cdma), an International Mobile Subscriber Identity (IMSI), a Temporary Mobile Subscriber Identity (TMSI) (when the device can be identified by the subscriber because of a 1:1 mapping between subscriber and device), an IMS subscriber id (such as IP Multimedia Private Identity (IMPI) or IMS User Public Identity (IMPU)), a Mobile Station Integrated Services Digital Network (MSISDN), or any other identifier in any alphanumerical or machine-readable format which allows for the unique, such as global or at least domain specific, for example, for each operator, reliable and unambiguous identification of a single device.

The device may have a TrE that is trustworthy. The TrE in the device may be built in a secure start-up process from an immutable Root of Trust (RoT). It provides a secure execution environment and other essential, protected capabilities. The TrE may be a managed component, for example, not immutable, such that only the RoT remains immutable.

From the viewpoint of Trusted Computing, a TrE may be thought of as a TCB built from a TPM or M.TM. extended by some secure execution environment and certain protected interfaces. A TrE as a TCB built from TPM or M.TM. is used as a non-limiting example and other trust embodiments are applicable.

For PVM, the TrE provides a TCB that can unconditionally be trusted. However, and at variance with traditional trusted computing, the TCB constituted by the TrE is not immutable in PVM. It is for this reason that in PVM, the TrE and its surroundings in the device are distinguished. Specific, and different, information on both parts is transferred to the infrastructure and used to validate and manage them according to different policies. The TrE is the primary communication partner of the PVM infrastructure and is assumed to perform tasks associated with PVM correctly.

The H(e)NB and TrE may perform a device integrity check upon start-up and before connecting to the core network or the H(e)NB to a H(e)NB Management System (HMS). The device integrity check may be based on one or more trusted reference values and the TrE. The TrE may be required to securely store all trusted reference values at all times. The TrE may be required to start-up securely. The TrE may also be required to support either single-component or multi-component integrity check.

In a single-component integrity check, the TrE may be required to load the full code necessary for the trusted operation of the device as a single-component. Before starting this component, the TrE may be required to perform an integrity check, for example, by comparing a cryptographic hash measurement of the component to a stored trusted reference value, to determine the integrity of the component. If the single-component passes its integrity check, the component may be started. If the integrity check fails, the component may not be started.

In a multi-component integrity check, the full code base of the device that is necessary for trusted operation of the device may be segmented and ordered into several components based upon device functionality. The TrE may be required to load each component sequentially and before starting any individual component, the TrE may be required to perform an integrity check, for example, by comparing a cryptographic hash measurement of the component to a stored trusted reference value, to determine the integrity of the component. If the individual component passes its integrity check, the component may be started and the TrE may continue integrity checking the next component. If any component fails its integrity check, that component may not be started but the TrE may continue checking the integrity of the next component.

For each of the component integrity checks, the TrE may be required to retrieve the corresponding trusted reference value from secure memory, which provides integrity protection to the TRVs and compare the integrity measurement to the trusted reference value. Secure memory includes, but is not limited to, the protected storage of a TrE. The integrity of the device is verified if all components necessary for trusted operation of the device are verified.

Figure 4:
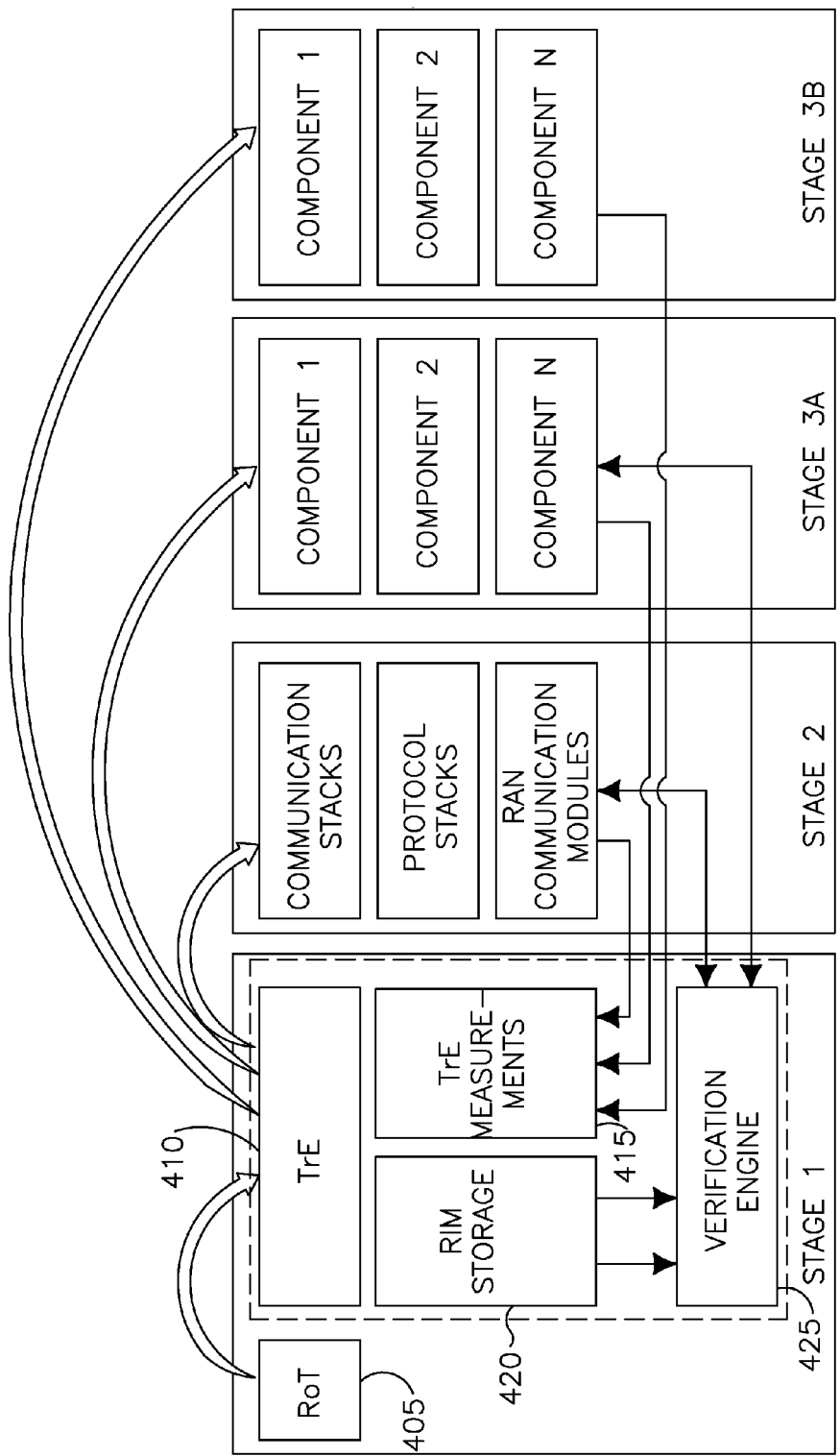
FIG. 4 shows an example flow diagram of a method of four-stage secure start-up.

With respect to secure start-up, secure start-up proceeds from the RoT to a full functional state in multiple stages by building a chain of trust. FIG. 4 shows an example flow diagram of a Four-Stage Secure Start-Up method 400. In Stage 1, the TrE 410 is built from the RoT 405 in a secure start-up. All components loaded or started are verified, and only those which pass verification, are loaded and started. Control is passed to the TrE 410 to perform stage 2 of secure start-up only if stage 1 is successful.

In Stage 2, the TrE 410 verifies, loads and starts further components which are essential for performing PVM. For example, this may comprise communication and protocol stacks, and radio access network (RAN) communication modules. All components loaded and started are verified, and only those which pass verification, are loaded and started.

Stage 3 of secure start-up is initiated only if stage 2 is successful. In Stage 3a, the TrE 410 verifies, loads and starts further components. Only components passing verification are loaded and started. In Stage 3b, the TrE measures and loads further components.

The verification of components is assumed to be performed by taking measurement values of them (represented by 415) and comparing them (represented by 425) to RIMs stored in RIM storage 420. As noted, FIG. 4 contains a RIM storage as an example or embodiment. However, as noted herein, RIMs and RIM certificates are one example form of structured data and other forms of structured data may be used. The description herein allows the use of variants and embodiments of structured validation data other than RIMs. The load order in all stages is assumed to be governed by a locally available list. The discrimination between components in 3a and 3b is assumed to be governed by a locally available policy. Optionally, loading and verification may be combined into one step.

In FIG. 4, the term "TrE" is used as a description of an entity that contains the minimal functions needed for PVM, which includes all facilities needed for secure start-up, such as measurement taking 415, RIM storage 420, verification engine to compare RIMs to actual measurements 425. It should be apparent that this description of the TrE is used for simplicity and a TrE may be more complex and include other components, such as a key generator or random number generator (RNG). The TrE, as shown, may include all the facilities needed to implement the secure start-up. The RIMs may be stored outside of the TrE but protected by the TrE for integrity and, optionally, confidentiality. The engines for measurements and verification may also be implemented as components external to the TrE. The TrE may then ensure the integrity of these components and provide a secure execution environment in a way that the components may not be modified.

Finer granularity based on policies is possible in stage 3. For instance, components may be loaded into a sandbox environment, if they fail verification or RIMs are unavailable. The differentiation between stages 3a and 3b is analogous to the one between trusted services and measured services in the secure start-up of the mobile phone work group (MPWG) reference architecture.

A fourth stage may be added for unverified components in "user space".

The failure of a single or multiple components in stage 2 (communication modules and other similar modules) does not imply that the devices are not able to communicate. The stages are understood as classes of components which belong to certain categories. As long as the most essential components of stage 2 are loaded, the device will be able to communicate its state and the failed components to the PVM system. This design allows the device to perform PVM (and thus remediation processes) without a restart if some of the components fail internal verification.

In another embodiment, a fallback code base (FBC) may be used that allows the device to perform PVM in the case that a compromise has been detected during secure start-up. The device will then upon detection of compromise reboot using the FBC and then start into a predefined state allowing device remediation.

During secure start-up, the TrE records and protects against tampering the following information: 1) a list of loaded components (Clist); 2) the parameters of loaded components; 3) measurement values related to some or all of the components; and 4) verification data, uniquely identifying, for example, cryptographically, the outcome of some, or all, measurements, such as the platform state. Depending on the validation method employed for PVM, some or all of these records may be optional. For example, autonomous validation (AuV) uses none of them.

PVM may use the following terminology. The term "verification" may be used for the internal verification of device components during secure start-up, while the term "validation" is used for the whole process of checking a device by an external entity. Thus, an introduction of "internal" vs. "external" validation is avoided. Where verification is applied in the usual sense of cryptographic checks or matching of data, this is explicitly noted so that no confusion should arise.

PVM uses at least a Security GateWay (SeGW), Platform Validation Entity (PVE), and a Device Management Service (DMS). Since the TrE in the device performs the validation critical tasks inside the device, generally the TrE communicates with the other entities. While other components of the device, for example network interfaces, which are needed for this communication are not necessarily an integrated part of the TrE, it should be possible for the TrE to assess the integrity of these components to ensure end-to-end security.

The strict separation of duties requires that each entity is restricted to its core tasks. For example, the SeGW builds the secure interface between the (un)trusted device and the MNO's CN. It acts as barrier and network access control and enforcement instance for the MNO's CN. It also performs all security related functions which are necessary to act as such a barrier, including authentication, encryption/decryption of communication with device, security association and session establishment. The SeGW may be used as an example of a network entity that builds the border between the MNO's CN and the outside world, such as an external device. It may be possible to perform device validation using PVM methods without the need of the SeGW. Doing so may include a direct connection of devices to the DMS using secured connections, such as Transport Layer Security (TLS).

With respect to the PVE, it acts as the validation entity in the CN and performs integrity validation. It receives integrity verification data and checks if reported values are known and good. It issues statements about device integrity to other entities in the CN.

With respect to the DMS, it acts as the central entity for management of device components including software updates, configuration changes, OTA management and failure mode remediation. The DMS is, in taking up this function based on platform validation, similar to an enhanced version of the HMS.

In addition to the entities above, PVM also includes a RIM manager (RIMman). RIMman performs the following tasks including management and provisioning of trusted reference data and TRVs for comparison in validation. It also manages certificates, in particular, ingestion of foreign RIM certificates, verification of RIM certificates, generation of (operator specific) RIM certificates, and check of certificate validity by, for example, revocation, time limits and trust relationships. That is, the RIM manager is the unique entity, which is authorized to manage the validation database (V_DB). The V_DB and RIMman are protected CN components. Write access to the V_DB is limited to the RIMman only, so that the PVE cannot write to the V_DB. The RIMman is of special importance with regard to security, because it manages the (SHO-CN) external trust relationships necessary for PVM. As noted herein, RIMman is an embodiment and is extendible to cover other embodiments of managers for reference values and certified reference values of (hierarchically) structured data.

The PVM also includes a Configuration Policy manager (CPman) that performs management and provisioning of device configurations. It also manages policies, in particular, ingestion of foreign configurations and policies, for example from a trusted third party (TTP) and generation of (operator specific) target device configurations and policies. That is, the CPman is the unique entity, which is authorized to manage the configuration policy database C_DB. The CPman is of special importance with regard to security, because it manages the (SHO-CN) external trust relationships necessary for PVM.

Figure 5A:
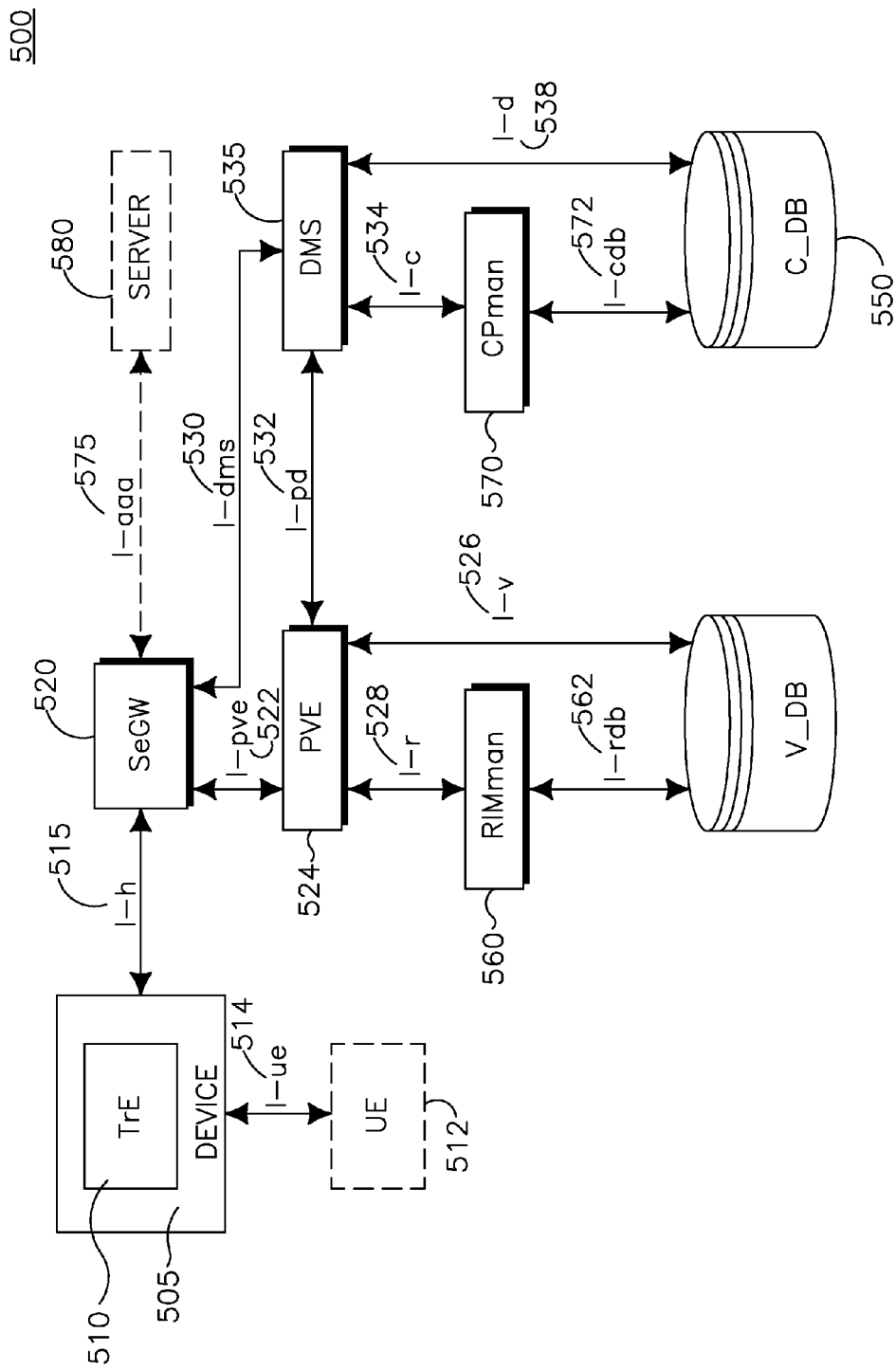
FIG. 5A shows a block diagram of an example set of entities and their relationships and interfaces for platform validation and management (PVM)
Figure 5B:
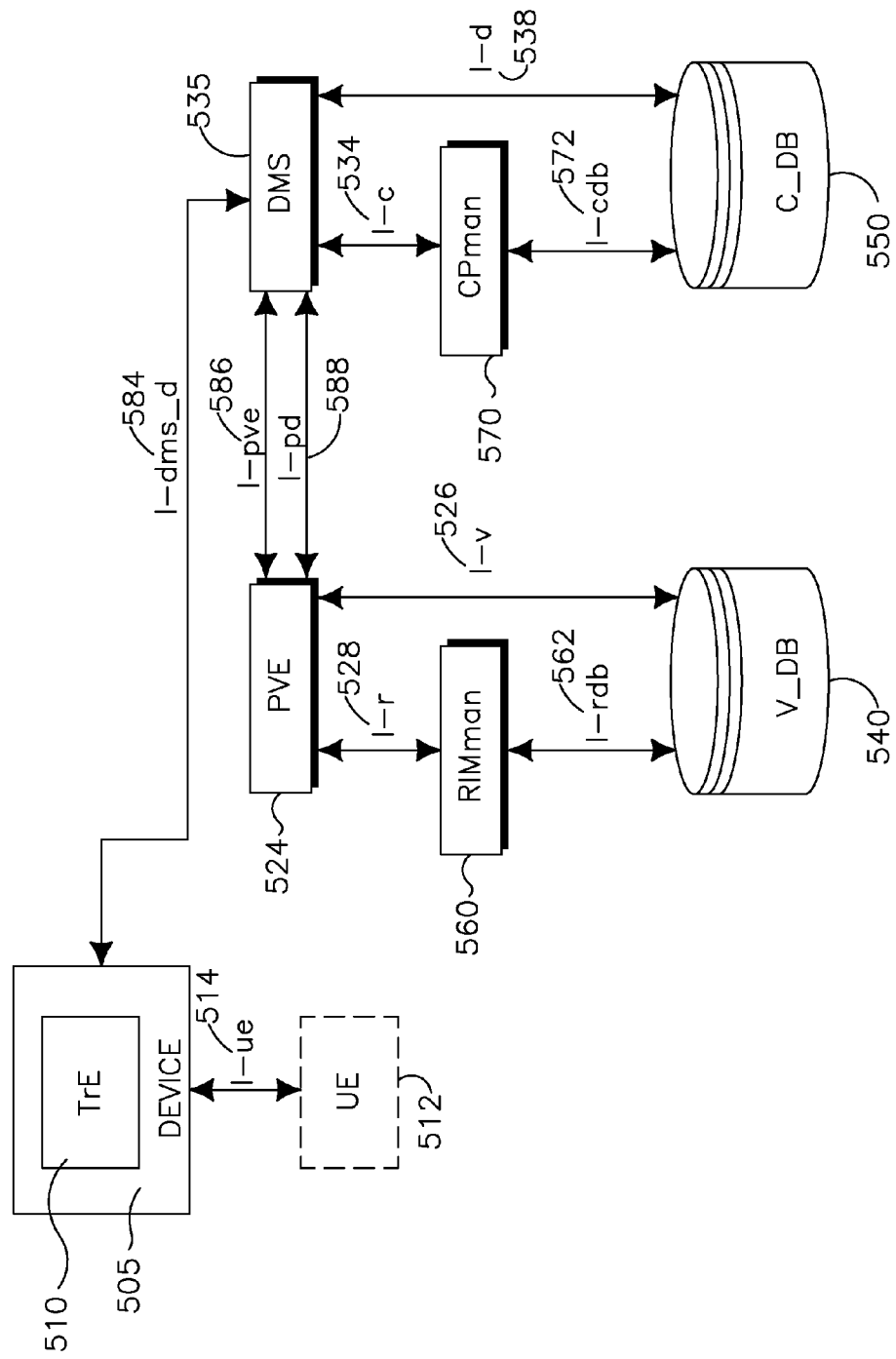
FIG. 5B shows another block diagram of an example set of entities and their relationships and interfaces for PVM.

FIGS. 5A and 5B show examples of the minimum set of entities, their relationships and interfaces for PVM. Additional entities, such as the Authentication, Authorization & Accounting (AAA) server and the wireless transmit/receive unit (WTRU) and their interfaces, are shown.

The PVM architecture or system 500 of FIG. 5A includes a device 505 having a TrE 510. A WTRU 512 may be in communications with device 505 via an I-ue interface 514. The device 505 communicates with a SeGW 520 via an I-h interface 515. In general, the interface I-h 515 between the device 505 and the SeGW 520 may be unprotected and special measures may be applied to secure this channel for authenticity, integrity and, optionally, confidentiality. I-h 515 may be used to establish the link between the device 505 and the SeGW 520 and thus the CN. For example, the SeGW 520 may communicate with a AAA server via interface I-aaa 575. The operator may have established appropriate measures to ensure the security of the interfaces.

An I-pve interface 522 may be used by the SeGW 520 to contact the PVE 524 during validation. The PVE 524 may use I-pve interface 522 to signal the outcome of validation to the SeGW 520. The I-dms interface 530 may be used for device configuration related communication between the DMS 535 and the SeGW 520. The I-pd interface 532 may be used by the PVE 524 to communicate with the DMS 535 and vice-versa. This interface, the I-pd 532, may be used during device management procedures, such as for device software updates and configuration changes.

The interfaces I-v 526 and I-d 538 may be used by the PVE 520 to read RIMs from the V_DB 540 and by the DMS 535 to read allowed configurations from the C_DB 550, respectively. The interfaces I-r 528 and I-c 534 may be used by the PVE 520 to communicate to the RIMman 560, such as in case of missing RIMs in the V_DB 540, and by the DMS 535 to communicate with the CPman 570. The RIMman 560 and the CPman 570 may use the interfaces I-rdb 562 and I-cdb 572 to read, write, and manage the validation of the database V_DB 540 and the configuration policy database C_DB 550, respectively.

FIG. 5B illustrates a PVM 582 where the device 505 may connect directly to the DMS 535. For example, in the case of a fallback mode in which the device 505 is not capable of performing the security protocols with the SeGW. In this case, the DMS 535 may act as the point of first contact for the device 505 via an interface I-dms_d 584 and communicate with the PVE 524 via interfaces I-pve 586 and I-pd 588 to perform a validation, or at least to get to know which components have failed during secure start-up. The DMS 535 may act upon this information for remediation.

In general, the respective components such as the device 505 that includes the TrE 510, the SeGW 520, the PVE 524 and the DMS 535 are all preferably configured to employ the PVM maximal type separation of duties approach between active entities. As explained more fully below, this may be facilitated through the use of PVM tokens to pass certain information between various entities.

As stated herein, PVM may use any version of validation. Described herein is an embodiment of semi-autonomous validation (SAV) that works with PVM. In this embodiment, the device contains a TrE and a RoT and is capable of a secure start-up. The device is equipped with RIMs, which allow for a local validation of TrE components and components outside the TrE. In this embodiment, the device may be a H(e)NB. As noted herein, RIMs are a form and example of structured data and is used as a non-limiting example herein.

The device may perform a secure start-up in 3 stages, ensuring that each component is loaded, if and only if the local validation of the component to be loaded is successful. In stage 1, the TrE is loaded via secure start-up relying on a RoT. In stage 2, all components outside the TrE which are required to perform basic communication with the SeGW are loaded. In stage 3, all remaining components of the device are loaded.

The device may then begin network authentication with SeGW. During authentication, one or more of the following data is sent: Dev_ID; security policies for the device; information on device modules which are integrity checked by the TrE during the secure start-up; hardware/software build version numbers; manufacturer of the device; model and version number; certification information on device and TrE; and TrE capabilities and properties.

Different options may apply for the sending of this data to the PVE (via SeGW). This data may be sent in the Notify field of the Internet Key Exchange Version 2 (IKEv2) authentication protocol and is then forwarded by the SeGW to PVE. The PVE then checks the received information. The PVE checks if the Dev_ID is listed in a blacklist, and if so, access is then denied. It checks if the security policies are mismatched with the desired policies for that device. If they are mismatched then remediation steps may be implemented. The PVE may check if unidentified/unwanted modules and components may have been loaded.

In each of the checks above, in the case of a positive answer indicating a failed verification of the TS of the device, the PVE may deny or otherwise limit (e.g., quarantine to restricted use or resources) network access for the device. PVE sends a message on the decision on the validity and trustworthiness of the device to the SeGW. SeGW acts in accordance with the message.

In a first variation, the data is stored at a trusted third party (TTP), and the device sends a pointer to the TTP from where the PVE may retrieve the desired information. The pointer may be sent in the IKEv2 Notify payload.

In a second variation, as long as all data is static, it may be included in the (possibly enhanced) device certificate during authentication. Any updates to components which imply changes to measurements and thus the RIMs used in secure start-up will require a new device certificate.

Described herein is an embodiment of a remote validation or full semi-autonomous validation (F-SAV) that works with PVM. In stage 1, the TrE may be built from the RoT in a secure start-up. All components of the TrE may be integrity verified and loaded upon successful verification. In stage 2, the TrE may verify the integrity of a predefined portion of the rest of the device and may load them. The integrity checked code may consist of, for example, basic OS, basic communications to SeGW, and the code which formats the performing PVM reporting messages. The measurement values may be stored in secure storage in the TrE.

If stage 1 or stage 2 checks fail, the TrE may block authentication from proceeding. If stages 1 and 2 are successful, stage 3 may proceed. For example, the remaining device modules of code, including, for example, radio access code, may be integrity checked but may not be loaded. The validation data may be prepared and sent to the SeGW in a suitable communication protocol. The data may be signed, for example, by a TrE stored key, to provide authenticity and integrity of the data. The data may include a list of stage 3 modules that have failed the integrity checks.

The data may be sent using the Notify payload of IKEv2 AUTH REQ message. The data in the Notify payload may be signed by the TrE's signing key to provide authenticity and integrity of that data in addition to the overall message protection provided by the IKE security association. The Notify payload may include a list of stage 3 modules that have failed the integrity checks. The validation data may be sent using any other suitable payload or field of a suitable IKEv2 message or any other suitable payload or field of a message of a suitable protocol other than those of IKEv2 protocol such as TLS, TR069, OMA-DM, HTTP, HTTPS or other similar protocols.

The SeGW may forward the data to the PVE for a decision. The authentication process may proceed but the decision to authorize the network connection may be delayed until after the PVE has inspected the validation message and made, or obtained, a network-based policy decision regarding any modules which have been reported as having failed the validation tests.

In a third variation, instead of measuring and executing the code, measurement and integrity verification of the code may be loaded without the code being loaded. The SeGW may forward the validation message to the PVE which may validate the received list. Upon receipt of a successful validation result from the PVE by the device, the remaining Stage 3 modules may be loaded.

The process of measuring the integrity and waiting for the PVE to decide whether the code can be executed may include providing that the code may not be changed once it has been measured and that it may be executed if PVE gives the authorization to do so. Thus a secure storage for all component code in stage 3 may be included. Additionally, the execution environment may support the authorized execution which allows code to be loaded first and execute it later after authorization. Large amounts of code may be loaded, thus, the secure storage and execution environment should be of adequate size.

The F-SAV may provide flexibility to the CN to be aware of what really went on in the "Local integrity checks". The device may send indication of pass/fail of stages 1 and 2 code and, optionally, a list of failed modules if any. The F-SAV may offer finer granularity and more visibility into device security properties and validation measurements, may allow local device resources comparable to autonomous validation, may provide for faster and easier detection of compromised devices, may support network-initiated remediation for compromised devices, and may provide for flexibility for operators in device security management.

The TrE may also put a time-stamp on messages to ensure freshness. An alternative to time-stamping may be for the network to supply a nonce to be used by the TrE for combining with the aforesaid message after the protocol for network access starts. That may also be a feature of binding the device authentication to the validation.

Remediation of authentication failure could be an activation of a fallback mode after initial failure, for example, of the Stage 1 or Stage 2 integrity checks allowing enough functionality for the device to attach to the SeGW to inform it of the failure. This could then trigger operation and maintenance (OAM) procedures to allow the device software to be updated upon diagnosis. The fallback code would need to have enough functionality to enable the complete rebuild of the code in a secure manner under the supervision of the TrE.

In a first variation, the measurement message data may be sent in the Notify field of IKEv2 AUTH Request (along with a device certification). In a second variation, the measurement message data may be sent by a suitable secure protocol prior to the start of the IKEv2 based device authentication. In a third variation, if any portion of Stage 1 or 2 checks fail and if the modules which fail are ancillary functions, not critical for basic device function, then the device may be allowed to proceed/attach without loading these modules. In the meantime, some OAM procedures may be scheduled to update the device software.

Provided herein is a high-level overview of the functions of all involved entities. The system architecture of H(e)NB devices is described where validation and remote management may play an important role. The described methods may directly be applied to the entities in the H(e)NB network architecture. By using a more general approach, with the definition of roles according to the separation of duties, the presented solution for platform validation and management may easily be applied or extended to other network connected devices. A transfer to other scenarios, such as M2M, may be implemented in a similar way if the entities are mapped according to their functions.

In the embodiment described herein of PVM functions, SAV is used. SAV allows CN to be protected completely from rogue devices. During SAV, a quarantine network may effectively be established by the SeGW. No direct threats are posed to PVE and DMS from the device, since they receive only data limited to their tasks and only over secure connections with the SeGW, or established by the SeGW. The validation process in the performing PVM does not require a direct communication between devices and any entity in the CN. Only after a successful validation using SAV, connections to the CN are allowed. This ensures that only devices in a proven secure state can communicate to entities inside the CN.

Figure 6A:
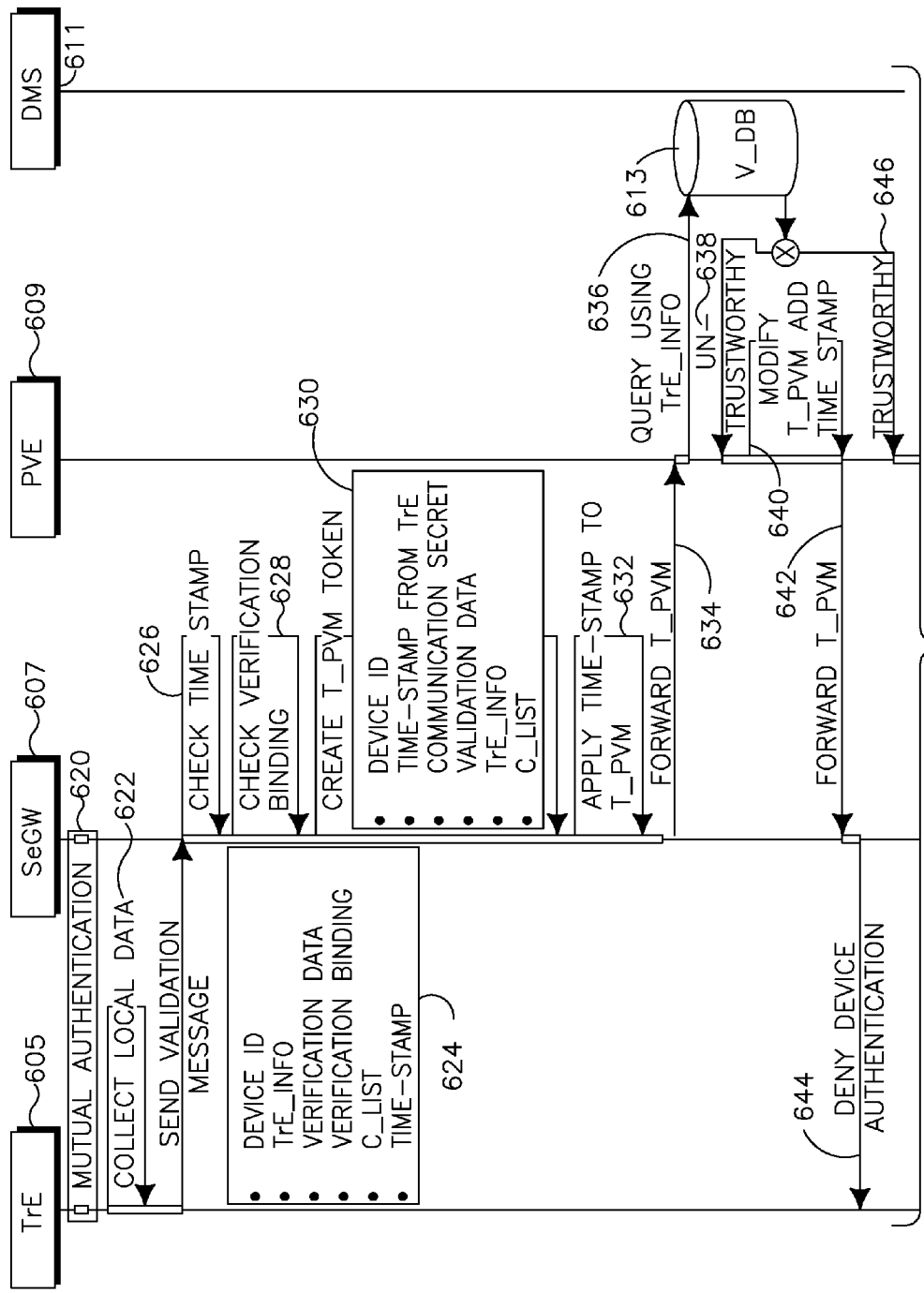
Figure 6C:
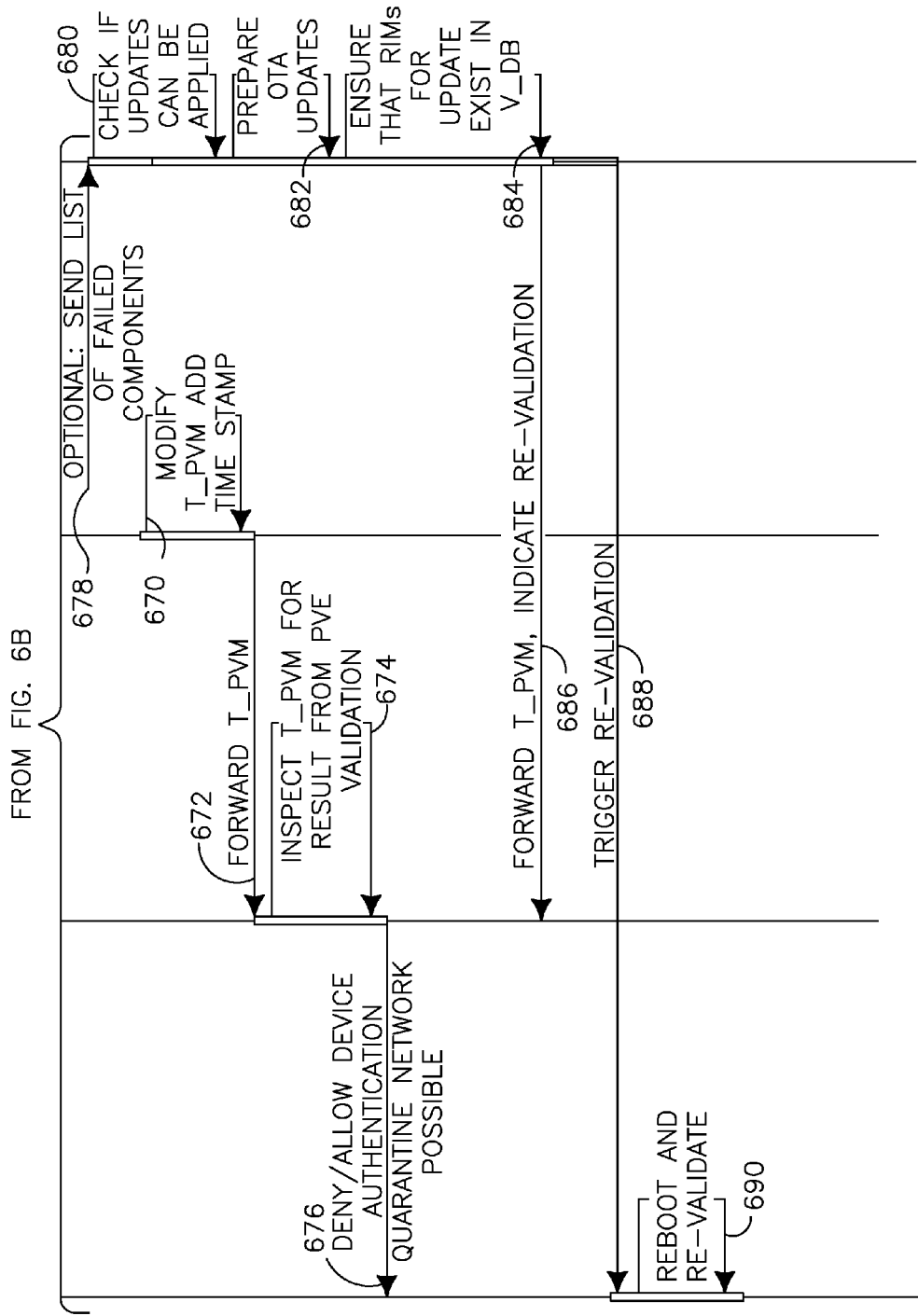

FIGS. 6A, 6B and 6C show a diagram of an example of a SAV validation method with a PVM infrastructure. The PVM infrastructure includes the entities described herein including a TrE 605, a SeGW 607, a PVE 609, a DMS 611, a V_DB 613 and C_DB 615. Following mutual authentication (620), the TrE 605 collects some or all of the following data: device information such as Dev_ID, manufacturer, Device capabilities including, but not limited to, communications capabilities such as data rates supported, transmit power levels, signaling features and other capabilities, TrE capabilities and properties including RoT; TrE_information including ID, certification info, manufacturer, build version, and model, make, serial-no.; verification data including platform configuration register (PCR) values; verification binding such as signature over PCR values; ordered list of component indicators (CInd) to components Clist and may include parameters for components; and time-stamps (trusted or not) (622). A validation message/data from the TrE 605 to the SeGW 607 may include the above date (624).

SeGW 607 shall check/compare timestamps received with local time to detect variations (626). If the reported time-stamp does not match the local time, the SeGW acts according to the properties of the reported time-stamp. If the device's time-stamp is a trusted time-stamp and shows a variation, SeGW 6070 should trigger a revalidation of the TrE and its trusted time source. In the case of a non-trusted time-stamp, the SeGW 607 adds its own trusted time-stamp to the message. If the device is not capable of providing trusted time stamps, the SeGW 607 may add a trusted time-stamp as a protection against replay attacks.

Upon receipt of this message, the SeGW 607 may check if verification binding if present (628). This ensures the authenticity of the verification data. The SeGW 607 then creates a PVM token (TPVM) (630) and applies a timestamp on the T-PVM before sending it to assure freshness and prevent asynchronous message flows (632).

SeGW 607 forwards the T_PVM to the PVE 609 (634) which in turn queries the V_DB 613 using TrE-info (636). If an untrustworthy determination is returned to the PVE 609 (638), the PVE then applies a time stamp to the T_PVM (640) and forwards it to the SeGW 607 (642). The SeGW 607 then stops the device authentication, prevents the network attachment of the device and alerts the TrE 605 (644).

If a trustworthy determination is returned to the PVE 609 (646), the PVE queries the C_DB using Dev_ID (648) which in turn returns a configuration policy (650) to the PVE 609. The PVE 609 evaluates the policy configuration (652).

If the PVE 609 determines that the configuration is untrustworthy (654), then the PVE 609 modifies the T_PVM and applies a time stamp (656). The PVE 609 then forwards the T_PVM to the SeGW 607 (658), which in turn stops the device authentication, prevents the network attachment of the device and alerts the TrE 605 (660).

If the PVE 609 determines that the configuration is trustworthy and allows the configuration (662), then the PVE 609 retrieves the RIMS for all entries in Clist or C_List from V-DB 613 (664). The PVE 609 recalculates the correct verification data from the RIMs (666) and compares the calculated verification data to the reported verification data (668). The PVE 609 then modifies the T_PVM and applies a time stamp (670). The PVE 609 then forwards the T_PVM to the SeGW 607 (672). The SeGW 607 inspects the T_PVM (or extracts from the T_PVM) for the PVE validation result (674). The SeGW 607 sends a denial or allowance of device authentication to the TrE 605 (676). If the PVE validation result is negative, then TrE 605 performs a re-boot and does a revalidation (690).

Optionally, after the PVE 609 compares the calculated verification data to the reported verification data (668), the PVE 609 may send a list of failed components to the DMS 611 (678). The DMS 611 determines if updates can be applied (680), and if so prepares the OTA updates (682). The DMS 611 also ensures that RIMs for the updates exist in the V_DB 613 (684). The DMS 611 sends the T_PVM with an indication for revalidation to the SeGW 607 (686) and a revalidation trigger to TrE 605 (688). TrE 605 performs a re-boot and does a revalidation (690).

Details with respect to the processing in FIGS. 6A, 6B and 6C are described herein. To perform platform validation, the TrE collects the following data, includes them in a validation message, and communicates it to the SeGW: device information such as Dev_ID, manufacturer, TrE capabilities and properties including RoT; TrE_information including ID, certification info, manufacturer, build version, and optionally model, make, serial-no.; verification data that may include platform configuration register (PCR) values or simply a list of components that have failed local verification or a list of functionalities affected by components that have failed local verification; verification binding such as signature over PCR values or the lists of failed components or affected functionalities; ordered list of component indicators (CInd) to components Clist and may include parameters for components; and time-stamps (trusted or not).

The ordered list of indicators to components and their parameters would contain entries such as the following data fields: index, component_indicator CInd, component_parameters. CInd gives a reference to the component and may be in URN format (for example URN://vendor.path.to/component/certificate). The list of components will serve to identify the RIMs for validation, for example, by pointing to RIM certificates, RIMcs.

In the case of the device, the validation message may additionally contain device information, such as, ID, certification information, manufacturer, model, version, make, serial-no., TrE capabilities and properties including RoT, security policies of devices and modules which are integrity checked at Stage (1,2,3), hardware (HW) build version number, and may include software (SW) version number and integrity measurement data.

If TrE-specific information is needed, it may be a description of how the TrE is implemented in the device. Also, TrE information may provide information on the device and separate information on the trust environment, for example, if the TrE is a certified IP component. So the certification authority for the device may be useful information.

Although the use of RIMs for validation is a preferred method for SAV, it is actually optional. It is used here as the base case, from which other options depart and deviate. For instance, there are validations without recalculating verification data from RIMs, and there is even the possibility to do the performing PVM completely without RIMs.

Verification binding is optional if validation message is bound to authentication, for example by a secure channel.

SeGW shall check/compare timestamp received with local time to detect variations. If the reported time-stamp does not match the local time, the SeGW acts according to the properties of the reported time-stamp. If the device's time-stamp is a trusted time-stamp and shows a variation, SeGW should trigger a revalidation of the TrE and its trusted time source. In the case of a non-trusted time-stamp, the SeGW adds its own trusted time-stamp to the message. If the device is not capable of providing trusted time stamps, the SeGW may add a trusted time-stamp as a protection against replay attacks.

The device and TrE_info may be optional. Dev_ID may give a reference to the device and TrE_info. Since not all MNOs will know the devices that may attach to the network and hence all TrE's, and thus all TrE_info data, such a mapping may be provided by a database which may be queried by the MNOs to obtain the TrE_info for any given Dev_ID. TrE_info may be in a TrE_certificate. The TrE_certificate should be signed by the vendor of the TrE or a TTP.

In a first variation, if no verification data/binding is included in the validation message, a simple version of the performing PVM may be implemented. This may be done if only the TrE's properties are to be verified. Policy decisions have to rely on the TrE_info and list of components only.

Mutual authentication between SeGW and device is a prerequisite for this variation. Otherwise trust issues will arise, if for example, the device changes operators. For instance, it could have received faked RIMs previously from a faked SeGW/MNO during remote management procedures.

The use of URNs as indicators to components is advantageous because it concurrently allows for this unique identification of a component and the location from where a RIM or a RIM certificate may be fetched.

During device validation, the device sends the validation message to the SeGW. Upon receipt of this message, the SeGW checks the verification binding if present. This step ensures the authenticity of the verification data. The SeGW then creates a PVM token (T_PVM). The token T_PVM may be used as a rolling token and is passed from entity to entity during communication. Every entity puts a timestamp on the token before sending it to assure freshness and prevent asynchronous message flows. Time stamps on the token may be used to provide a method to follow the state of the token. The token may travel in the CN from entity to entity, even in several rounds, and therefore may be tracked by the entities.

Optionally, the entity ID should be incorporated into the chain of time stamped data.

The T_PVM may contain the Dev_ID. If the original timestamp is not present or not trusted, the T_PVM may also contain a new timestamp issued by the SeGW. Otherwise the T_PVM may contain the original timestamp from the validation message.

Timestamps may be used to protect against replay attacks. They may be combined with, or even replaced by nonces or monotonically increasing counters. Timestamps may also be used to assess the freshness of validation data. The combination of both purposes is advantageous and may be provided by time-stamps.

It is assumed that all communication between SeGW, PVE and DMS is secure with respect to integrity, authenticity and confidentiality. Therefore, no measures to establish these security properties are mandatory for any internal message. Nevertheless, it is possible to apply appropriate measures to the complete message or parts of it if desired. Such measures could include encrypted communication channels, mutual authentication and signatures on messages. The SeGW maintains a token database T_DB containing all active T_PVM.

In a first variant, for later device management by the DMS, T_PVM may contain a communication secret for building a secure tunnel between DMS and TrE, for instance a TLS certificate.

The SeGW extracts the following data from the validation message: validation data, TrE info, and Clist. Before sending this data together with the token T_PVM, the SeGW puts a timestamp on the T_PVM and forwards it to the PVE. The SeGW may check the format of the validation messages and parts thereof to mitigate the threat from mal-formed data attacks. Otherwise, an attacker may try to modify the data in the validation message of a compromised TrE such that the pure inspection of this data at the PVE would lead to a system error or failure.

It may be of use to separate between Dev_IDs and the identity of the corresponding H(e)NB, H(e)NB_ID. Though the association between both is one-to-one, such a separation may make sense from the viewpoint of separation of duties (SeGW knows TrEs, PVE knows H(e)NBs), and possibly addressing/management. In this case, there would be an intermediate step in which PVE fetches Dev_ID from a database HNB_DB, using the received H(e)NB_ID.

The PVE is the entity deciding on the validity of a device. That is, in the language of policy systems, it is a policy decision point (PDP). Under the strict separation of duty approach, it is the only PDP in the PVM system. It relies on SeGW, and DMS to enforce policies, such as to act as a Policy Enforcement Point (PEP). PVM remains, in its general description, agnostic to the question of how policies are generated and where they are stored/managed, such as, where PVE gets the policies from. In some of the more detailed variants and subordinate methods described below (in particular parametric validation and minimal validation), some examples of policy conditions and actions are given. In general, decisions on the validation policy can be based not only on the validity of single components but also on the other data contained in Clist. In particular, allowed parameter (range), and order of load (Clist is ordered) may be evaluated.

There are some fundamental classes of failure conditions that may occur in the validation process executed by the PVE. For example, failure condition F1 indicates a "TrE invalid" scenario. By its authenticated Dev_ID and the delivered TrE_info, the PVE identifies the device and/or its TrE as one which is not trustworthy.

Another example is failure condition F2 which indicates three scenarios for "Verification data failure". Scenario F1a indicates integrity measurement/verification data mismatch. It indicates failure of the secure start-up process of the device, and/or presence of false and/or expired RIMs and/or RIM certificates on the device, which then starts an invalid component. Scenario F2b indicates RIM Missing, i.e., a RIM for a component is missing and needs to be fetched from elsewhere. Scenario F2c indicates an expired RIM certificate.

Failure condition F3 indicates two scenarios for "Clist policy failure". For scenario F3a, single components are valid, but the configuration fails a policy, for instance on load order, or undesired components, or parameters. Scenario F3b indicates configuration is unknown, such that a 'known good value' for Clist is not available.

Failure condition F4 indicates "Pre-Validation Device Authentication Failure", and may apply if authentication is bound to validation in a way in which device authentication precedes validation. The F4 condition includes an F4a scenario that indicates an expired device certificate.

Described herein are detection and treatment methods for the described failure conditions. For failure condition F1, the PVE queries a local validation database (V_DB) using the received TrE_Info. The TrE_Info structure contains detailed information on certification, manufacturer, make, model, serial number of the TrE. The validation database V_DB stores information on which TrEs can be considered trustworthy. For example, it may be possible to implement policies to trust a certain vendor, model, or other similar identifier. If the TrE is not trustworthy according to the outcome of the assessment of the TrE_Info, the PVE can send a message containing this information to the SeGW. The SeGW may then act appropriately on this message. The PVE adds a statement to the T_PVM token (for example additional data-field) containing the cause of denied access such as wrong/untrusted manufacturer. The PVE puts a time-stamp and signature on the T_PVM. The T_PVM is forwarded to the SeGW. The SeGW may then verify the time-stamp (replay-protection) and the signature (prevent forged sender). The SeGW will then deny network access and device authentication and block future authentication attempts.

In the case of denying network access and device authentication, if validation and authentication are bound, this would require the authentication process to break.

In a first variation, blacklisting of devices according to certain properties such as manufacturer, device version, and other properties may be possible.

The PVE may also first trigger a V_DB update process analogous to the RIM update process, for unknown TrEs, using Dev_ID and TrE_Info.

For failure condition F2, the PVE fetches RIMs from the V_DB for all components from the received Clist. The validation database V_DB only stores certified RIMs. The corresponding RIM certificates have to be stored securely in the V_DB.

In one embodiment, the RIM certificates may be inspected before ingestion to the V_DB and then discarded. Alternatively, the RIM certificates may be stored for security purposes. For example, the MNO may use them to prove compliance in device management to an auditor in the sense that the MNO has performed diligently in obtaining RIMs and their certificates from trusted third parties.

For failure condition F2a, the PVE may recalculate the correct verification data from the retrieved RIMs and match it to the verification data received in the validation message.

If the calculated, correct verification data does not match the verification data from the validation message, the secure start-up process on the device may have been compromised or wrong RIMs may be stored in the device, and invalid components may have been loaded in the secure start up process. The PVE may compare the measurement values, transmitted in the validation message or in answer to a separate request from PVE, to RIMs, to detect the failed components.

Depending on the F2a policy, several options may apply. In the case of rejection, the PVE may signal the outcome of the validation to the SeGW. The SeGW may deny network access or put the device into a quarantine network. In the case of an update, after receiving the validation result (T_PVM) indicating the verification data failure, the DMS may start a management process to replace the components which failed validation, according to the management procedure. The DMS may forward the T_PVM to the SeGW with an indicator that validation failed and that the device will revalidate. The DMS may send correct RIMs to the device and trigger a reboot. Upon reboot, the device may re-authenticate and revalidate using the new RIMs. If the verification data is incorrect again, the device may not be able to be recovered by remote management procedures. To prevent endless re-start-up cycles, the DMS may store the Dev_ID with a timestamp when sending the remote reboot trigger. If the DMS receives the order to perform an update again, the DMS may check if the Dev_ID is already stored. If several storage entries exist, the time-stamps may indicate short reboot cycles, indicating that the device cannot be recovered. The methods described for the treatment of failure condition class F2 may be optional if RIMs are not used in validation.

In another variation, based on the verification data such as the PCR values, the PVE may use a special part of database V_DB, which caches trusted configurations by the PCR values. The PVE may look up a table of verification data, such as a hash table in the case of PCR values, for valid configurations. If a match is found, validation may be immediately successful. Storing pre-calculated PCR values for valid configurations in V_DB can be useful for classes of devices running in the same configuration, where the hash values will be the same. Instead of comparing all components against RIMs, a single composite hash value can be compared, lowering computational overhead and speeding up the process of validation.

If no policy failure condition is met, the device is valid. The PVE may signal this to the SeGW, which may allow connection to the CN.

For failure condition F2b, RIMs may be fetched from a trusted third party (TTP). If the RIM for one (or multiple) components is not stored in V_DB, PVE transfers the list of missing RIMs to RIMman. RIMman then tries to fetch (certified) RIMs from TTPs. Clist contains component indicators CInd (such as URNs), by which RIMman can identify the components and get information on where to find the corresponding RIM certificates. RIMman performs a RIM ingestion for the new RIMs including verification of the RIMc into the V_DB. RIMman performs an update of V_DB storing the CInd, RIM and the RIMc. RIMman signals the V_DB update to PVE which can then fetch the missing RIMs from V_DB.

Alternatively, RIMs may be fetched from the device. If the device has indicated in the validation message the capability to provide the stored RIMcs (including the RIMs) to the network, the PVE may ask the device for RIMs and RIMcs, which are missing for validation. This may be used as a backdrop method for RIM fetching. Since the device has used all of them in secure start-up, all RIMs are present in the device. If the PVE cannot find RIMs for some components, the PVE forwards the list of missing RIMs and T_PVM, with a new time-stamp attached, to the SeGW. The SeGW performs a protocol with the device to retrieve the RIMcs. The SeGW appends the received RIMcs with a time-stamp to the T_PVM and forwards the T_PVM token to the PVE. PVE forwards the retrieved RIMcs to RIMman. RIMman then verifies that the received RIMcs are issued from a trusted entity and valid. RIMman performs a RIM ingestion for the new RIMs including verification of the RIMcs into the V_DB. RIMman performs an update of V_DB and then signals the V_DB update to the PVE. The PVE may then fetch the verified RIMs from V_DB and proceed with validation. If RIMs for components are still missing after the retrieval and ingestion process, the PVE will not ask the device for RIMcs again but fetch RIMs from TTPs as described herein. Any RIMs obtained either from the device of TTP may be verified for trustworthiness along the same lines as digital certificates.

The trust model between the PVM components determines the sequence of actions in the RIM ingestion from the device. The PVE will not trust the RIMs/RIMcs from the device, but wait for their ingestion to V_DB, performed only by RIMman after checking trustworthiness of that data. PVE may also concurrently with the RIMman's RIM ingestion operation, start to recalculate verification data based on the device received RIMs, but would have to wait for the RIMman's decision on their trustworthiness.

The RIMcs may be sent in an additional message which is integrity protected since it is sent inside the CN only. The message containing the RIMcs must be linkable to the T_PVM.

For devices, the RIM ingestion process is performed by an external entity and may be extended to a complete ingestion process for the device and PVM infrastructure. This may be identified as distributed RIM ingestion within the PVM architecture.

All messages from PVE to RIMman are restricted in format and content, to ensure message integrity and mitigate, for example, malformed, message attacks. Essentially the messages will contain single URNs for components pointing to a location where reference metrics can be retrieved.

For failure condition F3, the PVE fetches a policy on allowed configurations from a configuration policy database C_DB. This configuration policy database C_DB shall contain allowed configurations by Dev_ID. The C_DB is managed by CPman. The C_DB may also contain policy actions such as desired updates for a device which was disconnected and did not validate for a while. The PVE evaluates the policies received from CPman, based on the information in the Clist. If the evaluation results in any of the failure conditions F3a or F3b, different actions may apply.

For a rejection, the PVE adds the message on the failed configuration policy to T_PVM, puts a time-stamp and signature on T_PVM and forwards it to the SeGW. The SeGW may then verify the time-stamp (replay-protection) and the signature (prevent forged sender). The SeGW may then deny network access and device authentication (and block future authentication attempts). If validation and authentication are bound, this may break the authentication process.

If Clist is unknown and thus not found in the C_DB (failure condition F3b), or no policy exists for components in Clist (special case of F3a), the PVE calls CPman to search for configuration policies from TTPs. If CPman is able to retrieve new configuration policies, CPman updates the C_DB and sends a message to the PVE with an indicator to the updated configuration policies.

It is possible to keep the C_DB and V_DB consistent if the update contains new components (see F3a), this may be signaled from CPman to the PVE including the new component identifier. The PVE then forwards the necessary information on the new components to RIMman to fetch updated or new RIMs for the components. Here we want to keep the management processes for configuration and RIM management separate so that the components Cman and C_DB and RIMman and V_DB may operate independently. If the policy requires an update to the device, the PVE triggers the update process.

As an example of a simple policy, the C_DB may contain a list of allowed configurations. The PVE forwards the received Clist to CPman which in turn matches it against the stored allowed configurations. If no match is found, failure condition F3b is detected. Checking updates may be required since the current validation process may be a revalidation after a device update during a device management process. During this management procedure, the device configuration may have changed and may have to be verified against the new configuration from the C_DB.

Described herein is an example of a revalidation process. The device may be such that once it has been authenticated by the network, it will rarely be rebooted barring unscheduled events such as a loss of power. Revalidation of the device may be a routine part of the execution environment. Periodic revalidation may enable the network to have confidence that the device is working in a defined state with reduced risk of rogue code executing. The revalidation may also enable the authentication procedure to initiate again, thereby keeping the key exchange new and re-establishing the secure communications tunnel There are two triggers for device revalidation, one by the network and the other by the device. The methods of revalidation described herein may be applied to any of the validation methods.

Described herein is an example of a device initiated revalidation. A device initiated revalidation may occur on a periodic basis. Depending on the frequency of use of the device, the MNO may set a periodic revalidation schedule during device setup procedures. At the scheduled time, the device would initiate a reboot sequence that would trigger the validation process to begin again, along with the authentication. At this time, if software updates are required for the device, the corresponding OAM process may also be initiated. If the device does not re-authenticate/revalidate within the desired time-frame, the CN may trigger the revalidation. Operators may not have control over the revalidation process with device-only initiated revalidation. If a large amount of devices run the same schedule, such as the first day of month, this may increase the load on the CN infrastructure.

Described herein is an example of a network initiated revalidation. Network initiated revalidation may occur on a periodic basis as in the device initiated case, but it also may happen at any time the network deems it necessary for security reasons. Revalidation may also be setup by the operator as part of the policy so that a module in the device is programmed by the operator to carry out revalidation at the programmed intervals. The revalidation may be triggered by sending an IKEv2 message to the device indicating a request for revalidation. The Notify payload may be used to carry a newly defined revalidation trigger code for the device.

The PVE may periodically send a revalidation indicator to the SeGW. To keep track of all sent revalidation requests, the PVE stores them with DEV_ID and a timestamp. The PVE then periodically checks if any devices ignored the revalidation request. The SeGW may forward that request to the device via the IKEv2 protocol. The revalidation message may be setup based on the hosting parties request at the time of installation so as to reduce the risk of service interruption.

The device receives an IKE message with the Notify payload indicating a request for revalidation. The device then initiates a reboot sequence where validation and authentication to the network are re-established. If the device is compromised such that the device ignores the revalidation request, the PVE may detect this during the monitoring of all active revalidation requests. The PVE may signal the failed revalidation to the SeGW which may act properly, for example by putting the device in a quarantine network.

Another method for network initiated revalidation involves sending a reboot signal to the device, triggering a reboot and thus a revalidation during the secure start-up.

In another method, the revalidation of a device may also occur by request from other network entities. If a device manufacturer suspects their device has been widely compromised, the manufacturer may contact the MNO and request a revalidation. This may be done as a back office process with the MNO deciding if revalidation may occur or not. The PVE or HMS may initiate the revalidation and re-authentication.

Described herein is an example of platform management. The DMS is the main entity responsible for device management. Based on received and stored device information, such as, vendor, hardware/software configurations, TrE capabilities, and the like, the DMS is able to initiate software updates, configuration changes and OTA device management procedures. The management actions are generally determined by the transmitted validation data, validation results from the PVE, and policies in C_DB, such as, desired target configurations.

The DMS may establish a secure tunnel with the device's TrE. The DMS may use the T_PVM token to retrieve the Dev_ID, the latest reported validation data and the Clist for the device. Using the Dev_ID, the DMS queries the SeGW to establish a secure tunnel to the device's TrE by sending the T_PVM with an indicator to set the device's status from 'active' to 'management'. Thus, the SeGW keeps this token, may not provide backhaul connectivity, for example via quarantine, and waits for the DMS to confirm end of management activity.

Depending on the management action by the DMS, the device may revalidate, for example, by a reboot after a software update. Revalidation may then take place, wherein the PVM system state is maintained by using the T_PVM from the previous validation, and may not generate a new one. In this case, the DMS sends an updated T_PVM token to the SeGW, with the device status indicator changed from 'management' to 'revalidate'. The SeGW keeps a list of devices awaiting revalidation, where it looks up devices when they request network access. The SeGW may then wait for the device to revalidate for a certain period of time. The outcome of the revalidation is then signaled back to the DMS to confirm successful completion of the management process.

The necessity for revalidation may arise in the system model for the device. New components downloaded from the DMS are inserted into the device configuration precisely after the next secure start up process. Therefore it is necessary to trigger revalidation as the concluding step of platform management. Since the device has to reboot, and if the platform validation is furthermore bound to the authentication of the platform, revalidation may include cutting the existing connection for platform validation and management. The SeGW may, in this case, maintain a state for the revalidation as described in the last paragraph.

With a secure tunnel to the device's TrE established, the DMS may install/uninstall software (SW) components, such as new SW components, change configurations, and trigger revalidation.

In another variation, the device may indicate revalidation by a flag in the validation message. This avoids looking into the revalidation list for each device approaching the SeGW. The flag may be set in a secure process, such as, a process performed by a TrE component, so that no device can circumvent revalidation by not setting it.

This and the previous step may take place at the SeGW and not at the PVE, otherwise the SeGW would automatically generate a new token. In particular, these steps include the protocol steps taken for device management, in which the SeGW has to keep track of revalidation which requires the device to re-boot. Since after device reboot, the device will reconnect and hence re-authenticate, the SeGW has to keep track of the devices which are going to reboot for revalidation, otherwise, the SeGW will consider the connection and authentication attempt as an initial connection and hence would issue a new token. Thus maintenance of the revalidation list is included for the SeGW.

Using the T_PVM continuously over many rounds of revalidation may be useful to detect recurring update failures and other patterns of irregular behavior.

If the DMS installs new components to the device, it may be ensured that the RIMs for the software are included in the same management message from DMS to TrE. The TrE may be responsible for the secure storage of the RIMs and their local management. If necessary, the DMS triggers a revalidation after the installation of the components. The RIM for the new software may be sent to the PVE which stores it, via RIMman, into the V_DB. The DMS updates the configuration policy database C_DB accordingly, using CPman. The RIM for the new component may be made available in the V_DB before the device engages in revalidation, for the PVE to validate the new configuration. In the case of a configuration change, for example, if DMS changes parameters for a given component, the C_DB may be updated by DMS via CPman.

The TrE may provide a secure execution environment for a secure update and management function. This function ensures that a compromised device may at least be sent into a rescue mode in the case of a failed software or component update. A fallback code base (FBC) may be used for device reversion by the DMS in case of failure. This allows the device to revert to a pristine state from which the main code may be updated via DMS management methods.

To avoid a race condition, the revalidation may be triggered by a message from the DMS to the TrE, after the token passing. Otherwise the device may try to revalidate before SeGW receives the token to prepare for revalidation.

In another variation, the SeGW may keep a number 'n' of revalidation attempts, or failed attempts, for each device in revalidation list, after which a device may be blacklisted, quarantined, in-field maintenance is triggered, or a combination thereof.

In another variant, the communication secrets for establishment of the secure tunnel may be contained in, and extracted from, the T_PVM, avoiding involvement of SeGW.

An additional method may be to disable components which cannot be validated and cannot be replaced or updated in PVM, without denying connectivity to the device. Essentially, the DMS may send a disable CInd and revalidate message, which helps to mitigate the risks from operator lock-in as described below. The PVM may be used to fight a "battle of trust" between devices and operators. Different methods for disabling the occurrence of a "battle of trust" may be available. In one example method, components of a device may be disabled by forcing revalidation without this component in Clist. This may apply if a valid update for a component is not available. In another method, the load order may be forcibly changed. In another method, forcibly change parameters, which may or may not affect the RIM. The forced change of parameters requires the DMS to get all necessary information on all device components and not only for those for which validation failed from the PVE.

In PVM, it is generally not necessary to send RIM certificates to the device. The verification and management is, in the presented PVM architecture, a task of the operator network, located in the RIMman. The device may trust received RIMs and CInds in the management process, because it trusts the network. Trusted Computing Group (TCG) Mobile Phone Working Group (MPWG), on the other hand, has defined RIM ingestion by a trusted device as a de-centralized process, in which the device also verifies obtained certificates for RIMs, before installing them, protected by the MTM. Both variants are not mutually exclusive. The DMS may send the RIMcs along with the other data and a TCG MPWG compliant device may install them according to the TCG specifications. This may be a point of difference between PVM and the device management for secure start-up defined by TCG MPWG.

Described herein is an example of verification data. The sending of verification data, for instance in the form of PCR values (which are aggregate hash values of single measurements) as well as binding the verification data for authentication, is the technology standard provided by TCG specifications. However, that creation of verification data and binding according to the TCG specification may be computationally costly, in particular, on devices with a lot of measured components. This is normally done by the cryptographic extend operation described herein—essentially creating a new hash value from two old ones. This may slow down the start-up process of a device significantly, which may be undesirable, for instance, in home environments.

Also, there is redundancy between RIMs and verification data, since they deliver similar information on the outcome of measurements. If the secure start-up process was carried out correctly, then the TrE compares measurements to RIMs and only loads components, for which both match. Thus, the designated RIMs in the Clist carry all information of the verification data. In fact, they may carry more information than the verification data, since the verification data are thought to be aggregates of the mentioned measurements. Verification data are cryptographically unique shorthands for actual measurement values. PCR values may be used as verification data in one embodiment.

The basic assumption underlying the argument against verification data is that the secure start-up process operated correctly in comparing actual measurements to the RIMs indicated in Clist. Thus, from the viewpoint of security, there is one main reason, why verification data may add to trustworthiness of a device in validation. This is the case when the device has incorrect RIMs, or compares measurements with fake RIMs.

There are further arguments to keep verification data—in the sense of data with high protection, generated during secure start up, identifying the achieved system state uniquely—even in the case of secure start up or monadic approaches like AuV. In fact, secure start up by itself does nothing for integrity protection of the other validation data which, in this case, may be just a component list without measurement values. This list of CIds also tells the validator where and how to get trust information on components (for instance from TTP).

An attacker may try to manipulate the validation data (Clist), replacing identifiers of less trustworthy components with (captured) CIds of more trustworthy ones ('component trust elevation'). The validating device (TrE) signs the falsified data and correctly validates—without means to internally detect manipulation if it has no verification data.

A way to mitigate this attack to some extent may be that the secure start up engine makes the data static by sealing it to the state (last PCR value). For validation, it then needs to be unsealed and the same security gap opens again. And furthermore, the system needs to stay static after the SML sealing, limiting the flexibility of such an approach.

In conclusion, both device and validator have good reasons to support validation data with verification data, even in the case of secure start up.

'Verification data' here is used synonymously as 'data further processed (for example hashing) from the raw measurement data, which is then verified to have matched the RIMs'. The verification data identifies, after completion of secure start up, the platform's state uniquely. The provisioning of incorrect RIMs may be for instance from a compromised source, may have a greater impact on the PVM system as a whole and thus poses a critical risk.

A concrete scenario is one in which a trusted source of RIMs, which may be external to the operator CN, has been compromised, for example hijacked or spoofed, by another party. Before this gets detected and corrected, the RIM source may deliver fake RIMs to a large number of devices, along with compromised components, in normal PVM platform management.

The common remedy in such a case (that is, the common practice in public key infrastructure (PKI)) would be to revoke the according RIM certificates. Since trusted reference data may reside on devices, such a procedure may incur a load on the devices. TRV revocation may force RIM, RIMc, and component updates for a whole device population, while only a small fraction was in fact affected by the attack. This may cause heavy network traffic and inconvenience for users. Mechanism and protocols are supported by the device such that authorized TRV revocation may be implemented.

In this scenario, the generation and use of verification data in validation may be applicable. The PVM system may invoke verification data usage based on a policy, for each single validating device. The PVE may then detect compromised devices and manage only them. This is described herein as "Minimal Validation Policy".

Described herein is an example token passing-based operation of PVM. PVM as described herein is an asynchronous process. Therefore, the PVM system comprised by the various entities should be stateful, and it should be possible to recover the current state of the process, to mitigate the various well-known attacks on distributed systems and their failure conditions.

In one example, token passing may be used to do this. The SeGW may be configured as the entity responsible for generation and management of a token associated uniquely to a validation process. The PVM token may not only be bound to the identity of the validating TrE but also to the unique validation process in question. The token passing approach includes replay/revalidation protection. Validation attempts are made unique preventing replay of old validations and providing measures to detect DoS attacks by frequent revalidation. By the token, a validation session is established, allowing for the unique association of PVM-relevant data and messages to a unique validation. This further is a precondition to assess freshness.

Freshness of validation data may be controlled since the validation tokens can be made to be based on (not necessarily signed) time-stamps, initially being generated by the SeGW and appended to a time-ordered list by every entity passing the token on.

Another method of introducing freshness may be to read the time from a secure real time communication (RTC) immediately after the RoT is loaded and use this time-stamp to create an aggregate hash chain. Another alternative may be to use a sequence counter which is incremented every reboot cycle and applied by the RoT to create the hash chain.

Yet another method of introducing freshness is to complete the Stage 1 and Stage 2 checks, commence communications with the SeGW and PVE and then use a nonce supplied by the SeGW/PVE to bind the further validation of the Stage 3 checks, before communicating the result of the Stage 3 validation data to the SeGW. This ensures freshness of the validation data.

Using the T_PVM continuously over many rounds of revalidation is, as in standard PVM, useful to detect recurring update failures and other patterns of irregular behavior. The SeGW may detect and act upon various conditions based on the validation token. For example, a token which stays active for too long may indicate a general failure of PVM. The SeGW may poll PVE and DMS for the token to find out its status and act upon it. This may be identified as a validation timeout. In another example, revalidation may occur while the token is active. This may indicate various conditions, such as unexpected reboot, power outage or DoS attack. In another example, time-based patterns, such as random or periodic behavior may be detected in vein of an intrusion detection system (IDS). The device may be quarantined, blacklisted, and in-field maintenance may be triggered.

The token may also be used to protect the integrity of data passed between entities in the PVM system and between the PVM system and the device. For this, it may suffice to include a hash value of the data to be protected, for instance the CList, or the list of missing RIMs in the treatment of failure condition F1a, and a pointer to that data. The data object may not be included as a whole in the T_PVM, since this may overload it and lead to incalculable overhead, which may in fact enable certain DoS attacks.

Described herein are examples of operator RIM shielding methods. Operator RIM shielding replaces the numerous RIM certificates for device components coming from various external sources by RIM certificates which are generated by the operator, or equivalently "selected home operator" (SHO), with which the device wishes to establish a backhaul link. Whenever available, these SHO RIM certificates (SHORIMc) take precedence in validation over foreign RIM certificates for the same component in the V_DB. In device management, SHORIMS are installed (pushed down) by the DMS to devices to also take precedence over foreign certificates locally on the device in secure start-up of the device by the TrE.

The SHORIMcs may serve as a "first-level cache" for fetching RIM certificates in validation. They may be associated with special CInds pointing essentially to a technically separated, high-performance, sub-database of V_DB.

Operator RIM shielding is useful for any type of highly mobile device, such as M2M Equipment (M2ME). When a mobile device enters the realm of a new operator and performs validation, the new operator may be presented with CInds pointing to another operator. It may accept these in a manner analogous to roaming of mobile devices or replace them as described herein.

In a variant of operator RIM-shielding, when a SHO decides not to release the public part of the signing key of the SHORIMcs generated by the SHO, it may be difficult, or even impossible for another operator to validate components of a device coming from that SHO. Such a scheme may be extended to the same level of lock-in that traditional SIM-lock procedure provides. Operator RIM shielding may be used in the initial deployment of devices in the field to remotely "brand" devices on first contact with the SHO, as a lifecycle management tool.

To establish operator RIM shielding based on PVM, the following additional steps are described, making reference to the original PVM procedures described above. In a PVM setup for RIM shielding, the RIMman configures PVE and DMS to perform their respective functions for operator RIM shielding. In platform validation, the PVE sends (separately or combined with the message about component validity) a message containing a list of components for which now SHORIM is in V_DB. The DMS is configured to perform the certificate update action (without necessarily updating the component itself) on components for which the new SHORIMcs shall be installed on the device.

During validation, the PVE identifies components for which no SHORIM is in V_DB (this is orthogonal to the availability of any RIM and RIMc for the components, such as, the normal PVM process). The PVE sends the list of identified candidate components, containing CInds and actual RIMs (RIMman needs them for generating the corresponding SHORIMcs, essentially by signing them) for operator RIM shielding to RIMman. The RIMman decides upon a locally available policy to determine for which components of the received list to apply operator RIM shielding.

The RIMman generates SHORIMcs for these components by signing the respective RIMs. Certificate parameters, such as validity periods, are determined by a local operator policy. The RIMman generates SHOCInds pointing to SHORIMcs in the V_DB. The RIMman appends V_DB with the new SHORIMcs and SHOCInds. In one embodiment, all 'old' data are stored, such as original CInds and RIMcs in V_DB for later traceability and as fallback. The RIMman sends the list of (CInd, SHOCInd) pairs to DMS, instructing it to force a RIM indicator update on the device in question. The DMS sends a RIM indicator update message with the SHO data to the device TrE, as in normal device management, but without component update. With this message, the device may be asked by the DMS to use only SHOCInds in validation henceforth.

What happens on the device, apart from installing the SHOCInds, and may be the SHORIMcs, is dependent on local policy. A clever device keeps its original manufacturer CInds and possibly also corresponding RIMcs. For flexibility, it may try to keep at least a number of variant CInds for each component, for various operators, and the original component manufacturer/certifier.

The DMS may force stateful revalidation of the device. Stateful revalidation is required to avoid cyclic behavior when RIMc update fails on the device.

Described herein is an example of operator component lock-in. As an extension of operator RIM shielding, the operator may be able to control or limit the operation of a device or its components in foreign networks. This may extend to operator component lock-in in the following way. A part of the component that shall be locked is encrypted, for example, with a symmetric key, by the SHO. Operator RIM shielding is performed for this modified component. The decryption key is transferred to a TrE (or UICC) in a protected and controlled space, where it may only be accessed with authorization from the SHO. In validation, when the PVE is presented with a SHOInd for such a component, the SHO releases the authorization data to the TrE. Then, the encrypted part of the component is transferred into the TrE's secure execution space, decrypted, and executed there.

Accordingly, the SHO-locked component may only function when the device validates toward the particular SHO while the same device may not be able to validate to another operator.

In a further variant, the decrypted part is released for execution outside of the TrE. This is weaker in terms of security than the previous variant since the full component may then be recovered by dumping the device memory. With the obtained clear component, RIMs may be re-generated and validation toward another operator may be successful, breaking the lock-in.

Another variant of component lock-in may be implemented without encryption secrets managed in the TrE or protected by other security elements such as the Universal Integrated Circuit Card (UICC). One may use modifications of components to generate operator-unique SHORIMs, SHORIMcs, and CInds. This may then apply to the field of code obfuscation and watermarking.

One example of an operator component lock-in may involve a roaming operator hijacking components or entire devices of another operator. The above TrE-based methods to protect otherwise free user devices from this are desirable. Essentially, the device should alert the user/hosting party/original SHO of such procedures, and maintain a policy when to allow lock-in for components and when to disallow it.

Described herein is an example method for individualization of devices in device management using PVM with regard to characteristics of the specific PVM system and operator. A device managed with PVM may be in a trustworthy state, in relationship to a specific PVM system and the governing operator. A question which may arise with roaming devices, when they enter the realm of another PVM system and operator, is, for the device to prove who has managed its configuration and trustworthiness before. One example method to enable independent measures for the device to provide evidence to that end is to provide the device with data in which the addressing to the device is signed. This individualization of a message proves the intentional signing by the sender. One method may be to contain the Dev_ID in data signed by the operator. Any party which may be presented with such signed data may then assume that the corresponding message and its content was intended for that particular device by the signing operator. This holds under the condition that the relying party believes that the signing operator correctly carried out a verification of authenticity of the device (e.g., via the Dev_ID). If this is not tenable, then the signing operator may still sign the full authentication credential of the Dev_ID instead. The signed data may also include the actual RIMs, adding a certain redundancy since this establishes essentially another RIMc, extended with Dev_ID.

Two efficient methods for establishing individualization based on PVM are described. In one method, the RIMman contains Dev_ID in a SHORIMc, which is applicable only if RIMcs are maintained by the device and hence the SHORIMc will be stored, including the Dev_ID, inside the device. In another method, the RIMman or DMS applies an operator signature to (Dev_ID, CInd) pairs and if SHOCInds are used, the same operator signature on SHOCInds.

Described herein is an example of device blacklisting. It may be possible to establish blacklists for devices and disallow network access based on the blacklists. The blacklists may include at least the Dev_ID and optionally the TrE_Info (certification, make, manufacturer, model, serial number). Such a list would typically be accessible by the DMS. In one embodiment, every MNO maintains its own blacklist and the DMS may have access to this list or database. Queries use the Dev_ID to see if a given device is blacklisted. Network access is then denied to these devices. In another embodiment, a global blacklist may be maintained, where every MNO can list devices as rogue and this database may be read by all MNOs. It must be assured that every MNO may only blacklist their own devices, while all MNOs may read all entries. Such a global database requires more of a management and maintenance effort. The above embodiments may be combined for alternative embodiments.

When the PVE receives the token T_PVM, the PVE appends a timestamp to T_PVM and forwards it to the DMS, which can extract the Dev_ID from the token and optional gain the TrE_Info. Using the Dev_ID (and TrE_Info if needed or present), the DMS queries the blacklist. If a device is blacklisted, the DMS forwards a message, containing the T_PVM, as a blacklist entry to the SeGW. The message may be equipped with a timestamp by the DMS. The SeGW may then deny access to the CN.

Further variants may be implemented by using the extended information from TrE_Info field. It may blacklist certain vendors, models, ranges of serial numbers and the like. Depending on the complexity of the blacklist behavior, a local, MNO-centric solution may be easier to implement than a central blacklist.

Described herein is an example of device white listing. White lists for devices may be established that allow network access based on the white lists. The white lists may typically include at least the Dev_ID and optionally the TrE_Info, such as, make, manufacturer, model, serial number. Such a list would typically be accessible by the DMS.

When the PVE receives the token T_PVM, the PVE appends a timestamp to T_PVM and forwards it to the DMS. The DMS can extract the Dev_ID from the token and optionally gain access to the TrE_Info. Using the Dev_ID, and optionally TrE_Info if needed or present, the DMS queries the white list. If a device is white listed, the DMS forwards a message, containing the T_PVM, the white list entry to the SeGW. The message may be equipped with a timestamp by the DMS. The SeGW may then allow access to the CN.

Further embodiments may be implemented by using the extended information from TrE_Info field. It may be possible to white list certain vendors, models, range of serial numbers and the like. Depending on the complexity of the white list behavior, a local, MNO-centric solution may be easier to implement than a central white list. In addition, regulators may require the MNOs to maintain blacklists in place of white lists.

In another embodiment, every MNO may maintain a white list or database and the DMS may have access to this list. Queries may use the Dev_ID to see if a given device is white listed. Network access may then be granted to these devices.

In still another embodiment, a global white list may be maintained, where every MNO may list its own devices as trusted and this database may be read by all MNOs. It must be assured that every MNO can only white list its own devices, while all MNOs can read all entries. Such a global database may require more management and maintenance effort. A global database of white listed devices may require the MNOs to establish additional trust relationships between them. A device which is considered trustworthy by MNO A will enter the white list and have access to MNO B. This requires a standardized and/or certified device validation process to compare trust levels of the devices. Optionally, a combination of the above variants may be implemented.

Described herein is an example of quarantine networks for devices. Quarantine network for devices may be established, requiring additional changes to the operator's network. In this new network, the SeGW may still act as an enforcement barrier for the CN. The SeGW decides which devices are put into quarantine.

Devices in quarantine have no direct access to the CN and provide no or limited service to customers. A validation occurs, where verification data is assessed by the PVE. New actions may be triggered depending on the outcome of the assessment. For example, the device may be considered trustworthy and may connect to the CN. In another example, the device may be detected as compromised and unrecoverable. It is put on a blacklist and further access attempts are blocked. In a further example, the SeGW forwards the outcome of validation, together with Dev_ID and TrE_Info to the DMS. The DMS may provide appropriate updates/software changes to recover the device. The SeGW may be informed about the update and triggers a revalidation of the device. If updates are applied successfully, the validation succeeds and network access may be granted.

The blacklist method above may be used in conjunction with a quarantine network. This may allow operators to make use of the connectivity to the device such as by supplying updates over OTA if possible. Alternatively, a blacklist may be used to block devices completely. For example, if the devices cannot be recovered by OTA measures. Such devices must be taken care of by an in-field replacement/service.

Other devices are put into quarantine if they are on a grey-list. The grey-list contains for example devices which are new to the network (those coming from another MNO); devices which have not been connected for an extended period of time; devices with suspicious behavior; and devices for which security warnings (by vendors and independent researchers) exist.

Described herein are examples of parametric validation. During PVM, there may be a dependence of verification results on configuration parameters for loaded components. Because these parameters may change frequently, and differ between otherwise equivalent devices, the basic embodiment of PVM allows parameters to be sent in clear during validation. However, this may require keeping full parameter databases and records both on the device and at the validator's end. This may have the following effects: 1) parameter sets may occupy large database spaces and slow down validation when they are evaluated; and 2) a high number of parameter stored and evaluated per device may reveal a lot about the device configuration to a third party, should it leak outside.

One method to include parameters in the PVM process is based on the method of extending hash values, i.e., by concatenating the hash function results of the parameter to the measurement of the component. A parameter digest value is taken of a serialization and binary representation of the parameter values of a component, and then the existing measurement value of that component is extended by this parameter digest. Accordingly, for validation, all measurement and reference values, RIMs and RIMcs, may be treated in an analogous way, leading to various implementations of parametric validation.

A similar problem in the relation of certificates (for example, X.509) and attribute certificates (such as, attributes viewed in analogy to parameters), which may be solved by including parameters in reference metrics and RIMcs, is denoted herein as "Rigged hash values for attribute certificates".

Disclosed herein are examples of diagnostic validation. An embodiment for validation based on PVM concepts includes the option to allow components to be loaded without having RIMs in the device. It may be possible that non-security critical software has been deployed on the device and that it is safe enough to load the specific component, but the network needs to be aware of the change. In another embodiment, where the MNO establishes a policy that certain components (for example because of frequent changes) are always measured by the device but validation takes place by the network. Furthermore, this may be the default action for the device to load and measure unknown components and leave the validation tasks for the network. The network may be able to put a device in quarantine, which in turn enables the remote OAM repair of the device. For example, it may return to a pristine state, removal of components, or take other measures.

Described herein is an example of PVM diagnosis of failure condition F2a. Where the PVE does not transmit a list of components failing F2a to the DMS, failed components may be found as follows. For example, the device may not keep an SML that can be shown to the PVE for comparison with RIMs. In this case, the DMS may omit actually replacing the components on the device which failed—since it may not know them—but only replace all components in the Clist with correct ones in the normal management procedure. On restart and revalidation, the device may then be able to include in the validation message also a list of components which were not loaded, since they failed internal verification. The PVE may even make this diagnosis by comparing the Clist of the previous validation with the one after RIM update. The components which are now missing were not loaded in secure start-up when they were locally verified against the correct RIMs. Thus, the missing components are the ones in need of replacement. Then, the components which are in need of actual replacement may be replaced in a second management cycle.

Another method for performing diagnostic validation is possible if the device reports that a component could not be loaded (for example RIM missing or wrong) and sends the measurement value of the component to the CN. Depending on the MNOs policy, an OAM repair process may be triggered to either remove or repair the component. Another variant allows the device to request OAM repair directly if the TrE detects that a RIM for a component is missing or wrong.

An additional method may be to disable components, which cannot be validated and cannot be replaced/updated in PVM without denying connectivity to the device. In this case, the DMS may send a "disable CInd" message for components and triggers a revalidation of the device. This may apply where unknown components are loaded.

Another method may have the DMS specify which components are allowed on a specific device. If a device loads and validates all components during secure startup, including components which are not allowed (for example because a security flaw has been discovered recently and no update is available yet), the DMS may send a message via the SeGW to the device which allows it to disable this component. The device is requested to revalidate. If the component is not loaded during revalidation, DMS signals this to the SeGW, which in turn allows authentication/validation to complete.

Described herein are examples for minimal validation policy. Since the measurement of components during start-up time (for example extending of PCR values and writing the measurements to a SML from which the Clist is produced) may produce some delay in the start-up procedure, a minimal validation scheme would require device validation only under certain circumstances. Since RIMs and stored measurement values (for example PCR values) deliver partially same or redundant information, eliminating this redundancy may save message and storage capacity.

If a local integrity measurement, verification and enforcement process may be established on the device (for example by a secure-start-up) it may be sufficient to send only the RIMs used in this local verification process, since verification data (for example PCR values) may contain the same information as the RIM itself. A minimal validation may thus not send verification data but only the reference values used in the local verification process. In another variant, instead of sending RIMs, it may be possible to send only indicators to RIMs if and only if the RIMs have unique identifiers.

Two requirements for minimal validation include: 1) that the local measurement, verification and enforcement (MVE) process is trustworthy; and 2) that the RIM source for the RIMs stored on the device is trustworthy. It may be possible to report verification data for the local MVE process to an external entity for assessment. This is for an explicit establishment of trust. The MVE process may be implemented such that it cannot be compromised. The fact that the device reports RIMs later on implies that the MVE process is trustworthy. This is for an implicit establishment of trust.

In order to assess the trustworthiness of the reported RIMs, RIM certificates signed by vendors, other MNOs, TTPs, and other parties may be sent instead. If the signer of the RIM certificate is trustworthy, the RIM is considered trustworthy. If any of the reported RIMs cannot be trusted, measures such as putting the device in a quarantine network or on a blacklist may apply.

Adjustments may be made to the redundancy of RIMs and verification data to gain efficiency. For instance, devices may be required to deliver verification data only in certain conditions or only at certain frequencies. For example, if compromised RIMs have been detected by the PVM system, a new device roams into this operators realm, or the SHO has not seen this device for a while. In another example, delivery of verification may be required only once in every 'N' validations.

Described herein are examples of remediation for use with PVM. Remediation, or software update, may be a necessary operation for continued service of a device. There are numerous reasons a device may need remediation. Besides regular maintenance of software upgrades, bug fixes and enhancements, remediation may be an integral part of the general security process of a device. During the validation procedure, the software on the device is measured and verified for its integrity. These measurements are compared to RIMs located in the TrE. If the verification fails, either the code has been tampered with or the RIMs are incorrect for that particular code base. Remediation procedures may be initiated to update either the code base or the RIMs to ensure proper validation of the device.

If the device integrity check for one or more components fails, this implies that either those components are compromised or that the corresponding trusted reference values are out of step with the code base on the device. Remediation procedures may be initiated to at least indicate to the CN that the device is unable to authenticate to the SeGW, and possibly to also facilitate network-initiated update of the code base or new trusted reference values corresponding to the installed code base. Remediation may occur between the DMS and the device through the SeGW.

For the initiation of any remediation, some common security requirements apply. They are determined by the stage of the secure start up process at which failure occurs. The worst case to be considered is a failure at stage 2 of secure start up which indicates that the TrE is built but has no connectivity to an external entity. Thus, the device cannot, in a normal start up, request remediation in this situation. An additional code base such as a FBC may be securely loaded into the TrE and used to perform remediation. Security for such a process is characterized by the following: 1) the FBC may be loaded completely and unaltered into the TrE; 2) the TrE may execute the FBC securely; 3) communication for remediation with a network entity, such as the DMS, may be secured for integrity and secrecy; and 4) credentials for remediation access to the network may be protected throughout the process. Alternatively, the FBC does not have to be loaded into the TrE. The FBC may co-exist with the TrE, e.g., as another (trusted) code base for the single purpose of remediation. The trust in the FBC would be derived from the fact that it is stored in secured storage or protected by HW secured secrets. As such, the TrE may not be needed to run the FBC. The FBC may be self-standing and running directly without the establishment of the TrE.

Described herein is an example of device initiated remediation. Within the scope of device validation, remediation may become an alternative to immediately quarantining a device upon detection of errors. In the case of autonomous validation, the TrE is the first stage verified. If it is verified correctly it indicates the device has achieved a predefined state of secure start-up. The implication of this is that the TrE is reliable and the RIMs stored in the TrE are trustworthy. However, it may not indicate that the RIMs are correct for the particular version of code that is currently loaded on the device.

Described herein is an example of network initiated remediation. In the case of autonomous validation, if the device fails the validation procedures the FBC may be initiated triggering a software update of the main code base including the RIMs. The device may send an IKEv2 message with the Notify payload indicating the device is executing in fallback mode and needs immediate remediation.

For the semi-autonomous validation method, remediation procedures would not necessarily entail a full update of software or trusted reference values (TRVs). In the case where the device passes stage 1 and 2 validation, but fails stage 3, information regarding the failed modules may be sent back to the PVE in the Notify payload or certificate in the IKEv2 protocol. If the PVE deems those failed modules as non-critical, the validation and authentication could continue on with those failed modules disabled/unloaded. However, if the failed modules are critical, the PVE may send information to the DMS indicating remediation is necessary.

Another scenario may be that the RIMs stored in the TRE are incorrect for a specific code base. The failed measurements may be sent back to the PVE where analysis of the information would indicate that the error is in the RIMs and only those values need to be securely updated in the TRE.

Described herein are examples and embodiments for distress signal and fallback code. The device may be equipped with a fallback code (FBC) image, the purpose of which is to facilitate the remediation of a device to take place in case it has failed device integrity verification. The FBC may be stored in secure memory, such as read only memory (ROM). The FBC may be invoked if the local device integrity verification fails. The FBC may contain at least all necessary functions, methods and credentials needed for communication with the entity in the CN that is responsible for remediation for the affected device. Moreover, the FBC may also include functions necessary to receive a full software update from the network. A special, 'remediation' DMS may be considered.

The device and TrE may be capable of performing the following remediation indication procedures upon failure of device integrity check. First, the TrE may initiate execution of trusted code known as fallback code (FBC). The FBC may be stored in secure memory such as ROM. Second, the FBC may establish a secure connection to a pre-designated, 'remediation' DMS. Third, the FBC may send a distress signal to the DMS that may include the device ID. The DMS upon receipt of the distress signal may know that the device has for example, failed integrity check and requires maintenance. Optionally, the DMS may initiate a full firmware update procedure or perform diagnostics to perform a partial code/data update, upon receipt of the signal.

Described herein are examples of validation without RIMs. Validation without RIMs may include secure transfer of component code to secure storage under control of TrE on load, such as secure memory cards. Validation without RIMs may also include replacing digest values with encryption, so as to store encrypted components, such as code, in normal memory. It may also include encryption with a key protected by the TrE and shared with the DMS, or encryption keys derived from asymmetric cryptography algorithms, where the DMS and TrE may have public and private key pairs. Encrypted code may not allow for targeted alterations. Any manipulation of the code may be detected upon decryption, such as in a variant of secure start-up, since the decryption of tampered data yields nonsense. Detection of such changes may be accomplished by the inclusion of digest values into the encrypted code. Further options, such as error correcting codes may be applied.

Described herein are examples of inclusions of location based information in validation process. Some devices may be used in application scenarios, where location based information plays an important role, such as theft protection, cargo tracking, fleet monitoring, or surveillance. The device may be typically equipped with a global positioning system (GPS) module to provide geographic location data. The secure start-up may then include the GPS module and components, to ensure trustworthy generation and storage of location based information. The location data may additionally be stored securely in the TrE secure storage. The location information may then be included in the validation message. This may for example be used to change the device configuration by OAM procedures if the reported location does not match the desired location. If a device reports a new location, its configuration may be changed such that it uses different parameters to connect to the network, trigger software events, such as logging, reporting, or shutdown. Location information may be assumed to be securely handled by a trusted application.

Described herein are applications and embodiments of PVM to H(e)NB and M2M scenarios that provide a mapping of the general PVM architecture to existing and standardized network entities, protocols and mechanisms. Both applications pose specific security requirements. Both applications have in common that devices are i) no longer considered as closed, immutable environments for the storage and handling of sensitive data, as mobile handsets have been traditionally viewed; and ii) these special devices are under the control of a stakeholder different from the mobile network operator (MNO), and are connected to the core network only intermittently and over an insecure link, in general.

The first application refers to H(e)NBs, better known as femtocells. A H(e)NB is a small, portable access point providing terminal devices (such as mobile phones) access connectivity to 3G networks. A H(e)NB is generally placed on the premises or in the homes of a stakeholder called a Hosting Party (HP). The HP becomes a mediator for mobile communication and services in a small, designated geographic area. This may be used to provide mobile services in hitherto inaccessible areas (due to bad radio conditions) such as in-house or factory environments. It is also an option for private households and the small office home office (SOHO) sector as a H(e)NB may be a unified access point to broadband Internet and mobile networks.

In H(e)NB usage scenarios, three stakeholders, Users-HP-MNO, are related by Service Level and usage agreements. The H(e)NB stores a lot of sensitive data in this context, such as the HP's authentication data, embodied, e.g., as a mobile network subscription, the list of Wireless Transmit Receive Units (WTRU) or User Equipment (UE) which are allowed to connect to the H(e)NB, stored as a Closed Subscriber Group (CSG), and an Access Control List (ACL). Some of this data may be private to the HP and/or the users. Also, the location of the H(e)NB needs to be controlled to protect the mobile network from interference and prevent illegitimate extension of services.

Figure 7:
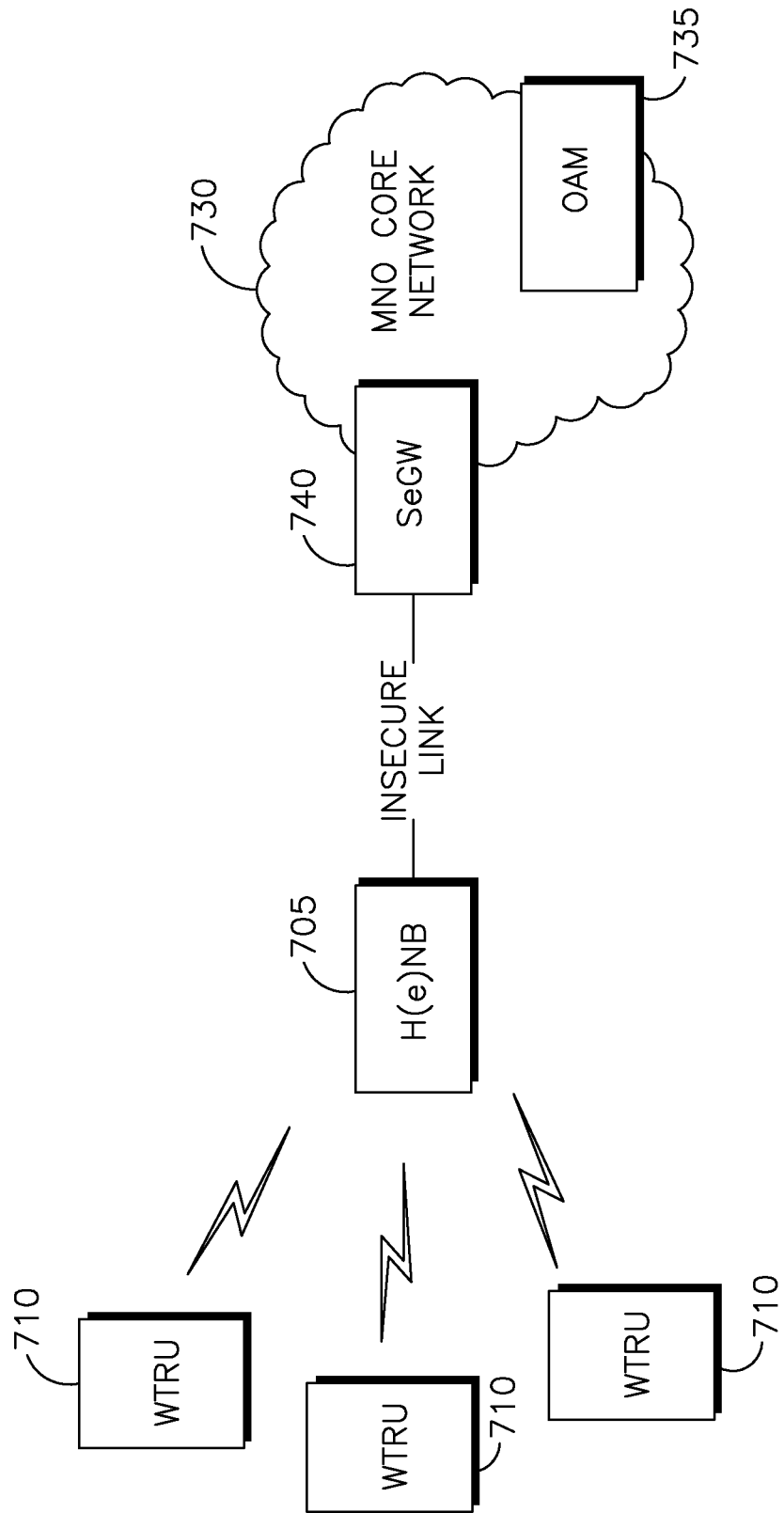
FIG. 7 shows an example block diagram showing a H(e)NB communication scenario.

FIG. 7 illustrates an example communication scenario between an H(e)NB 705, WTRU or UE 710, and an operator core network 730. It introduces two network entities, one tasked with security, the other with servicing of the H(e)NB. The Operation, Administration and Maintenance 735 (OAM) is a function in the backhaul of the core network which provides remote management functionality to the H(e)NB 705. In particular, it provides software downloads and updates, setting of radio and other parameters, and other similar functions. The Security Gateway (SeGW) 740 is the main entry point for H(e)NB 705 into the operator's core network 730, and its main purpose is to protect the network 730 from illicit connection attempts and any kind of attacks that may emanate from rogue H(e)NBs or an attacker impersonating an H(e)NB.

The second intended application refers to M2M communications. Typical examples for M2M Equipment (M2ME) are vending and ticketing machines. More advanced scenarios comprise, among others, remote metering of combined heat and power plants, machine maintenance, and facility management. If M2ME are connected to back-up systems via a mobile network, MNOs will be enabled to offer value-added services to M2ME owners, beginning with over-the-air (OTA) management. Like H(e)NBs, M2ME are under the control of a stakeholder different from the MNO. The stakeholder has certain security requirements, which may be different from the MNO's. Security of H(e)NB and M2ME is an issue. The respective threats, risks, and ensuing security requirements are comparable for both cases.

Threats may be grouped into six top-level groups. Group 1 consists of methods to compromise credentials. This includes brute force attacks on tokens and (weak) authentication algorithms, physical intrusion, side-channel attacks. And a malicious hosting party cloning an authentication token. Group 2 consists of physical attacks such as inserting valid authentication token into a manipulated device, booting with fraudulent software ("re-flashing"), physical tampering, and environmental/side-channel attacks. Group 3 consists of configuration attacks such as fraudulent software update/configuration changes, mis-configuration by the HP or user, mis-configuration or compromise of the ACL. Group 4 consists of protocol attacks on the device. These attacks threaten the functionality and are directed against the HP and the users. Major examples are man-in-the-middle (MITM) attacks upon first network access, denial-of-service (DoS) attacks, compromise of a device by exploiting weaknesses of active network services, and attacks on OAM and its traffic. Group 5 consists of attacks to the core network. These are the main threats to the MNO. They include impersonation of devices, traffic tunneling between them, mis-configuration of the firewall in the modem/router, and DoS attacks against the core network. In the case of the H(e)NB, it also refers to changing locations in non-allowed ways. Finally, this includes attacks on the radio access network using a rogue device. Group 6 consists of user data and identity privacy attacks including eavesdropping of the other user's Universal Mobile Telecommunications System (UMTS) Terrestrial Radio Access Network (UTRAN) or Evolved UTRAN (E-UTRAN) access data, masquerading as other users, user's network ID revealed to H(e)NB owner, masquerading as a valid H(e)NB, and providing radio access service over a CSG.

The core functional requirements which are new for both H(e)NB and M2ME, refer mainly to the authentication of the different stakeholders, and the separation of functions and data between them, i.e., domain separation. In particular, the authenticity of the HP or M2ME proprietor may be made independent of device authentication to the network. Furthermore, secret data of the HP must be protected from access by another party, even the MNO. The device has to perform security-sensitive tasks and enforce security policies towards both the access network, and the connected WTRU. This must be possible in an at least a semi-autonomous manner, to provide service continuity and avoid unnecessary communication over the backhaul link. Another important security area is remote management by OAM or OTA, respectively. The device needs to securely download and install software updates, data, and applications.

The need is to separate the authentication roles while concurrently minimizing changes to the core network and, thus, to re-use standard 3G authentication protocols such as Extensible Authentication Protocol—Authentication and Key Agreement (EAP-AKA). The approaches envisioned so far include separate authentication bearers for the HP and/or M2M owner. They may be embodied in a so-called HP Module (HPM) in the former, or in managed identities (MIDs) in the latter case. Both may just be pseudonyms for Universal Integrated Circuit Cards (UICCs), i.e., 3G Subscriber Identity Module (SIM) cards. Various security concerns have been raised against usage of removable smart cards in the M2M case. On the one hand, maintenance operations necessitating exchange of such smart cards, e.g., for updates or operator change, is to be avoided, as it would be very costly for a large fleet of geographically dispersed M2ME. Another option cautiously considered recently is the download of AKA credentials to a secure environment in the device. One possible scheme using genuine TC technology allowing for this option is a virtual SIM.

In any case, the security requirements and also advanced OTA or remote management, require particular security features on M2ME and H(e)NBs. A TrE may be used for these purposes. The TrE needs to securely interact with other parts of the system. It is interesting to look at these TrE interfaces, as they are a general model for how the TCB of a TS communicates with the rest of the platform. Basically, all TrE interfaces are initialized in the secure start-up process of the TrE, and are thus assumed to operate correctly. There are two broad security categories of TrE interfaces. First, there are unprotected interfaces. These interfaces let the TrE with general resources of the device which are not assumed to be secured against tampering and/or eavesdropping. Even unprotected interfaces may benefit from other security measures such as data encryption, or making the interface available only after the TrE checks the code of its counter-part resource across the interface, for example, during a secure boot.

Second, there are protected interfaces. These interfaces provide either protection of the integrity and/or confidentiality of the data carried across them, using either security protocols or secure hardware. If security protocols are used, they may also provide authentication, and message authentication and/or confidentiality.

Figure 8:
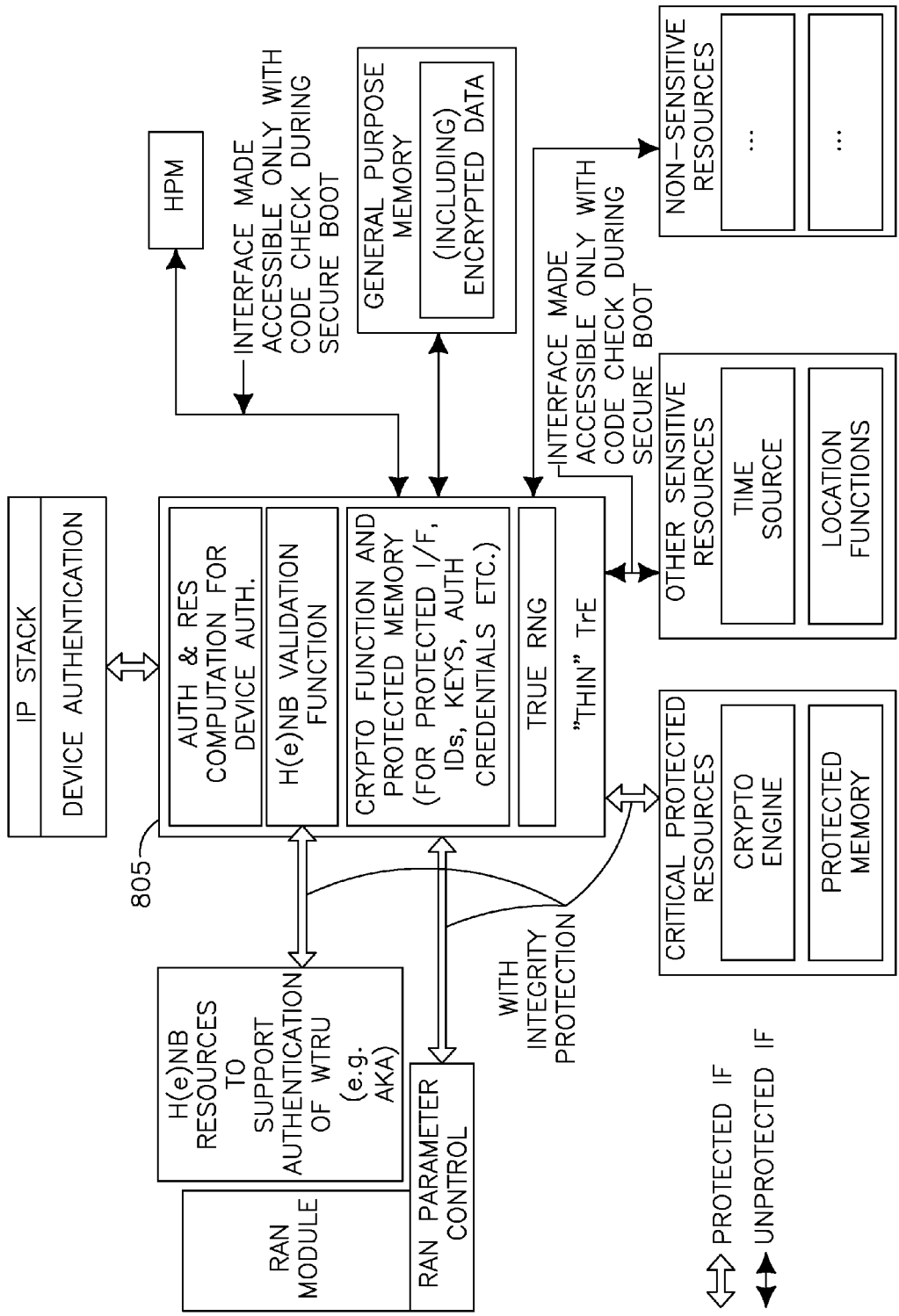
FIG. 8 shows an example block diagram of a "thin" trusted environment (TrE) in an H(e)NB.

Unprotected interfaces may be chosen when the communicating entity does not provide protection of the communicated data. Protected interfaces may be chosen when there is a need to provide protection of data integrity and/or confidentiality between the TrE and another resource that the TrE needs to communicate with. Accordingly, the capabilities of the TrE may vary. FIG. 8 shows an embodiment for a TrE within an H(e)NB and what other resources it might connect to. This is a minimal configuration including the capability to compute and send to the SeGW the parameters needed for device authentication of the H(e)NB, functions for H(e)NB validation, including code-integrity check of the rest of the H(e)NB at boot time, and minimal crypto capabilities (a true random number generator). With regard to authentication, it is envisaged that TrE may logically contain the HPM.

Figure 9A:
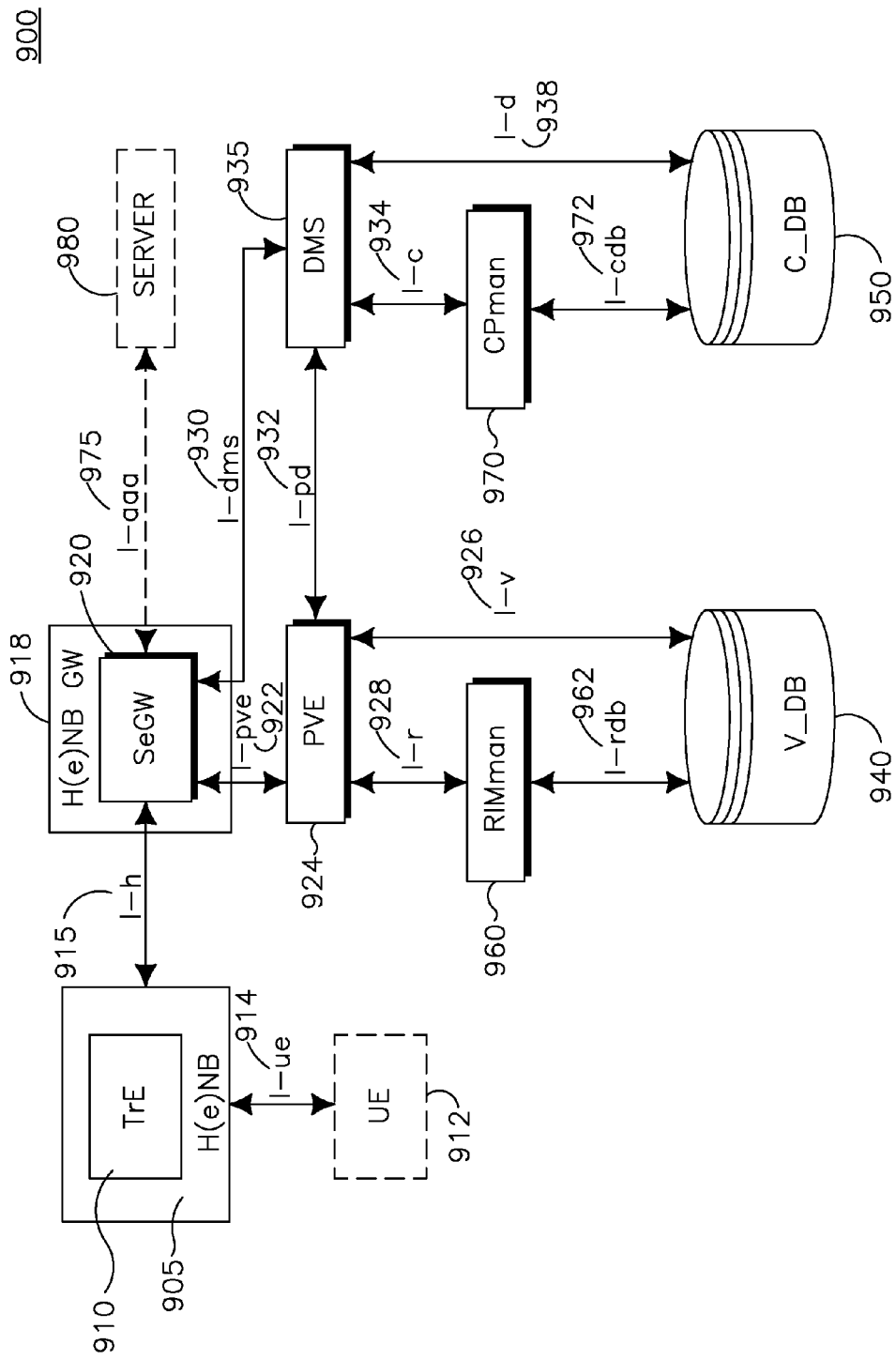
FIG. 9A shows an example diagram and method of indirect device connection.
Figure 9B:
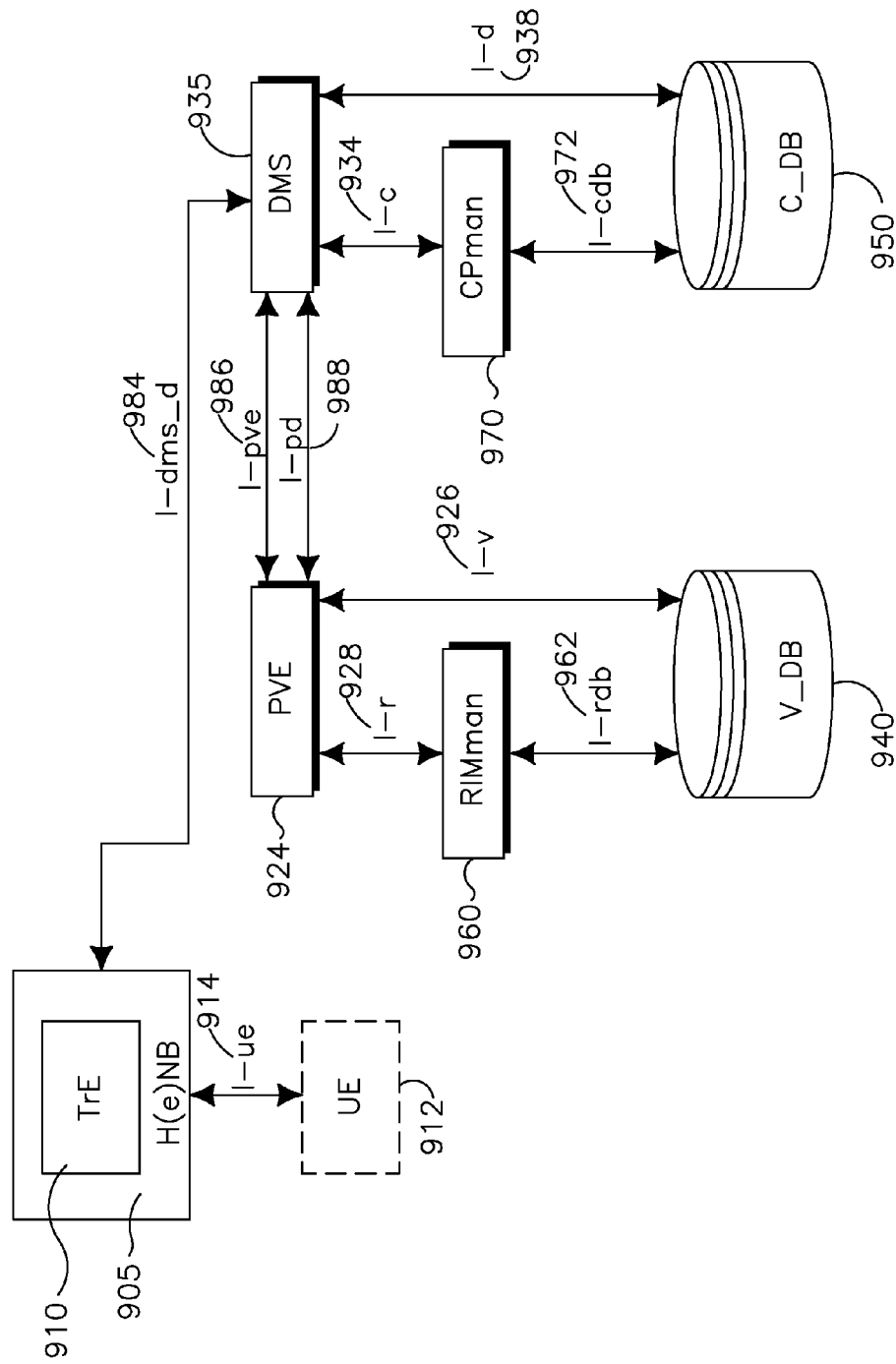
FIG. 9B shows an example diagram and method of direct device connection.

The architecture of the general PVM description may easily be mapped to the existing H(e)NB architecture. The databases (V_DB and C_DB) and their management components are new to the existing H(e)NB infrastructure. FIGS. 9A and 9B show both scenarios, H(e)NB connection through SeGW and direct connection of H(e)NB to HMS via interface I-hms d.

The PVM architecture or system 900 of FIG. 9A includes a H(e)NB 905 having a TrE 910. A WTRU 912 (or user entity (UE)) may be in communications with the H(e)NB 905 via an I-ue interface 914. The H(e)NB 905 communicates with a H(e)NB gateway (GW) 918, that includes a SeGW 920, via an I-h interface 915. In general, the interface I-h 915 between the H(e)NB 905 and the SeGW 920 may be unprotected and special measures may be applied to secure this channel for authenticity, integrity and, optionally, confidentiality. I-h 915 may be used to establish the link between the H(e)NB 905 and the SeGW 920 and thus the CN. For example, the SeGW 920 may communicate with an AAA server via interface I-aaa 975. The operator may have established appropriate measures to ensure the security of the interfaces.

An I-pve interface 922 may be used by the SeGW 920 to contact the PVE 924 during validation. The PVE 924 may use I-pve interface 922 to signal the outcome of validation to the SeGW 920. The I-dms interface 930 may be used for device configuration related communication between the H(e)NB management system (HMS) 935 and the SeGW 920. The I-pd interface 932 may be used by the PVE 924 to communicate with the HMS 935 and vice-versa. This interface, the I-pd 932, may be used during device management procedures, such as for device software updates and configuration changes.

The interfaces I-v 926 and I-d 938 may be used by the PVE 920 to read RIMs from the V_DB 940 and by the HMS 935 to read allowed configurations from the C_DB 950, respectively. The interfaces I-r 928 and I-c 934 may be used by the PVE 920 to communicate to the RIMman 960, such as in case of missing RIMs in the V_DB 940, and by the HMS 935 to communicate with the CPman 970. The RIMman 960 and the CPman 970 may use the interfaces I-rdb 962 and I-cdb 972 to read, write, and manage the validation of the database V_DB 940 and the configuration policy database C_DB 950, respectively.

FIG. 9B illustrates a PVM 982 where the H(e)NB 905 may connect directly to the DMS 935. For example, in the case of a fallback mode in which the H(e)NB 905 is not capable of performing the security protocols with the SeGW.

In this case, the HMS 935 may act as the point of first contact for the H(e)NB 905 via an interface I-dms_d 984 and communicate with the PVE 924 via interfaces I-pve 986 and I-pd 988 to perform a validation, or at least to get to know which components have failed during secure start-up. The HMS 935 may act upon this information for remediation.

Validation using PVE may directly be mapped to the H(e)NB scenario in various ways. The DMS' functions are performed by the HMS or an appropriately extended entity, evolved HMS (eHMS), which is capable to access the C_DB.

For policy based updates the C_DB provides a policy that specifies the criticality of modules and the interoperability of the various release versions of the modules, for example, some modules may be critical for operation and some may not. This is helpful in limiting the size of the update and provides patches instead of a complete firmware update. The policy may be as simple as one that defines all modules as critical for operation of H(e)NB and therefore a complete firmware update is done.

When a module fails measurement, then eHMS inspects the policy to check for the criticality of the module and any impacts on interoperability of modules. Based on this, a list of applicable patches is created. Patches may be collectively or individually sent to the device for application. In either case, each unit of transfer is integrity and confidentiality protected. The link has to deliver the packets in order and without loss. Upon receiving all the patches, such as when indicated by eHMS by a terminating package or flag, if required, the device sends a list of received patches along with their measurements to the eHMS to confirm the update information or if a collective and individual patch measurement is sent by the eHMS then performs local verification of the patches and begins application. Following the application of the patches, the system boots in normal mode and starts the device validation process.

This procedure may also be followed whenever there is a new firmware release from the manufacturer, such that the eHMS sends an update notification to the device and the device boots with ECB and sends the measurements to eHMS. The eHMS provides the patches or a complete firmware update and the same procedure is followed.

In the case of a previously known good state, if the H(e)NB supports storing system state, then the eHMS may ask it to return to a previously known good state where the patches that failed measurement are rolled back. This method may be used to bring the system back into factory state. The previously known good state may be a state that is certified by the PVE, eHMS or S(e)GW.

A H(e)NB may return to a previously known good state, may provide integrity protection of system states, may provide a restore operation of previously stored system states, and may have to protect this restore operation in case of a compromised device.

Described herein are examples of validation of devices connected over the public Internet. For devices which are connected to the SeGW, respectively, the CN, over an insecure initial link, such as the public Internet, special requirements may apply for securing the initial steps of validation. These special requirements may also be applicable to the H(e)NB type of devices which request such a connection from the SeGW, and validate through it. Although the H(e)NB counterparts of network entities, such as a HMS instead of the generic entities of PVM, are described herein, it should be apparent that the same methods and apparatus may be applied in the non-H(e)NB setting. Typically, validation and authentication are required to be bound to the first few steps of the initial connection, or even into the same data structure. Two variants of binding validation and authentication to specific protocols such as TLS and IKEv2 are described.

The transport protocol of IKE, ISAKMP, defines a number of certificate profiles that may be used, and they allow a fully qualified domain name (FQDN) as IDs. The device certificate and TrE_certificate may be kept separate. However, it may be possible to nest the TrE_certificate into the device certificate. If the TrE had a separate ID (TrE_ID), the FQDN may be used but the TrE may be identified by the manufacturer rather than the operator domain names.

Where the IKE SA_INIT phase and thus the Diffie-Hellmann key exchange is completed in phase 1 of the IKE conversation, one method may have the SeGW send the first authentication exchange message containing the CERTREQ payload to request Dev_CERT. Then, the device answers with two CERT payloads in the next message, one using Dev_CERT, and one for TrE_CERT. In this case, SeGW defers verification of Dev_CERT until TrE_CERT is verified and validation data evaluated by PVE. After that, authentication proceeds. In case the answer contains only Dev_CERT, SeGW falls back to AuV.

The distinction between Dev_CERT and TrE_CERT may be advantageous if the respective IDs are different for practical reasons. For instance, the operator may have assigned a network address, e.g., such as an IP address, to devices, which are authenticated by Dev_CERT to directly build the IPSec tunnel from. Some type of network addresses may be unsuitable for the TrE_CERT. Thus the two IDs may be useful in the device. It may be a further task of the SeGW/PVE infrastructure to serve for the exchange of the Dev_CERT, by applying the performing PVM and a subsidiary authentication based on TrE_CERT.

Figure 10:
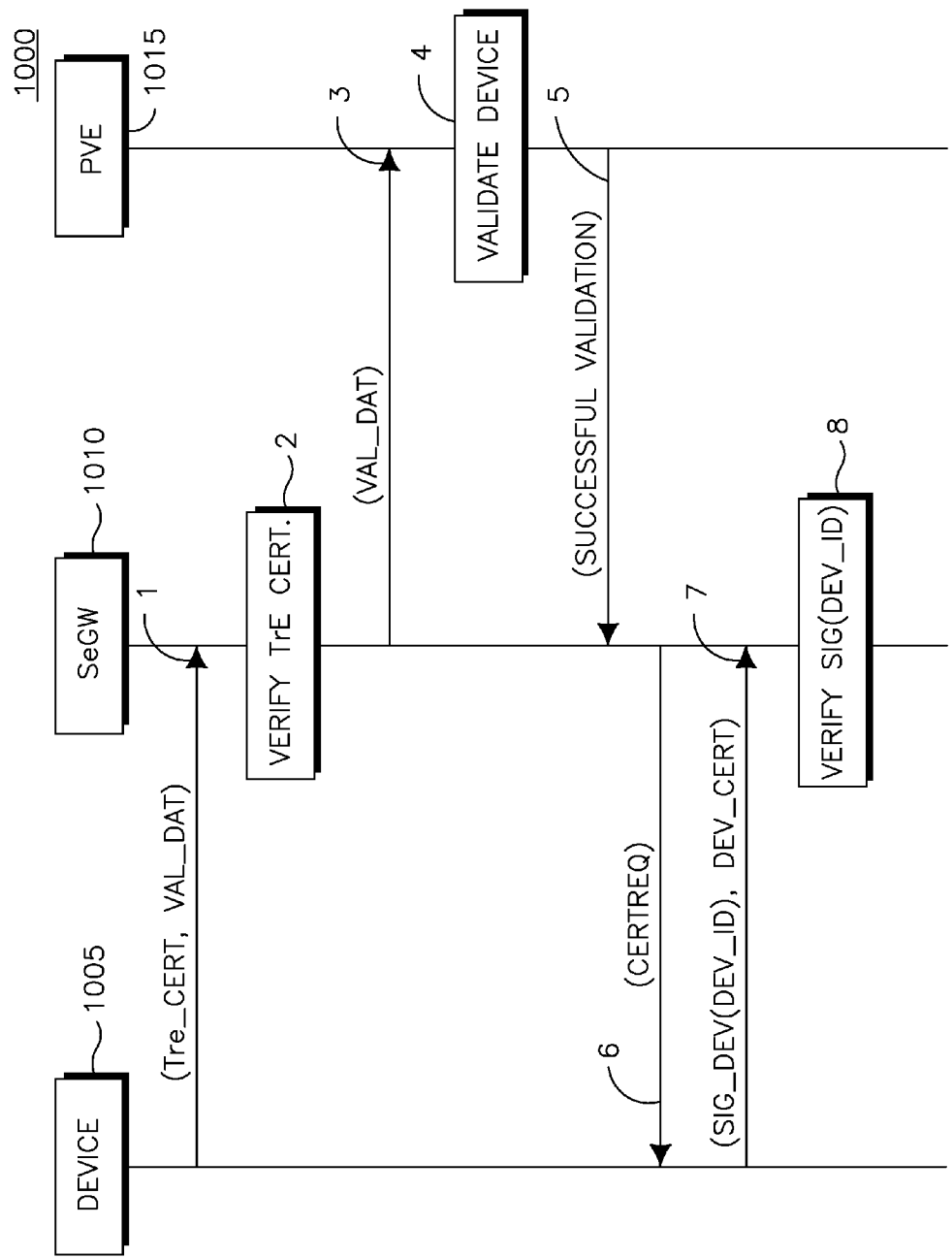
FIG. 10 shows an example flowchart of processing separate certificates.

IKE authentication messages may carry any number of payloads of any type. In the header of every payload, it may include a 'next payload type' field. Thus, a whole chain of payloads may be sent in one ISAKNIP message. This may be used to separate the certificates into payload fields of one or more ISAKMP messages of phase 2 of the initial IKE conversation. An example process 1000 between a device 1005, a SeGW 1010 and a PVE 1015 using an IKE conversation completely separating the certificates for TrE and device authentication is shown in FIG. 10. A message including (TrE_Cert, VAL_DAT) is sent from device 1005 to a SeGW 1010 (1). The SeGW 1010 verifies the extracted TrE_ certificate, TrE_Cert (2). If the TrE_Cert is successfully verified, the SeGW 1010 sends a validate data message, VAL_DAT, to the PVE 1015 (3). The PVE 1015 validates the device 1005 (4) and signals success to the SeGW 1015 (5). The SeGW 1015 sends a certification request, CERTREQ, to the device 1005 (6). In response to the certification request, the device 1005 sends at least a device certification, (Sig_Dev(Dev_ID), Dev_Cert), to the SeGW 1010 (7). The SeGW 1010 verifies the Sig(Dev_ID) (8). If verification is successful, the device certification, Dev_Cert, is sent to the AAA infrastructure which responds with whether the device is known. In accordance with this embodiment, only devices which can be trusted to validate, by transmitting validation data signed by a TrE, with identity attested by TrE_CERT, are admitted to device authentication. This provides extended protection to network components behind the SeGW and helps mitigate DoS attacks.

In another example, a TLS handshake message for supplemental data defines an extension to TLS hello hand-shake messages which allows sending application specific data, such as, the validation message from PVM, in the TLS handshake. The supplemental_data may not be used by the TLS protocol but by the applications, such as the PVE validation engine. There may be a single supplemental_data handshake message allowed, but receiving more than one may be treated as a failure. The type and format of the carried data may be specified as SupplementalDataType and may be known to both sender and receiver.

In a variation, a double-handshake may be performed, thus providing protection for the performing PVM data carried in the SupplementalData handshake message. Further it may ensure that the parties are mutually authenticated before either party provides SupplementalData information.

A new SupplementalDataType may be defined to carry the performing PVM validation message. The H(e)NB then engages in the first TLS handshake for mutual authentication with the SeGW. Then the second handshake may be protected using the first TLS session and the validation data is sent in a SupplementalData field to SeGW.

In another variation, the validation data may be sent in one handshake exchange rather than two, by sending the supplemental data in the first handshake message. With regard to validation connection using TLS session ticket extension, a TLS extension which allows the server to issue a session ticket to the client to resume sessions and keep the per-client session state, may be used in validation by the SeGW to store the validation outcome in a TLS session ticket.

Such a session ticket may be used for platform management in PVM. When validation fails with a certain list of failed components, the SeGW receives this notification from the PVE, and generates the session ticket. The ticket is encrypted using an 128-Bit AES symmetric key, which is not disclosed to the H(e)NB, and the ticket is also integrity protected by an Hash-based Message Authentication Code (HMAC). Thus it cannot be altered by the H(e)NB and it may be recognized by other network entities when it is presented by the H(e)NB. The TrE may then securely store the ticket and use it in new TLS sessions for platform management, without, for example, having to send validation data again. The SeGW may also decide on the lifetime of the session ticket.

The AES ticket encryption key may then be included in the T_PVM for further use, or handed directly to other entities. The key and, for example, the ticket timestamp and detailed validation results, may then forwarded from PVE to HMS. Using the TLS session ticket, H(e)NB may directly establish a secure connection for platform management. This may rely on the H(e)NB following up the platform management task timely, and to contact the HMS before the ticket expires.

Where the H(e)NB has concluded remediation with the HMS using a connection established with the session ticket, the session ticket may then be used for revalidation. The first step may be to establish a new TLS connection from H(e)NB to the SeGW using the old ticket. The SeGW may then control that this ticket comes from an H(e)NB which actually has concluded the management cycle with the HMS. It may look up and compare ticket data with the T_PVM returned from the HMS after the completed management. If a correct T_PVM is found, the revalidation attempt using the TLS ticket may be accepted, for example, to protect against DoS attacks mounted by using the TLS ticket for replay. TLS tickets may be accepted for revalidation, which would otherwise be considered expired, since remediation steps with HMS may take long. This may be done without a major loss of security, since the SeGW has the time-stamped, T_PVM available for comparison.

Described herein is an example of PVM with autonomous validation (AuV). AuV is a method which does not deliver any validation data to the SeGW, and thus does not require any change in existing protocols for initial network attachment of devices. Thus, the PVM system does learn anything about the outcome of the verification during secure start-up of the device. The only device-specific information transferred is the Dev_ID.

AuV limits the possibilities to manage devices based on the outcomes of platform validation. In particular, there is no straightforward way to distinguish between devices which are initially authenticating to the network, and which are performing AuV for revalidation after an update. Device management, if it is based on AuV, requires databases in the network carrying the history of device states. Described herein are example methods that may be effective to at least perform rudimentary device management based on AuV.

Described herein is an example of H(e)NB remediation for AuV-only capable devices. AuV-only capable devices implement a secure start-up which allows the device to perform device authentication procedures if and only if local device integrity verification is successful. If any of the components fail their integrity check, the device may be considered as having failed its integrity check. However, by the use of the FBC image, the device may contact a designated HMS to facilitate device remediation.

Once connection to the remediation HMS is established, the normal code image of the H(e)NB and/or trusted reference values may be replaced. Upon completion of the remediation process, the H(e)NB should reboot and the integrity check process should start over again.

PVM may use FBC if a set of predetermined requirements are in place. One example requirement may be that the FBC is securely stored within the device. Another requirement may be that the FBC may be loaded and started in case of a failed secure start-up. Yet another requirement is that the address of a designated H(e)MS is stored securely in the FBC image. Still another requirement may be that the FBC may send a distress signal to the designated H(e)MS. Such a signal may include the device ID and the message may be integrity protected by a key securely stored as part of the FBC. A further example requirement may be that the H(e)MS upon receipt of the signal may be able to ascertain that the device has failed integrity check and requires maintenance. Yet another requirement may be that the FBC may include functionality to facilitate a full code rebuild initiated by the network. Another requirement may be that the FBC may include functionality to facilitate replacement of TRV(s) initiated by the network.

Figure 11A:
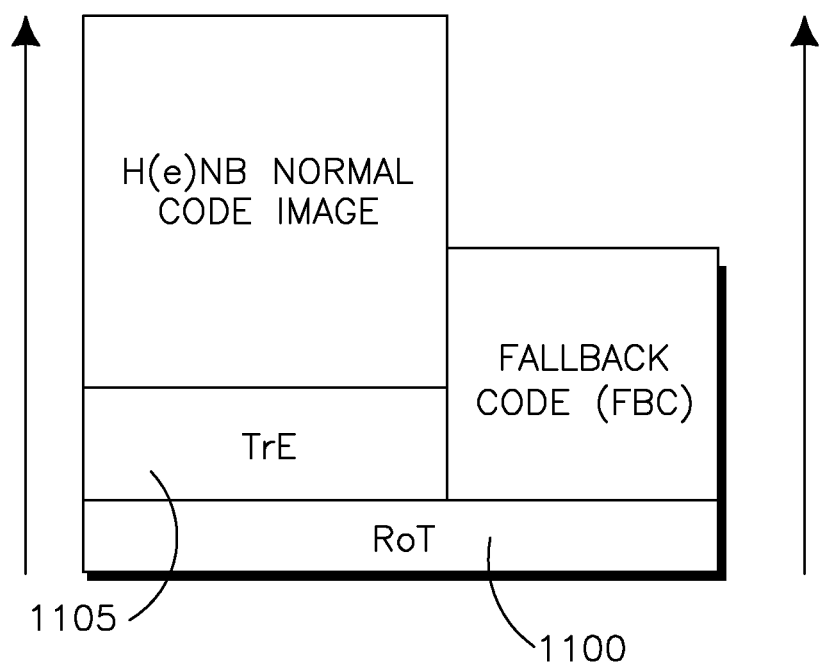
FIG. 11A shows an example method of validation with a failure of integrity verification followed by device remediation facilitated by a fallback code base.
Figure 11B:
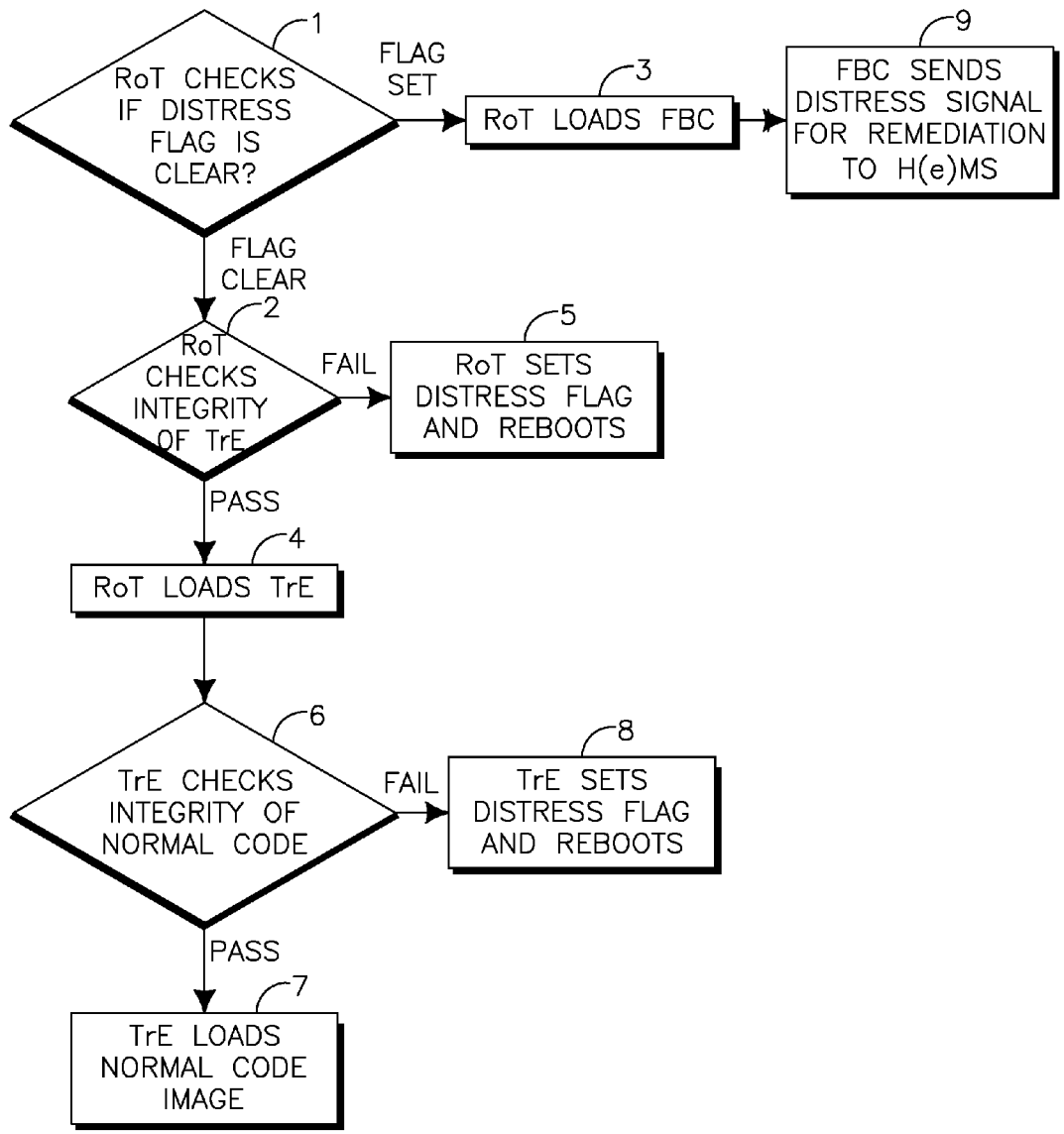
FIG. 11B shows an example flowchart in accordance with the method of FIG. 11A.

FIGS. 11A and 11B show an example method for a failure of integrity verification followed by device remediation facilitated by a FBC. A RoT 1100 checks a distress flag (1). If the flag is clear, RoT 1100 checks the integrity of TrE 1105 (2). If the flag is set, RoT 1100 loads the FBC (3). If the integrity check is successful, the RoT 1100 loads the TrE 1105 (4). If the integrity check fails, the RoT 1100 sets a distress flag and reboots (5). Once the normal code is loaded, the TrE 1105 checks the integrity of the normal code (6). If the integrity check is successful, the TrE 1105 loads the normal code image (7). If the integrity check fails, the TrE 1105 sets the distress flag and reboots (8). If the RoT has loaded the FBC, then the FBC initiates the sending of a distress signal for remediation to the HMS (9).

Described herein is an example of a base method for revalidation and configuration change with AuV. The only individual information transferred to the SeGW during AuV and potentially usable in platform management, is the device identity. Thus, one embodiment may assign a multitude of identities to a device to use them in AuV to signal a (finite number) of states such as component integrity verification failures. In another embodiment, group IDs may be used that are not specific to any single device, to signal verification results. Management identities would be grouped according to the stages of the secure start-up process. For example, DevM_ID3b for signaling failure at stage 3b, DevM_ID3a for signaling failure at stage 3a, and DevM_ID2 for signaling failure at stage 2. Stage 1 failure cannot be signaled since then the device lacks communication capacity.

In another example for the AuV use case, the device may attempt to connect to the HMS as a course of action following failure and execution of the fallback code.

The failure of a single or multiple components in stage 2 does not imply that the device won't be able to communicate. The stages are understood as classes of components which belong to certain categories. As long as the most essential components of stage 2 are loaded, the device may be able to communicate its state and the failed components to the PVM system. This may be the case if there is a policy manager on the device, maintained by the HMS, which provides a framework for the criteria under which attachment is possible.

For security, the DevM_IDn and associated authentication data (for example private keys) must be well protected, since otherwise attackers may subvert the management process by performing spoofing attacks. This is a dangerous threat, since the management IDs are identical for a large group of devices. One solution may be to model the platform management process using only this information. Binding the first validation, which signals the failure of some device of unknown identity, to the revalidation should signal success of the management process for a unique device. There are various methods to do this deterministically. In one example, after the device has authenticated to one of the management identities, the SeGW runs a supplementary protocol in which the device has to authenticate to the original Dev_ID. In another method, by exchanging certain secrets, device and PVM system, and specifically SeGW, establish a management session spanning the first validation process and the second, revalidation, process.

Described herein is an example of a supplementary authentication protocol. The device and SeGW have completed the first authentication protocol with the device, in which the device authenticated to one of the management identities DevM_IDn. Therein, it is assumed, they have established an encrypted and authenticated communication session. Then, the device may simply transfer the Dev_ID and authentication data for Dev_ID. For example, a signed message and a public key certificate may be transferred over the established secure channel. This ensures that no one else may know the identity of the device calling for management and use this knowledge to spoof the management process, that is, invalidate the device before revalidation, or impersonate the device.

The SeGW transfers the DevM_ID and Dev_ID to the PVE, which inserts it in a list of devices which are in need of management. PVE then signals the necessary device management action to DMS, for instance 'install stage 2 fallback code'. DMS downloads the corresponding code over the secure channel, established previously by the SeGW, to the device. As in normal PVM, the system then initiates revalidation of the device.

When the management succeeds, the device subsequently authenticates toward its original Dev_ID in AuV. This is signaled by the SeGW to the PVE, who recognizes the Dev_ID in the revalidation list and deletes it. Otherwise, the device may validate to the management ID again, which may also be recognized, and further action taken in accordance with a policy.

Described herein is an example of a management session establishment. This embodiment differs from the other embodiment in that the PVM makes the management unique to a single device. A management session may be established in the communication protocol between device and SeGW. The effect of such an approach is that the device identity may remain unknown to the PVM system, essentially by establishing a pseudonym.

The capabilities of protocols to establish such a persistent secret in a normal protocol run may be limited. For instance, common key establishment protocols, such as Diffie-Hellman (D-H) satisfy a property, called joint key control, such that the established key depends on both parties. That is, both parties insert (pseudo-) random information into the protocol resulting in different keys in every run. A session spanning multiple runs cannot be established using such protocols.

Thus SeGW and device have to establish a secret in a special protocol, for instance by using a challenge-response. The challenge may be posed by either device or SeGW, and the response must be such, that the second answer in the second run, the revalidation, is identical to the first round's answer. In a trivial embodiment, the device just shows a nonce obtained from the SeGW in the revalidation, and the SeGW looks it up in a table. The nonce is thus a pseudonym. More involved cryptographic protocols may be used.

Revalidation may then proceed as above. A difference is, however, that in this variant the SeGW maintains the information about the device that revalidates for practical reasons, since it may be used in the protocol run belonging to revalidation, between SeGW and the device.

Described herein are embodiments for OMA Device Management (DM) based architecture for H(e)NB. OMA DM is a device management protocol jointly specified by the Open Mobile Alliance (OMA) Device Management (DM) Working Group and the Data Synchronization (DS) Working Group. OMD DM was developed for small foot-print mobile equipments, such as phones or PDAs. It lacks support for broadband wireline connectivity between the equipment and DM server and only supports short-haul wired connectivity, such as USB, or RS232C, or wireless connectivity, such as GSM, CDMA, or WLAN. It may, however, be useful as a device provisioning and management protocol for the H(e)NBs, especially for H(e)NBs that also may present itself as a WTRU to the core network while presenting itself as a base station to the CSG and non-CSG WTRUs that connect to it.

The OMA DM is intended to support use cases such as provisioning, including first-time device configuration and enabling or disabling features, device configuration updates, software upgrades, and diagnostics reporting and queries. The OMA DM server side may support all of these functions, although the device may optionally implement all or a subset of these features.

The OMA specification may be optimized to support the above-listed features for small foot-print devices with constrained connectivity. It also supports integrated security, using authentication, such as by use of such protocols as EAP-AKA.

The OMA DM uses XML, or, more accurately, a subset from SyncML, for data exchange. This may be useful for providing a standardize-able yet flexible way to define and convey attributes for software modules or functionality for the H(e)NB, for the purpose of validation.

Device management takes place between a DM server, for example, the managing entity for the devices, and the client, such as the device being managed. The OMA DM supports transport layers such as WAP, HTTP, or OBEX or similar transports. DM communication is asynchronously initiated by the DM server, using any available methods such as WAP Push or SMS, using either a Notification or an Alert message. Once communication is set up between the server and the client, a sequence of messages can be exchanged to complete a given DM task.

The OMA DM communication is based on a request-response protocol, where requests are normally made by the DM server, and the client may respond with a reply message. The server and the client are both stateful, meaning any data exchanged due to a specific sequence may occur after the built-in authentication procedure.

Since DM communication may be initiated by the DM server, implementing PVM over DM may require a server-query-based approach to validation. For example, a device authentication procedure using IKEv2 may be used, which may be initiated by the device. Several different message types may be considered as a conveyor of the validation data. For example, it may be sent in a list of failed software modules or device functionality. In another example, a Management Alert message may be sent from the device to the server. Alternatively, the user of the Generic Alert message (that can only be sent from the device to the DM server after there was a transmission of at least one Management Alert message from either the device or the server) may also be considered. These messages including the Alert messages may use SyncML format which provides flexibility in specifying the contents and meta data for the contents. This may be useful for validation information transmittal. The DM may also support segmented data transfer, which may be useful for software update where the size of the update may be large.

Although the very first DM communication has to be initiated by the DM server, subsequent communication may be initiated by the DM client using a continued session. Such an ability of the DM client (the H(e)NB or the M2ME, as examples) to initiate in-session communication may be useful for device-initiated tasks such as device-initiated revalidation or device-initiated validation message delivery.

Described herein are examples of binding of validation in authentication certificates. The binding of validation in authentication certificates allows for a combined validation and authentication, thus automatically binding the authentic ID of the device to the validation. The validation message is then included in the authentication certificate in an additional field. For example, using the IKE protocol, such verification data could alternatively be embedded in the Notify Payload field.

If verification data is stored inside the authentication certificate, a new combined authentication/validation certificate must be issued every time the device configuration changes. The generation of the certificate must be controlled by the SeGW, since it is the entity in charge of authenticating Dev_ID for the purpose of PVM. This may be done in at least two ways. First, the SeGW, or a subordinate entity may generate the new certificate after receiving an updated Clist from DMS. Second, the device may generate the certificate itself, send this to the SeGW and PVE, which then signs it and sends it back to the device.

The SeGW may finalize the process (either generating and sending the new certificate, or acknowledging the new one generated by the device) after successful revalidation of some sort. This is to assure the PVM system that the new configuration is actually reached by the device.

Since a new certificate may be needed upon device configuration change, this cycle involves all three entities in the CN and the device. The DMS triggers the configuration change (for example update of software and/or parameters) and saves the new desired state in the policy database C_DB. After the change is applied to the device, a revalidation will have to occur.

In an example scenario, the device applies the update and performs a revalidation. The new software is used, but the new certificate cannot be deployed to the device until a revalidation (especially of the successful update process) has completed. At this time, the device is running the new software configuration with an old certificate which does not match the actual device configuration. In response, a new certificate is provided for device authentication to the device; provided if and only if the update has been applied; and it is ensured that the certificate cannot be used without the update being applied.

Described herein is an example of device authentication certificate revocation. If, during device authentication, the SeGW determines that the device certificate sent from the device for device authentication needs to be revoked, the SeGW may indicate to the device that device authentication has failed because of certificate revocation and then delete the device from the network maintained white list, or conversely, the network maintained blacklist. The device upon receipt of this indication may know that its certificate has been revoked and that its identity has been removed from the white list, or conversely, added to the blacklist. The device may then perform procedures to re-establish itself as a valid entity on the network.

The SeGW may revoke the device certificate if the device ID is invalid, the device certificate has expired, or the trusted third party operator authorized entity which issued the H(e)NB device and its associated certificate has requested the network to revoke the certificate.

Described herein are embodiments for certificate-based validation base methods. The binding certificate is a signed data-set. It is signed by the issuer, the SHO, or its SeGW or a subordinate entity responsible for managing these certificates. The signed data in the certificate comprises at least a Dev_ID, the device public key used for authentication and validation, and a Clist.

This certificate may be sent in the combined validation and authentication message to the SeGW. The latter is a message (part of which is) signed by the device with its private key for authentication and validation. The message may contain other data such as a time-stamp and/or a nonce for replay protection. The SeGW checks the signature of message and certificate and proceeds with validation as usual.

Described herein are example certificate exchange methods. In general, two variants may be applied. These are identified as pre and post-certificate exchange. They differ in whether revalidation uses the old or the new certificate. Both variants ensure that all required steps are performed atomically, that is that either all of them are completed or none of them. The starting condition is where the device runs an old configuration with an old certificate and the ending condition is a new device configuration and a new device certificate. The authentication certificates and RIM certificates may need to be created, managed and handled by an independent TTP or the manufacturer to allow for use of devices on many networks rather than tie them to one operator. Alternatively, the new device certificates may be addressed by, for example, the Open Mobile Alliance (OMA) for device management (DM), which may be extended to include certificates.

In a pre-certificate exchange method, the update includes the new certificate, thus the certificate is brought into the device prior to completion of the update. After applying the update, the device revalidates using the new certificate. The device is marked as 'update in progress' using an appropriate storage and data structure in the CN. For example, setting a flag in the authentication database. Another method is to use the validation token T_PVM.

One example pre-certificate exchange flow is described herein. The DMS transfers the updated and/or changed components to the device as in standard PVM. The DMS then sends the new Clist to the SeGW. The DMS passes T_PVM to the SeGW. By this, the SeGW (and thus the PVM system) enters a state where it expects a revalidation with the new configuration from the device. The SeGW collects necessary information (Clist, Dev_Id, device public key, and others) and generates the new device certificate. The SeGW collects necessary information (Clist, Dev_Id, device public key, and others) and generates the new device certificate. The SeGW then sends the new certificate to the device and then closes the communication session with the device.

The SeGW is now in possession of the T_PVM obtained from DMS and thus knows to expect a revalidation from the device. It stores the T_PVM for all such devices in an internal revalidation list. Assuming that the device correctly installs the updates and new certificate, then the following process applies. The device initiates revalidation, sending the new certificate in the validation message. SeGW authenticates the device by verifying the signed data and device certificate. SeGW looks up the T_PVM in the revalidation list. Revalidation takes place, wherein the PVM system state is maintained by using the T_PVM from the previous validation (and not generating a new one). This and the previous step take place at the SeGW and not at the PVE, otherwise the SeGW would automatically generate a new token. Thus maintenance of the revalidation list is performed for the SeGW.

Using the T_PVM continuously over many rounds of revalidation is, as in standard PVM, useful to detect recurring update failures and other patterns of irregular behavior.

In a further embodiment, the TrE has a Trusted Update Service which allows the HMS to send updates to the device which are then applied in a secure and trustworthy process. The secure start-up may be relied upon to ensure integrity of the update service in the TrE. When the HMS deploys the new update, it may send a token to the SeGW containing the new updated device configuration. The SeGW may then create a new authentication certificate for the device and append it to the token which is sent back to the HMS. The HMS includes the new certificate together with the update data for the device's update service. This package may be encrypted for the TrE and signed by the HMS. The Trusted Update Service receives the update package, verifies the signature, decrypts the data, applies the update and stores the new certificate in secure storage. The TrE then signals the successful update to the HMS. Since the Trusted Update Service is protected by the secure start-up, the update process may be trusted, so that a revalidation is not necessary. Depending on the type of update, a reboot may be necessary. In this case, the device may authenticate with the new certificate at the SeGW. Therefore, the HMS must make sure that the SeGW is informed about the revalidation that will occur.

In another embodiment, if no trusted update service is available on the device, the new certificate may be supplied with the new software update such that the certificate is encrypted with a key which is bound to the successful installation of the update. This method and its implications might need more consideration.

In a post-certificate exchange method, the update may not include the new certificate containing the new device configuration. The device uses the old certificate and performs a revalidation. After successful revalidation, the CN activates the new certificate and sends the new certificate to the device. As the device may not have the new configuration to perform secure start-up, the new configuration is sent to the device, though it does not yet have the new certificate.

Figure 12:
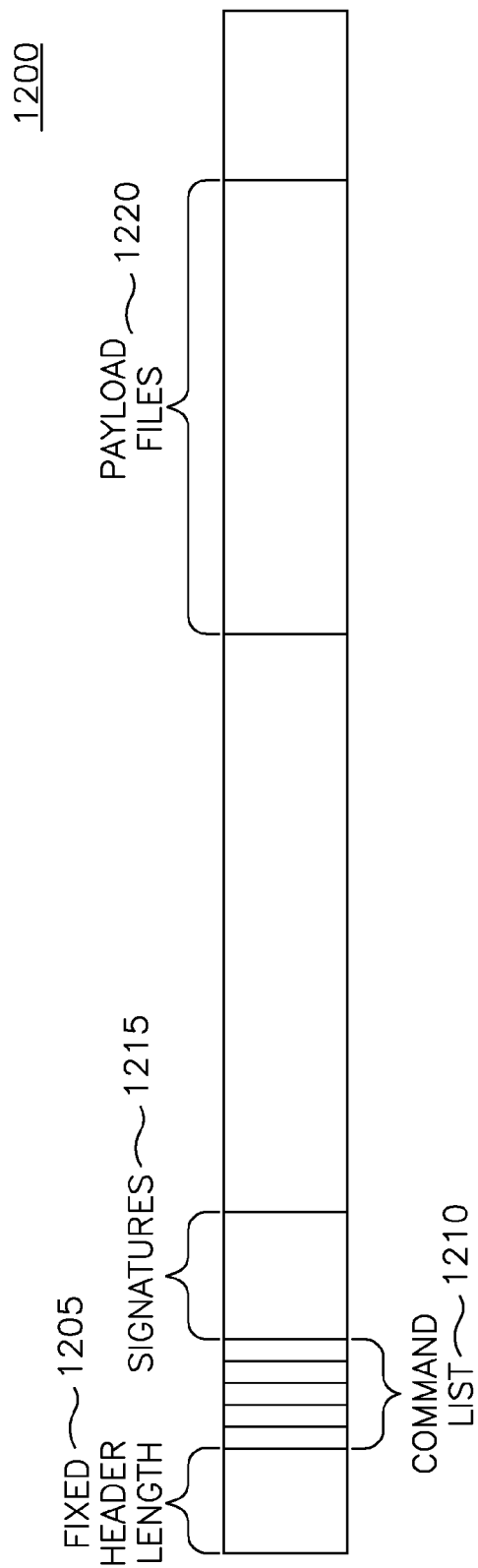
FIG. 12 shows an example format for a reference integrity metrics shielding header.

Described herein is an example of operator RIM-shielding. A wireless area network (WAN) Management protocol may be used for the remote management of devices. FIG. 12 shows an example diagram of a signed message format 1200 that may allow for the download of software packages from the issuer to the device. The format allows one or more files, such as firmware updates or configuration packages, to be sent in a single signed package. The receiving device is able to authenticate the source and contains all instructions to install the contents.

A header 1205 may contain the format version and the lengths of the command list and payload components. A command list 1210 contains the sequence of instructions that may be executed to install the files contained in the package. A signatures field 1215 may contain a digital signature whose signed message data consists of the header and the command list. Although the signed message data includes only the package header and command list, the signature assures the integrity of the entire package because all commands that refer to payload files 1220 include a hash of the file contents.

In the case of operator RIM shielding, the DMS signs the command list and includes the software packages and their respective RIMs in the payload of the message. The device's TrE then uses a public key to verify the DMS' signature. This public key may be made available to the TrE at manufacture or deployment time, or by an operator trusted CA. All root certificates which are needed to verify the public key may be stored securely in the TrE. The command list then includes the commands to install the software and for the RIM ingestion into the device. This provides an effective way for the operator to have full control over the software and RIM installation process on the device. Explicit transport of RIMcs to the device may not occur in this implementation variant.

Described herein are examples for use of a second code base for remediation. A problem arising out of the failure of secure start up beyond the TrE, such as stage 2 failure in the generic PVM device model, is that the TrE may not be trusted to extend trust to remediation components loaded into normal execution space. Thus, to initiate remediation, a FBC may be invoked, but may need to run inside the TrE, at least for the most critical functionalities cryptography and remediation protocol stack.

In certain situations it may make sense to obtain the FBC from an external, secure source, called here a FBC carrier. This may be done by a process which is partially out-of band and may require human intervention such as inserting a smart card into the H(e)NB device. This procedure may provide enhanced security via use of a second secure element (smart card) as a FBC carrier, which securely stores and protects the FBC code, or by explicitly requiring human intervention in the remediation initiation procedure to mitigate simple, automated DoS attacks, and may be required contractually as a diligence from the HP. The external carrier FBC may be a measure to keep devices simple and cheap, and the TrE thin. The external carrier FBC may carry the executable binary of the FBC, including all required secrets for remediation and additionally may provide a secure execution environment for the FBC when needed. Using a separate FBC carrier may not be applicable in situations where the device is in a remote or hard to reach location. The process of trust establishment between the three entities described here is similar to various "transitive trust" procedures described earlier.

The following procedure may apply with an external FBC carrier such as a UICC, a smart card or a secure memory card with its own processing unit. The TrE is a relying party which may require an authorized and authenticated FBC code to be loaded. On the other hand, revealing FBC code to an unauthorized party is less of a risk, as long as the credentials for remediation remain protected. Authentication of the TrE toward the FBC carrier is less of an issue, since an out-of-band process is performed in which the TrE and device are actually not fully trusted. That is why the carrier should not reveal to the device the credentials used for HMS access. Revealing the FCB may be necessary and less critical.

Thus, the following authorization or communication sequence may be applied. The out-of-band or human intervention steps are only illustrative for a special use case, and may be automated or integrated in other variations where, for example, the FBC carrier is embedded in the H(e)NB. The communication may be very simple in such a fallback code base procedure, therefore authentication and authorization may be combined in single protocol steps.

Initially, stage 1 start up succeeds and stage 2 start up fails. The TrE stalls into "waiting for FBC" state and flashes LED or provides other similar indicators of failure. The user/HP inserts the FBC carrier. In this embodiment, the FBC carrier, e.g., a smart card such as a Hosting Party Module (HPM), authorises itself to TrE using a particular physical interface to signal FBC carrier presence and/or submitting an authorization secret, for example an OTP or a signed nonce. A security association (SA) that is an encrypted and integrity protected communication session is set up between the TrE and FBC. The FBC is then loaded into a secure environment which may either be provided by the TrE or the FBC carrier or any combination of capabilities of both environments. The FBC may then be integrity-checked if desired and is then downloaded and started.

After a secure start, the FBC uses a secret to show its successful load to the carrier and creates a fresh SA between the TrE (FBC) and carrier. The credentials for remediation remain in the carrier, but the FBC contains data for HMS discovery. The FBC contacts the HMS. An end-to-end SA between smart card and HMS is established, using the smart card protected credentials which remain unavailable to TrE (FBC) throughout. The HMS now knows that a valid TrE (FBC) is calling for remediation. The smart card hands over the communication session to the TrE (FBC) and the TrE (FBC) shows its ID to HMS. The HMS initiates remediation procedure. The authorization secret may be well-protected since this kind of connection may apply to many devices and thus a breach may be catastrophic. One method for implementing authorization is to use TPM-protected authorization secrets, such as 160-Bit HW protected values, as created in a take ownership procedure. Depending on the implementation, the FBC may be started directly from the FBC carrier, which then has to provide a safe and secure execution environment. In this case, even a compromised TrE may possibly be replaced. One example may be where an FBC carrier consists of a secure element, a micro-processing unit and memory to execute the FBC independently. The FBC carrier may be attached to the device via a common interface (e.g., USB, JTAG) and authenticate directly to components inside the device and then replace the compromised components and possibly parts of the TrE. In another variant, if signed code-images are used, the FBC carrier device may replace the image including the signature.

Since the TrE may not be fully trustworthy to correctly load and execute the FBC in some cases, and in most cases may not be able to validate FBC loading to the FBC carrier, some security enhancement may be included such that the FBC carrier has to establish trust in a remote code base execution. For example, the FBC carrier may generate a one-time-secret and embed it into the FBC using obfuscation methods. Alternatively, together with FBC, or directly after FBC, the carrier may transmit another authorization secret, which may be recognized and used only by a successfully started FBC. This secret is used by the successfully started FBC to obtain from some protected place in the TrE, a communication secret for the very next step of communication.

Described herein are examples for using internal parallel code bases for a fallback code. Internal parallel code bases may include trigger mechanisms and the fallback code base needed to facilitate remediation. For example, the H(e)NB may contain two code images, one normal mode and one fallback code image (FBC). Normal mode bring up may be implemented for both AuV and SAV in stages. In stage 1, the RoT in ROM verifies the TrE. If the TrE is valid then the next stage components may be checked. If any component thereafter fails its integrity check, then the code is unloaded back to the start of the TrE code. At this time, the TrE may start checking the fallback, such as remediation, code. If the fallback code passes integrity checking it can be loaded and started. The fallback code may contain some minimum set of device management (DM) code so as to establish connection with the HMS. Once connection to the HMS is established, the failed modules may be identified and updates sent to the HNB. Upon completion of the remediation process, the H(e)NB may be rebooted and the validation process started over again. The fallback code size may be kept small in order to facilitate communication with the HMS. There may be no need for a trigger mechanism or register since the code can be "rolled back" to the TrE and then loaded with the fallback code.

An additional variant "Hybrid (internal/external) code base" is described herein. The FBC may be stored inside the device as in the parallel code base case described above but the FBC is encrypted and integrity protected on the device. The TrE itself cannot be used to decrypt the FBC, otherwise, a compromised TrE may lead to a compromise of the FBC itself. The Hybrid solution stores the decryption and verification keys for the FBC image on an external secure element, such as a smart card or UICC. In the case of a start failure, the TrE signals this failure and the user/HP is required to insert the authentication token, i.e., the smart card into the device. Depending on the device characteristics, two options are available. In a first option, the authentication token only stores the key material, and performs a mutual authentication with the TrE in which or after which the TrE receives the necessary key material. The TrE performs the integrity check and decryption of the FBC and then loads and starts the FBC. In another option, the authentication token is improved in the sense that it may autonomously verify and decrypt the FBC stored on the device and then execute it, either using only the device's resources (e.g., using parts of the TrE to provide a secure execution environment) or by providing a secure execution environment inside the authentication token itself, where the FBC may be executed. This variant allows the use the larger storage capacity of the device for FBC storage, combined with the security of additional external secure element.

Described herein are embodiments for using internal sequential code bases. A device management protocol may define protocols and commands to install and change software configurations on remote devices and may include a 'reboot' command. It may not include the notion of the device sending a 'remediation-needed' message. However, combining the results of validation such as SAV and device management protocol, the HMS can use the device management protocol to initiate a re-installation, or reset, of the software components and then issue a reboot command for the revalidation.

Alternatively, the FBC may be able to delete or uninstall a part of the normal codes, leaving only the rest of the normal codes, and initiate a reboot followed by a revalidation. The FBC may be pre-provisioned with a list of the normal codes that need to be deleted or uninstalled. Alternatively, the FBC may obtain such a list from an external secure element such as a smart card (e.g., HPM). Alternatively, the FBC may obtain such a list from a network based entity such as the H(e)MS.

For this mechanism to work securely, it may have a trusted application on the device which may include the following properties: integrity protected; stored securely in the device; able to be started in case of failed secure start-up; establish a (secure) connection to HMS; capable to verify signature on software and commands from HMS; capable to install/uninstall software on the device; and capable to report that the device needs remediation A second, possibly redundant, code base image may be used to host this application. Following the description and adhering to the requirements stated above, the second code base brings some additional, and redundant, code into the device. All features provided by this code base may be needed in the case of a normal, successful secure start-up in the device. All features of the second code base may exist in the primary code base.

Another variation would be to replace the parallel design by a sequential design. This may involve the following sequence. The RoT verifies and starts the TrE, upon success. The TrE then verifies the remediation code, upon success. The TrE verifies the remaining software components, upon success. Otherwise, the TrE stores the failed modules and sets a flag that the device needs remediation. The TrE then triggers a reboot of the device. Upon reboot, after verification of the remediation code, the TrE conveys control to the remediation code and releases the list of failed modules. The remediation code may then use this list and contact HMS for device remediation processes.

Described herein are examples for SAV using security policy attributes. Notifying the PVE of which modules have failed the internal integrity checks may include creating a standardized list of all SW modules for all makes and models of H(e)NBs. It may be acceptable to produce a standardized list of Security Policy Attributes (SPAs). The SPA may be a policy which tells the PVE what action is to be taken if a specific SW module fails its integrity check. The PVE does not need to know anything else about the failed module.

SPA codes may be standardized and may include the following codes. A "00" module failure may indicate that network-access has to be denied. All modules of this type may be in stage 2, but having this coding in stage 3 modules allows for flexibility. A "01" module failure may indicate allowing temporary network access. This temporary network access may be used by the device to perform remediation, as described in the section on remediation, e.g., using a remediation centre for repair of failed SW module and it may stop network access if remediation is not successful. A "02" module failure may indicate allowing network access. This may refer to a remediation centre for repair of failed SW module and may continue network access if remediation is not successful. A "03" module failure may indicate allowing network access. It may delete/disable/quarantine the failed SW module and may stop network access if action is not successful. A "04" module failure may indicate allowing network access. It may delete/disable/quarantine a failed SW module and may continue network access if action is not successful. A "05" module failure may indicate allowing network access and may ignore SW integrity failure. A "06" may indicate other failures.

A single SPA may be associated with each stage 3 SW module in an H(e)NB. The actual SW module identifiers may then be proprietary to each make and model of H(e)NB. In SAV, the H(e)NB already sends to the SeGW an H(e)NB_ID, which may be used by the network to identify the make, model and serial number of the H(e)NB. For each stage 3 integrity-check failure, the H(e)NB places into the Notify payload the proprietary SW module ID and the corresponding SPA. The payload is forwarded to the PVE, as per our existing SAV scheme.

The PVE inspects the SPAs, and if there is any SPA=00, then the SeGW is not authorized to grant access to the H(e)NB. If there are any SPAs=01 or 02, then the remediation process is triggered. The PVE sends the H(e)NB_ID and the SW module IDs. The remediation centre may use the H(e)NB_ID to cross-reference the proprietary SW module IDs so that it can download the correct update to the H(e)NB.

If there are any SPAs=03 or 04, the PVE may send the appropriate instruction to the SeGW. If there are any SPAs=05, the H(e)MS, or other network element, may store the data for management purposes.

Optionally, there may be some re-booting/re-validating and ACK messaging involved for the non-00 SPAs. SPA=00 has the same end-result as AuV, except that the network now has some information about the bad H(e)NB and so some management action may be taken. Optionally, the PVE may not be told about modules which pass their integrity checks.

The PVM may be expanded to include failure of stage 2 modules, if FBC supports basic communications. The SPA may be part of the object that includes the SW module ID. Those would have to be stored in the TrE. They may not be stored as part of the SW module, and they may not be trusted in the case of a failed integrity check of the SW module.

The SPAs assigned to each SW module may agree with each H(e)NB supplier as part of the type-approval process for the SW stack, based on a risk-assessment process. Once a supplier has established a relationship with an operator, then it may be simple to assign SPAs to new SW modules. Established suppliers may be trusted to assign appropriate SPAs based on previous successful approvals.

In order to lessen the need for standardization of the SW structure of the H(e)NB structure, the SW structure of the H(e)NB may be defined in terms of blocks of codes, where a block is defined as a minimum atomic lump or quanta in terms of integrity checking and in terms of what may be remediated. Individual block functions may not be defined. For example, all of stage 3 SW may be a single block, from the viewpoint of integrity checking. Alternatively, the blocks may map 1:1 onto actual SW applications, or even sensitive objects within applications. The SPAs may be applied to the SW blocks. When the remediation centre is invoked because of an SPA of 01 or 02, it downloads the required blocks. The ID of a block may be related to the vendor and the architecture may not be standardized.

If SPAs are used in device validation, the SPAs may be stored securely in the TrE and bound to the SW identifier. It may be guaranteed that, for example, a 05-SPA may not be replayed for another component with a 00-SPA. Thus the PVE may be able to verify that a received SPA really belongs to the loaded component in the H(e)NB.

The enrollment process that is initiated upon the first, initial network connect of the device, may be used to transfer the SPAs from the device securely into the C_DB and store them for future use. Then the device could report the SW_IDs of failed components and the PVE is able to retrieve the corresponding SPA policy action from the local database. This may be useful for low-bandwidth connected devices.

Described herein are embodiments for grouping SPAs. If SPAs are locally stored on the TrE, the TrE may inspect all failed codes and their SPAs, process them, and send a more summarized stage integrity check. The failed modules and their SPAs may include those shown in Table 1.

TABLE 1

| Failed module ID | SPA |
|---|---|
| 00 | 01 |
| 01 | 01 |
| 02 | 03 |
| 03 | 03 |
| 04 | 03 |
| 05 | 04 |

The TrE may process such data as shown in Table 2.

TABLE 2

| SPA values | modules |
|---|---|
| 01 | 00, 01 |
| 03 | 02, 03, 04 |
| 04 | 05 |

The list of modules that failed to different degrees, which is indicated by the SPA, may be sent instead of all the SPA values.

Thus, where some bit blocks in the Notify message are defined, you may have the mapping as shown in Table 3.

TABLE 3

| SPA | module value |
|---|---|
| 00 | Empty |
| 01 | 00, 01 |
| 02 | Empty |
| 03 | 02, 03, 04 |
| 04 | 04 |
| 05 | Empty |

The compactness of the data will depend on the number of failed modules expected. For example, if on average more than 1 module will fail for most of the SPAs, then data will be more compact.

Figure 13:
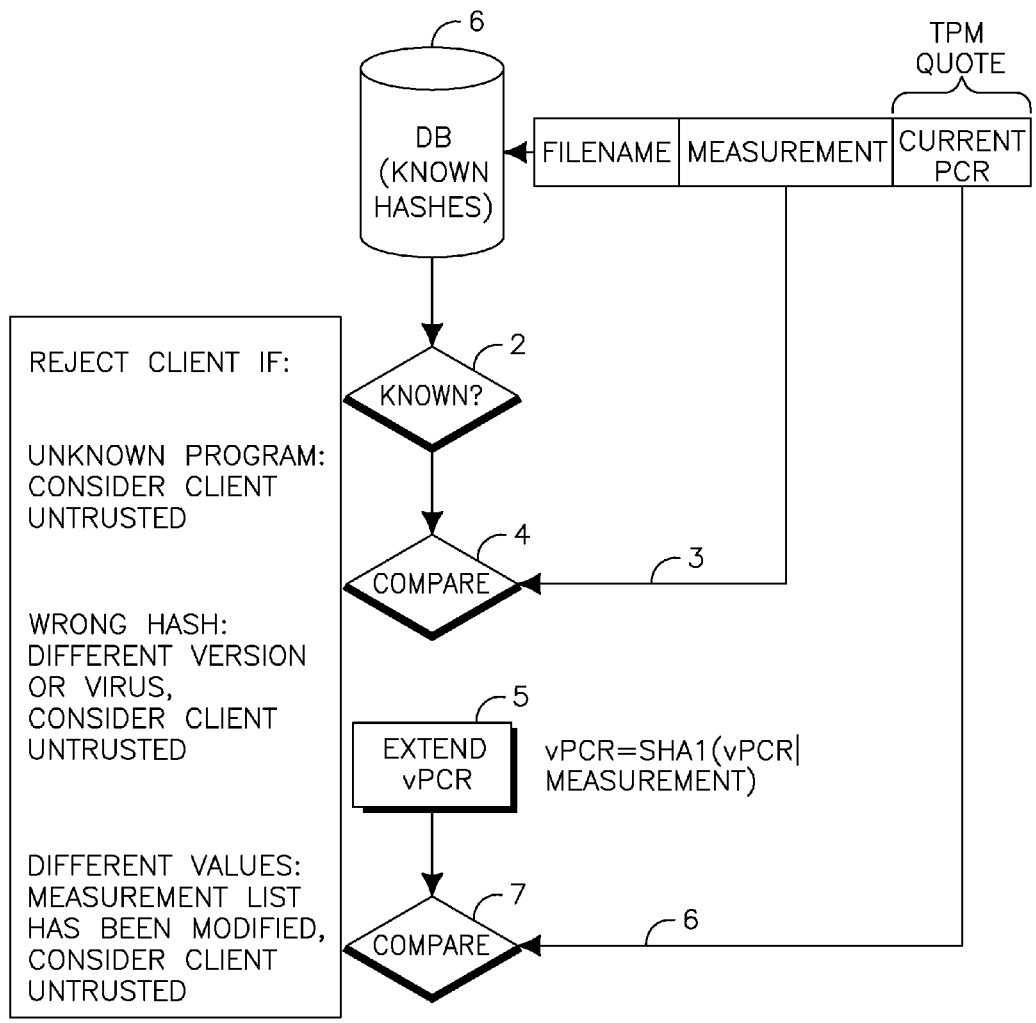
FIG. 13 shows an example flow diagram of validation using a virtual platform configuration register value.

FIG. 13 shows a diagram of an example of a method of validation via remote attestation. A validation entity 1300 receives a SML and a signed PCR value. The SML contains an ordered list of all files which were extended into the respective PCR. The validation entity 1300 performs the following steps for every entry in the SML. The validation entity 1300 queries if the given filename exists in a local database 1310 of known-good hash values (1). This database 1310 contains all filenames and the RIM (such as hashes) of the binaries which are considered trustworthy. If a filename cannot be found in the database, it is considered untrustworthy (2). The validation entity 1300 may compare the RIM to the reported measurement value from the SML (3). If they do not match, the binary on the platform has been changed (by user, malware, or other entity). In this case, the platform cannot be trusted (4). The validation entity 1300 may perform an extend operation on a virtual PCR (5). Essentially the validation entity performs the very same steps as the platform did during execution and measurement. At the end of this process, the value of the virtual PCR is compared to the reported value from the platform (6). If they do not match, the SML has been tampered with (for example, if a line from SML is deleted, but the hash-value was extended to the PCR, the virtual PCR and reported PCR will mis-match). The platform is then considered untrustworthy (7).

Figure 14:
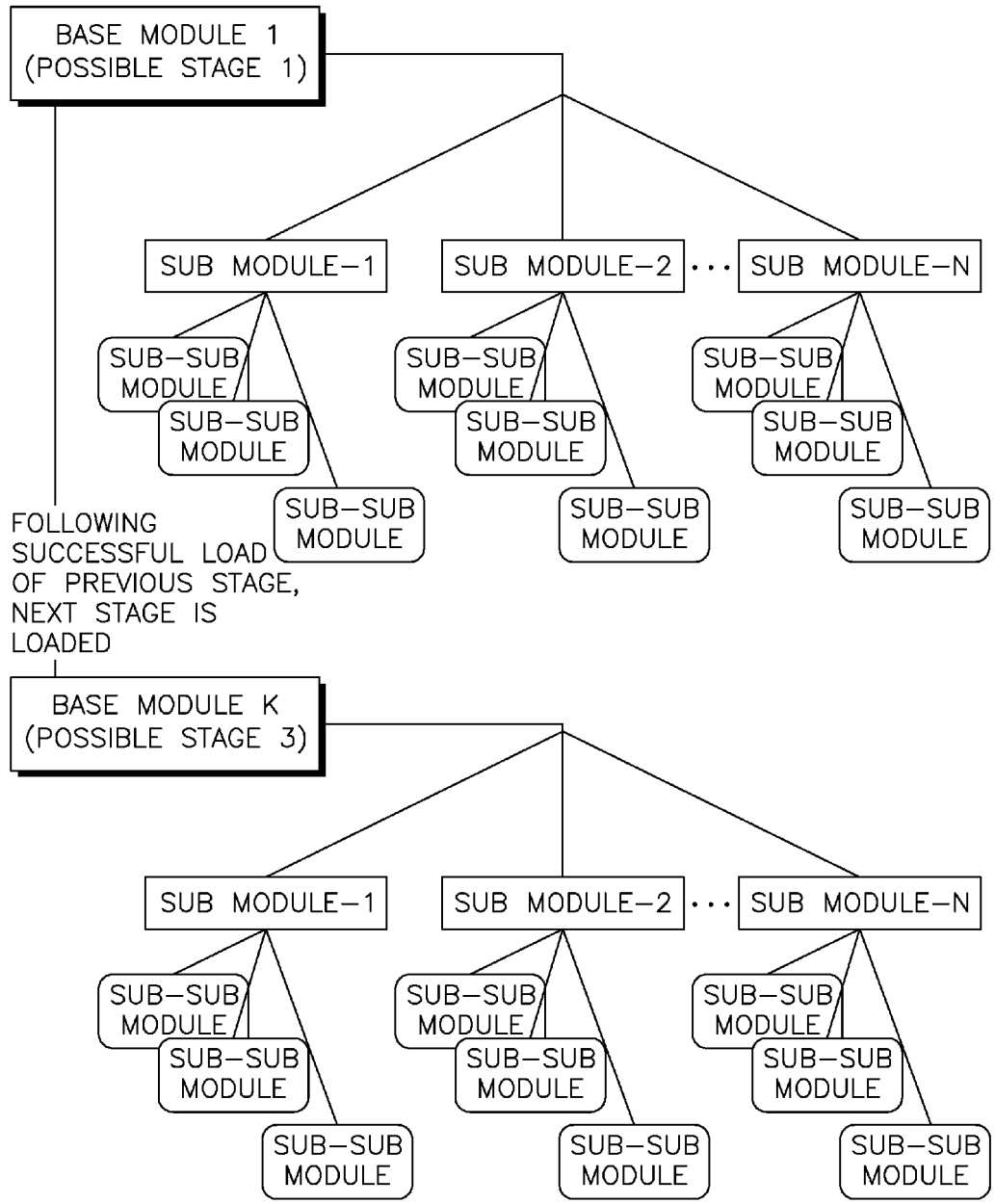
FIG. 14 shows an example diagram of module hierarchy when loading components during full semi-autonomous validation.

As a variant for reporting the list of loaded components as in Clist or for reporting the list of failed modules in case of F-SAV, or for reporting the measurements, the hierarchical relationship among the modules may be exploited to reduce the number of reported elements and for latency requirements. An example arrangement is shown in the FIG. 14. Such an arrangement automatically induces a natural order to the modules. Since the number of possible modules may be very high due to the OS, protocol stacks, management modules and other modules, the number of modules may be large.

After successful secure start-up, PVE or SeGW must issue a certificate that indicates a successful start-up to the device. Such a certificate will contain the information elements such as the TrE_ID, version numbers (of the Software, Hardware) or a hash of software, and secure time stamp, location of the device, hash of modules, Clist of modules and other relevant information.

Such a certificate may be useful for a failed start-up. In this case, the information may be sent back to the PVE and the PVE may authentically verify that the version number reported is correct. Since the PVE is the one who had issued the certificate, it therefore may take the appropriate steps. The difference is that the PVE is not as dependent on the device for trust as in the case where the device indicates a successful start-up status. This may only work, however, if the PVE can at least trust that any information it receives from the device regarding its failed start-up case. Therefore, the device may be designed, in this case, so that its functionality detects the state of failed start-up and to report such status to the PVE that it is still intact and non-compromisable.

The certificate may also be useful for a successful start-up. In this case, in a subsequent secure start-up process, the device may send the hash value of the measurements or the measurements and the last secure start-up certificate issued by the PVE or a pointer to it. In doing so, the PVE may verify if there is any malicious change.

The certificate may also be useful in cases where a device that boots in one geographic area or operator domain, moves to a new operator domain. This happens in case of geo tracking devices. In order to verify the tracking data, one needs to know if the device has successfully booted and the data generated is genuine. Such a certificate of successful start-up may be provided with the data generated by the device. Within the certificate the location of the device when the start-up was successfully achieved may be included. When, later, a third party recipient of such a certificate tries to verify the authenticity of the certificate, it may check the then-current location of the device (using, preferably, methods that do not depend on the device's processing of location information within itself, e.g., GPS-based methods) and see if the obtained then-current location is matched to the location included in the certificate. If there is a mismatch, the recipient of the certificate may request a new secure start-up and subsequent re-validation of the integrity of the device to either the device or the network entity that manages the re-validation of the device. Such a certificate that includes information on the location where the last successful start-up took place may also be of use in case of failures en route, when the destination network needs to know about the context and configuration (including the location) of the last successful start-up.

As described herein, PVM may use any form of validation. In general, the three main methods are AuV, SAV and remote validation (RV). Each method handles the steps of measurement, reporting and enforcement that are associated with device integrity validation differently. AuV performs all three steps locally on the device. RV performs the measurements locally and then reports the measurements to an external entity. Enforcement is carried out by the external entity. SAV enforces a secure start-up locally, reports metrics out to an external entity and allows for re-validation.

In particular, a device using SAV may perform direct evaluation of trust state measurements, and establish initial network connectivity. The results of the evaluation, along with relevant reference metrics may be reported (hereinafter, the validation report) to an external entity, such as a security gateway (SeGW). Optionally, a subset of the measurements and reference metrics may be reported.

The validation report may enable assessment of the trust state of the H(e)NB based upon the characteristics of the H(e)NB, such as its platform architecture, security architecture, security policies, and device certification. The validation report may include information on the H(e)NB, the TrE capabilities, the measurement and verification practices, the TrE's security policy manager capabilities, the measurement results, platform level certification information, last boot time, or a boot counter.

The information on the device may include, for example, a manufacturer, a make, a model number, a version number, a hardware build or version number, or a software build or version number. The TrE capabilities may include, for example, measurement, verification, reporting, and enforcement capabilities.

The measurements and internal verification practice information may include methods of performing trust state measurement and internal verification during secure start-up. For example, the extent of the coverage, such as names, types, and sequences, of components loaded may be included. Methods of verification of the components, such as the number and extent of the chain of trust in the verification, may be included. Algorithms used for the measurements and verification, such as Secure Hash Algorithm 1 (SHA-1) extension, may be included. The range of registers, such as platform configuration registers (PCRs), that are covered in the start-up verification may also be included.

The TrE's Security policy manager capabilities may include information regarding the implementation and enforcement of security policies. The measurement results may include actual measurement values internally reported and verified, such as signed PCR values. The platform level certification information may include information about the H(e)NB in general, or the TrE in specific. The last boot time may include a secure time stamp of when the last secure boot was carried out.

The boot counter may include the value of a counter that increments every time a power cycle occurs and a secure boot operation is carried out. The counter may be a protected counter that cannot be reset or reversed and always counts forward. The counter value may be initialized to zero when the device is first initialized.

The validation report may be bound to the H(e)NB through a combined authentication and validation procedure by binding the information into an authentication protocol, such as the Internet Key Exchange protocol version 2 (IKEv2). The validation report may include a certificate. Optionally, some of the information may be included in the certificate.

Alternatively, the validation report may include a pointer or reference to a trusted third party (TTP) that provides the trust state information, and the external entity may obtain the trust state information from the TTP. For example, the validation report may include a reference to a separate device-trust certificate that includes the trust state information.

In response to exceptions encountered during the evaluation, the external entity may deny network access. The external entity may also evaluate the measurements and reference metrics and may detect errors not detected or reported by the H(e)NB. Alternatively, the H(e)NB may be granted limited network access (quarantined). Otherwise, the H(e)NB may be granted network access. The H(e)NB may perform, evaluate, and report trust state measurements in response to a request from an external device. The request may be initiated by an operator. Revalidation may validate elements that were not validated during start up. The external entity may send a request to the H(e)NB to perform remedial measures if a non-core validation error is detected. For example, the H(e)NB may revert to a predetermined state in response to the remedial request.

SAV allows for detection of a compromise through indicators even if an exploit is not detected in secure start-up. Depending on security properties, remediation steps may be performed on compromised devices. This is possible as long as the indicators sent to the network show that the core secure start-up is not compromised and the security properties are communicated. If the core is compromised, the device will not be able to connect to the network, due to local enforcement. A compromised device is detected either by reboot or request of re-validation. Thus, there is a higher detection probability. Software updates may be provided OTA, and no service technicians may be needed to replace devices. SAV allows fine-grained access control to CN and provides lower bandwidth usage than RV due to the use of indicators and local enforcement.

SAV combines the benefits of AuV and RV leading to finer granularity and more visibility into device security properties and validation measurements. It provides low bandwidth usage, local device resources comparable to autonomous validation, faster and easier detection of compromised devices, and enables use of quarantine networks for compromised devices.

Figure 15:
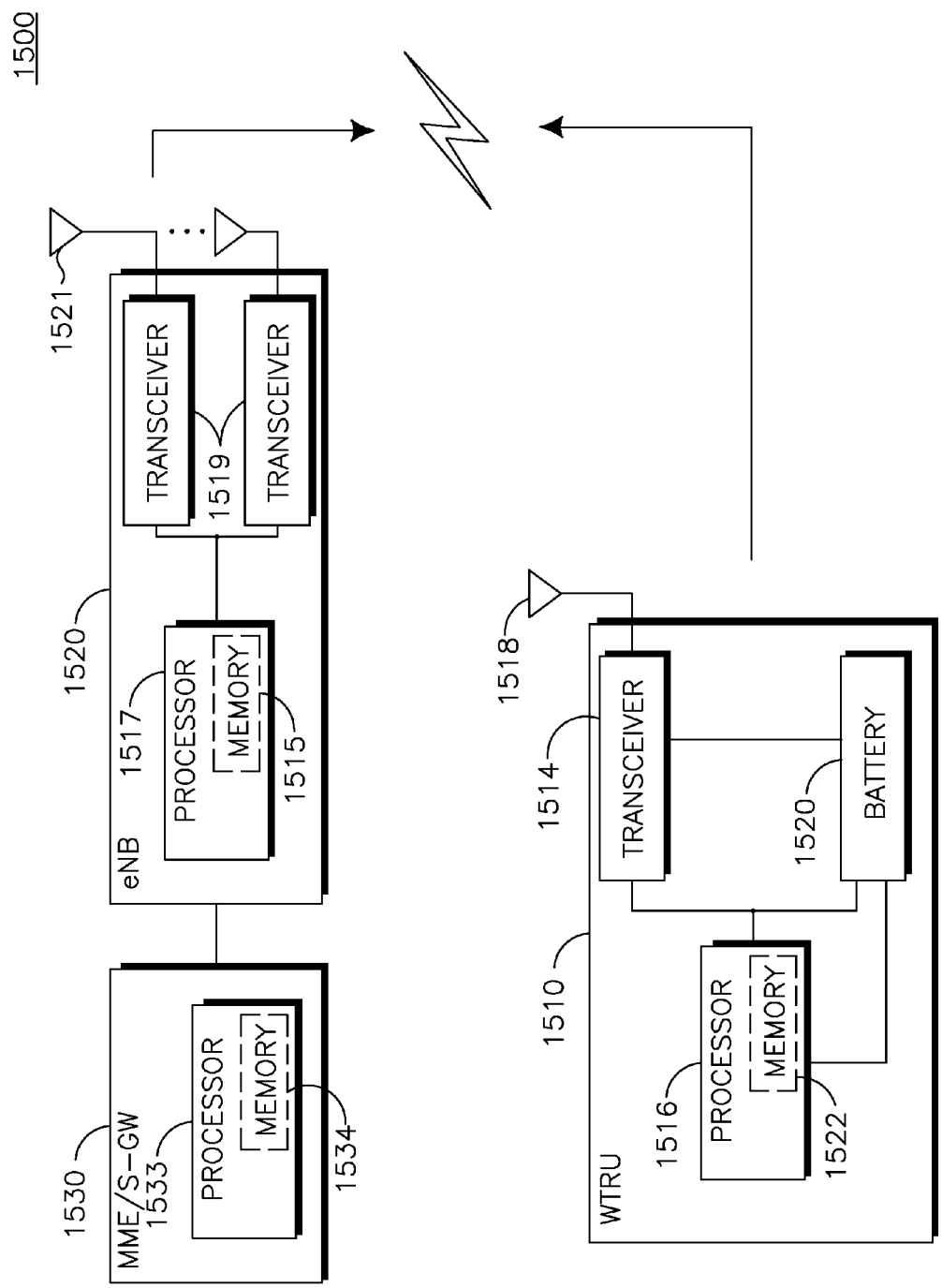
FIG. 15 shows an example functional block diagram of a wireless transmit/receive unit and a base station, each configured to provide, perform and implement PVM.

FIG. 15 is an exemplary block diagram of a wireless communication network 1500 including a WTRU 1510, a H(e)NB 1520, and a H(e)MS 1530. As shown in FIG. 15, the WTRU 1510, the H(e)NB 1520 and the H(e)MS 1530 are configured to perform platform validation and management.

In addition to the components that may be found in a typical WTRU, the WTRU 1510 includes a processor 1516 with an optional linked memory 1522, at least one transceiver 1514, an optional battery 1520, and an antenna 1518. The processor 1516 is configured to perform complementary platform validation and management functions with respect to those PVM functions communicated to it via a base station such as a H(e)NB 1520. The transceiver 1514 is in communication with the processor 1516 and the antenna 1518 to facilitate the transmission and reception of wireless communications. In case a battery 1520 is used in the WTRU 1510, it powers the transceiver 1514 and the processor 1516.

In addition to the components that may be found in a typical H(e)NB, the H(e)NB 1520 includes a processor 1517 with an optional linked memory 1515, transceivers 1519, and antennas 1521. The processor 1517 is configured to perform platform validation and management functions to implement PVM methodology. The transceivers 1519 are in communication with the processor 1517 and antennas 1521 to facilitate the transmission and reception of wireless communications. The H(e)NB 1520 is connected to the H(e)MS 1530 which includes a processor 1533 with an optional linked memory 1534.

The SeGW and PVE, although not shown in FIG. 15, in addition to the components that may be found in a typical SeGW and PVE, may include a processor with an optional linked memory, transceiver(s), antenna(s), and communication ports. The processor is configured to perform platform validation and management functions to implement PVM methodology. The transceivers and communication ports are in communication with the processor and antennas, as needed, to facilitate the transmission and reception of communications.

Network components and are selectively configured to perform desired PVM functions presented in detail herein with respect to various examples. Additionally, WTRUs may be configured to with complementary PVM functionality, such as with respect to verification, validation and other trust factors, to facilitate their trustworthy access to and use of a PVM enabled network and resources.

As an example, the respective components are all configured to employ a PVM maximal type separation of duties approach between active entities. As explained herein, this may be facilitated through the use of PVM tokens to pass certain information between various entities.

Although features and elements of PVM are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless device, a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth™ module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of performing validation of a device coupled to a platform validation entity (PVE), the method being performed at the PVE, the method comprising:
   receiving a validation message from the device based on an integrity check of one or more software modules of the device, the validation message comprising information about the device and indicating one or more security policy attributes associated with any software modules that failed the integrity check, each security policy attribute providing information on an action that may be taken at the PVE in response to the failed integrity check; and
   based on the validation message, determining whether to allow network access to the device.

2. The method of claim 1, wherein one of the one or more security policy attributes for any failed software module is a code selected from a list of codes.

3. The method of claim 2, wherein the code indicates that network access needs to be denied.

4. The method of claim 2, wherein the code indicates that temporary network access is acceptable.

5. The method of claim 2, wherein the code indicates that limited network access is acceptable.

6. The method of claim 2, wherein the list includes a code that indicates that network access should be allowed.

7. The method of claim 1, wherein the device is a wireless transmit/receive unit (WTRU).

8. The method of claim 1, wherein based on the validation message the PVE determines whether to mandate configuration changes at the device.

9. The method of claim 1, wherein the security policy attributes indicate what actions should be done by the PVE for the any modules that failed the integrity check.

10. A method of performing validation of a device to a platform validation entity (PVE), the method being done at the device, the method comprising:
    performing an integrity check on modules of the device;
    obtaining security policy attributes for any modules that fail the integrity check; and
    sending a validation message to the PVE based on the integrity check, the validation message comprising information about the device and indicating one or more security policy attributes associated with any software modules that failed the integrity check, each security policy attribute providing information on an action that may be taken at the PVE in response to the failed integrity check.

11. The method of claim 10, wherein the security policy attribute for any failed software module is a code selected from a list of codes.

12. The method of claim 11, wherein the code indicates that network access needs to be denied.

13. The method of claim 11, wherein the code indicates that temporary network access is acceptable.

14. The method of claim 11, wherein the code indicates network access should be allowed.

15. The method of claim 11, wherein the code indicates that limited network access is acceptable.

16. The method of claim 10, wherein the security policy attributes indicate what actions should be done by the PVE for the any modules that failed the integrity check.

17. The method of claim 10, wherein the device is a wireless transmit/receive unit (WTRU).

18. The method of claim 1, wherein the network access is limited.

19. The method of claim 1, wherein the network access is a full access to a network.

20. A method of performing validation of a device coupled to a platform validation entity (PVE), comprising:
measuring at least one pre-designated component of the device to produce an integrity measurement of the at least one pre-designated component of the device;
retrieving a trusted reference value for the at least one pre-designated component of the device;
performing, using a trusted environment (TrE) located in the device, an integrity check of the at least one pre-designated component of the device and storing integrity check results, the integrity check including the TrE comparing the measured integrity measurement of the at least one pre-designated component against the trusted reference value for the at least one pre-designated component of the device;
performing, using the TrE, a secure start-up check on the device and storing secure start-up check results, the start-up check determining whether the at least one pre-designated component achieved a state of secure start-up, the start-up check results including an indication if the at least one pre-designated component fails to achieve the state of secure start-up;
obtaining security policy attributes for any modules that fail the integrity check;
forming, using the TrE, a validation message based on the integrity check results and the secure start-up check results, the validation message indicating results of the comparison of the measured integrity measurement against the trusted reference value, the validation message comprising information about the device and indicating one or more security policy attributes associated with any software modules that failed the integrity check;
forwarding, using the TrE, the validation message from the device to the PVE, the PVE being external from the device; and
after forwarding the validation message, receiving a message denying or allowing device authentication.

21. A method of performing validation of a device coupled to a platform validation entity (PVE), the method being performed at the PVE, the method comprising:
receiving a validation message from the device based on an integrity check of one or more software modules of the device, the validation message comprising information about the device and indicating one or more security policy attributes associated with any software modules that failed the integrity check; and
based on the validation message, determining whether to allow network access to the device, wherein the code indicates that network access should be allowed as long as a quarantine of the failed module is successful.

* * * * *